(12) United States Patent
Shigemasa et al.

(10) Patent No.: US 6,725,103 B2
(45) Date of Patent: Apr. 20, 2004

(54) PROCESS CONTROL SYSTEM

(75) Inventors: Takashi Shigemasa, Kanagawa-ken (JP); Akimoto Kamiya, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 345 days.

(21) Appl. No.: 09/803,997

(22) Filed: Mar. 13, 2001

(65) Prior Publication Data

US 2001/0032026 A1 Oct. 18, 2001

(30) Foreign Application Priority Data

Mar. 14, 2000 (JP) ........................................ 2000-071241

(51) Int. Cl.⁷ .............................................. G05B 13/02
(52) U.S. Cl. ............................. 700/53; 700/33; 700/42; 700/282; 700/287; 700/289; 700/290
(58) Field of Search .............................. 700/28–31, 33, 700/40, 42, 53, 282, 287–290, 301

(56) References Cited

U.S. PATENT DOCUMENTS

| | | | | |
|---|---|---|---|---|
| 4,616,308 A | * | 10/1986 | Morshedi et al. | 700/39 |
| 5,355,065 A | * | 10/1994 | Narazaki et al. | 318/632 |
| 5,384,698 A | * | 1/1995 | Jelinek | 700/29 |
| 5,400,247 A | * | 3/1995 | He | 700/53 |
| 5,886,895 A | * | 3/1999 | Kita et al. | 700/28 |
| 6,081,751 A | * | 6/2000 | Luo et al. | 700/42 |
| 6,330,483 B1 | * | 12/2001 | Dailey | 700/28 |
| 6,571,135 B2 | * | 5/2003 | Bergold et al. | 700/42 |

FOREIGN PATENT DOCUMENTS

| | | | | |
|---|---|---|---|---|
| JP | 03097009 A | * | 4/1991 | G05B/23/02 |
| JP | 7-81684 | | 9/1995 | |

OTHER PUBLICATIONS

Takashi Shigimasa, et al., ISA 2000, pp. 1–10, "A New Optimal Coordinated Control System for Distributed Utility Plants by Using Two Degrees of Freedom PID Control and Optimization Techniques", Aug. 21, 2000.

Hock & Schittkowski, Mathematical Systems, Inc., No. 25, 2 pages, " NUOPT–Modeling Language Simple" http://www/msi.co.jp/nuopt/simple.html.

* cited by examiner

*Primary Examiner*—Anil Khatri
*Assistant Examiner*—Crystal J. Barnes
(74) *Attorney, Agent, or Firm*—Oblon, Spivak, McClelland, Maier & Neustadt, P.C.

(57) ABSTRACT

A process control system in a multi-input/output coordinate control system for executing coordinate control of a main input. The process control system sets an operating point set value for an operating point of an n-th control output, generates the n-th control output to control the main input based on the n-th control output, and generates an m-th control output to control the operating point of the n-th control output so that the operating point of the n-th control output becomes equal to the operating point set value, thereby to allow the n-th control output of fast response to operate at the operating point set value by controlling the main input.

7 Claims, 46 Drawing Sheets

FLOW CHART OF THE PROCESS OF THE PRIORITY SETTING MEANS
(A CASE IN WHICH TWO OUTPUT CONTROL MEANS ARE PROVIDED)

PROCESS CONTROL SYSTEM

BACKGROUND OF THE INVENTION

1. Field of the Invention

The present invention relates to a process control system, and more particularly to a process control system for realizing the optimal process coordinate control.

2. Description of the Related Art

FIG. 56 shows an example of a conventional process control system which is a multi-input/output control system including a main input provided with an optimal operation decision means.

The conventional example shown in FIG. 56 will be explained hereunder. A process 5609 to be controlled is composed of a first fuel control valve 5610, a first boiler 5611, a control valve 5612, a turbine 5613, a generator 5614, a second fuel control valve 5615, a second boiler 5616, and a steam load facility 5617.

A control system 5600 is composed of an optimization model storage unit 5601, an optimal operation decision means 5602, a generator output control means 5605, a first boiler steam pressure control means 5606, and a second boiler steam pressure control means 5607.

The optimal operation decision means 5602 inputs an process data input 5638 inputted from the process 5609 to be controlled and an optimization model 5630 stored in the optimization model storage unit 5601, and decides an optimal operating point for the process operation. The optimization model 5630 stored in the optimization model storage unit 5601 is expressed by Formula 1. Here, Formula 1 is composed of an objective function formula 1a and constraint function formulas 1b to 1g.

The optimal operation decision means 5602 decides the optimal operating point for the process operation using the optimization model 5630 expressed by Formula 1.

Formula 1
Minimize:

$$X1+X2 \quad (1a)$$

Subject to:

$$X1\text{min} \leq X1 \leq X1\text{max} \quad (1b)$$

$$X2\text{min} \leq X2 \leq X2\text{max} \quad (1c)$$

$$Y1+Y3=L \quad (1d)$$

$$Y1=a1(0)+a1(1) \times X1+a1(2) \times X1^2 \quad (1e)$$

$$Y2=a2(0)+a2(1) \times X1+a2(2) \times X1^2 \quad (1f)$$

$$Y3=a3(0)+a3(1) \times X2+a3(2) \times X2^2 \quad (1g)$$

In Formula 1, X1, X1min and X1max indicate a flow, a minimum flow and a maximum flow of a fuel 5620 of the first boiler 5611, respectively. X2, X2min and X2max indicate a flow, a minimum flow and a maximum flow of a fuel 5626 of the second boiler 5616, respectively. Y3 indicates a steam flow at an outlet 5625 of the second boiler 5616. Y1 and Y2 indicate a steam flow of a turbine exhaust 5623 and a generation output 5635 of the generator 5614, respectively. L indicates a steam flow 5627 of the steam load facility 5617. The steam flow 5627 (L) is inputted to the optimal operation decision means 5602 from the process 5609 as a part of the process data input 5638.

By converting the units of the variables X1, X2, Y1, Y2, and Y3 into the quantity of heat, Efficiencies 1 and 2 are shown below:

$$\text{Efficiency } 1=(Y1+Y2)/X1$$

$$\text{Efficiency } 2=Y3/X2$$

Here, Efficiency 1 indicates an efficiency of the first boiler 5611, the control valve 5612, the turbine 5613, and the generator 5614, and Efficiency 2 indicates an efficiency of the second boiler 5612.

Generally, plant devices vary in efficiency with loads, so that Formulas 1e, 1f, and 1g indicate efficiency variations due to such loads. The turbine 5613 is a back-pressure turbine, and a part of the given steam energy is used to drive the generator 5614 for the generation output 5635, and the remainder (lost energy excluded) is used to supply steam to the steam load facility 5617.

Among the constraint function Formulas 1b to 1g, Formulas 1e, 1f, and 1g expressing the efficiencies of plant devices are a process operation characteristic function. Here, ai(j); i=1, 2, 3; j=0, 1, 2 indicate process operation characteristic function parameters and are stored in the optimization model storage unit 5601.

Decision of the optimal operating point means to decide the values of the variables X1, X2, Y1, Y2, and Y3 for minimizing the objective function value expressed by Formula 1a, which meet, for example, the constraint functions expressed by Formulas 1b to 1g.

As a tool for solving an optimization problem expressed by a numerical formula model such as Formula 1, for example, there is "NUOPT-Modeling Language SIMPLE by MATHEMATICAL SYSTEMS, INC." available.

It is assumed that the values of the variables X1, X2, Y1, Y2, and Y3 decided by the optimal operation decision means 5602 are X1*, X2*, Y1*, Y2*, and Y3*, respectively. The values X1*, X2*, Y1*, Y2*, and Y3* indicate the optimal operating point for the process operation. In this example, as shown by Formulas 1d to 1g, when one of the five variables (X1, X2, Y1, Y2, and Y3) is decided, the residual four variables are decided.

In an example of the prior art, as shown in FIG. 56, the optimal operation decision means 5602 decides the optimal value Y2* for the variable Y2 corresponding to the generation output 5635 of the generator 5614, that is, an optimal generator output 5631 based on Formula 1, and outputs the decided optimal generator output 5631 to the generator output control means 5605. The generator output control means 5605 outputs a generator output control output 5634 to the control valve 5612 of the turbine 5613 and controls the flow of a steam 5622 at the inlet of the turbine 5613 so that the output 5635 of the generator 5614 becomes equal to the optimal generator output 5631.

The first boiler steam pressure control means 5606 outputs a first boiler steam pressure control output 5632 to the first fuel control valve 5610 and adjusts a first fuel control valve fuel 5620, and thereby controls a steam pressure 5633 at an outlet 5621 of the first boiler 5611 so as to be equal to a given pressure set value. The second boiler steam pressure control means 5607 outputs a second boiler steam pressure control output 5636 to the second fuel control valve 5615 and adjusts the second fuel control valve fuel 5626, and thereby controls a steam pressure 5637 at the outlet 5625 of the second boiler 5616 so as to be equal to a given pressure set value.

In FIG. 56, the operations of the control system 5600 and the process 5609 will be explained qualitatively hereunder. The generator output control means 5605 sends up-output (down-output) 5634 to the control valve 5612 in order to increase (decrease) the generator output 5635 so that the generator output 5635 becomes equal to the optimal generator output 5631.

The up-operation (down-operation) of the control valve 5612 decreases (increases) the steam pressure at the first boiler outlet 5621. The first boiler steam pressure control means 5606 sends the up-output (down-output) 5632 to the first fuel control valve 5610 so as to increase (decrease) the first fuel control valve fuel 5620, thereby to increase (decrease) the decreased (increased) steam pressure. Besides, the up-operation (down-operation) of the control valve 5612 increases (decreases) the steam pressure of each of turbine exhaust 5623, a steam header 5624, and the second boiler outlet 5625.

Then, the second boiler steam pressure control means 5607 sends the down-output (up-output) 5636 to the second fuel control valve 5615 so as to decrease (increase) the second fuel control valve fuel 5626, thereby to decrease (increase) the increased (decreased) steam pressure.

Generally, the steam load facility 5617 requires the steam pressure of the steam header 5624 to be at a predetermined value.

Therefore, as explained above, the control system 5600 controls the steam pressure 5637 at the outlet 5625 of the second boiler 5616, instead of controlling the steam flow generated by the second boiler 5616. As a result, the steam load 5627 required by the steam load facility 5617 becomes equal to the value L given in Formula 1.

Formula 1 expresses the characteristics of the process. As Formula 1 approximates to an actual process more and more, as a result of the control by the control system 5600, when the steam load 5627 is close to L given in Formula 1, the flow (X1) of the first fuel control valve fuel 5620, the flow (X2) of the second fuel control valve fuel 5626, the turbine exhaust 5623 (Y1), the generator output 5635 (Y2), and the steam flow (Y3) of the second boiler outlet 5625 approximate to the optimal operating point (X1*, X2*, Y1*, Y2*, and Y3*) decided by the optimal operation decision means 5602, respectively. As a result, the whole process is operated efficiently in the neighborhood of the optimal operating points.

FIG. 61 shows another example of the prior art.

In FIG. 61, the optimal operation decision means 5602 decides the priority of a turbine exhaust pressure control means 5902 and the second boiler steam pressure control means 5607, and outputs a decided priority set value 6109 to a priority display means 6100. The turbine exhaust pressure control means 5902 outputs a turbine exhaust pressure control output 5904 to the control valve 5612, and inputs turbine exhaust pressure 5903 from the turbine exhaust 5623. The second boiler steam pressure control means 5607 outputs the second boiler steam pressure control output 5636 to the second fuel control valve 5615 and inputs the second boiler outlet steam pressure 5637 from the second boiler outlet 5625.

The priority decision method of the optimal operation decision means 5602 is described below. For example, the generator 5614 is operated in a direction to maximize the output thereof for the steam flow L (5627) of the steam load facility 5617 within the range from the minimum flow to the maximum flow in Formula 1. That is, when it is optimal that the turbine 5613 supplies steam to the steam load facility 5617 on a priority basis, the running priority to the turbine exhaust pressure control means 5902 is set higher than that of the second boiler steam pressure control means 5607.

In this case, the priority set value 6109 decided by the optimal operation decision means 5602 is shown in FIG. 62. As shown in FIG. 62, the priority set value 6109 is composed of a priority level section 6201 and a control means section 6202. When the number indicated in the priority level section 6201 is smaller, the priority of the control means corresponding to the control means section 6202 is higher.

Conventionally, in such a case, in order to operate the equipment according to the priority set as mentioned above, when the steam flow supplied to the steam load facility 5617 is lower, the turbine exhaust pressure control means 5902 is manually set to AUTO and the second boiler steam pressure control means 5607 is set to MANUAL.

The turbine exhaust pressure control means 5902 outputs the turbine exhaust control output 5904 to the control valve 5612, and executes automatic control so that the turbine exhaust pressure 5903 becomes equal to a preset steam pressure set value.

On the other hand, the second boiler steam pressure control means 5607 set to MANUAL does not execute automatic control. It manually lowers the second fuel control valve 5615 to a preset lower limit value.

When the steam flow supplied to the steam load facility 5617 is higher and the control valve 5612 is set to the upper limit, the turbine exhaust pressure control means 5902 is manually set to MANUAL and the second boiler steam pressure control means 5607 is set to AUTO.

The turbine exhaust pressure control means 5902 does not execute automatic control. On the other hand, the second boiler steam pressure control means 5607 set to AUTO outputs the second boiler steam pressure control output 5636 to the second fuel control valve 5615, and executes automatic control so that the second boiler outlet steam pressure 5637 becomes equal to a preset steam pressure set value.

By the aforementioned operations, the steam can be supplied to the steam load facility 5617 on the decided priority basis by controlling the steam pressure of the steam header 5624.

In this case, it is assumed that the steam pressure of the turbine exhaust 5623 and that of the second boiler outlet 5625 change in proportion to the steam pressure of the steam header 5624 or are almost the same, and the steam pressure of the steam header 5624 can be controlled by controlling the steam pressure of the turbine exhaust 5623 or the second boiler outlet 5625.

An example of the prior art concerning a case that the number of optimal operating points 5631 as shown in FIG. 56 is one is explained above. A case that there are a plurality of optimal operating points used for control will be explained by referring to FIG. 57.

In FIG. 57, the control system 5600 is composed of the optimization model storage unit 5601, the optimal operation decision means 5602, a steam pressure setting unit 5700, an adder unit 5701, a proportional integral unit 5702, and n gain units (from a first gain unit 5703, - - -, an i-th gain unit 5704, - - -, to an n-th gain unit 5730). The process 5609 is composed of n boiler facilities (from the first fuel control valve 5610 and a first boiler 5611, - - -, an i-th fuel control valve 5705 and an i-th boiler 5706, - - -, to an n-th fuel control valve 5731 and an n-th boiler 5732) and the steam load facility 5617. In this case, an example of an optimization problem equivalent to Formula 1 is given by a following Formula 2. Formula 2 is composed of an objective function formula 2a and constraint function formulas 2b1 to 2dn.

Formula 2

$$\text{Minimize: } X1 + \ldots + Xi \ldots + Xn \tag{2a}$$

Subject to:

$$X1\min \leq X1 \leq X1\max \tag{2b1}$$

$$Xi\min \leq Xi \leq Xi\max \tag{2bi}$$

$$Xnmin \leq Xn \leq Xnmax \quad (2bn)$$

$$Y1 + \ldots + Yi + \ldots + Yn = L \quad (2c)$$

$$Y1 = a1(0) + a1(1) \times X1 + a1(2) \times X1^2 \quad (2d1)$$

$$Yi = ai(0) + ai(1) \times Xi + ai(2) \times Xi^2 \quad (2di)$$

$$Yn = an(0) + an(1) \times Xn + an(2) \times Xn^2 \quad (2dn)$$

In Formula 2, X1, X1min and X1max indicate the flow, a minimum flow and a maximum flow of the fuel 5620 of the first boiler 5611, respectively. Y1 indicates the steam flow at the outlet 5621 of the first boiler 5611. Xi, Ximin and Ximax indicate a flow, a minimum flow and a maximum flow of a fuel 5720 of the i-th boiler 5706, respectively. Yi indicates a steam flow at an outlet 5721 of the i-th boiler 5706. Xn, Xnmin and Xnmax indicate a flow, a minimum flow and a maximum flow of a fuel 5742 of the n-th boiler 5732, respectively. Yn indicates a steam flow at an outlet 5743 of the n-th boiler 5732. L indicates the steam flow 5627 of the steam load facility 5617. The steam flow 5626 (L) is inputted to the control system 5600 from the process 5609 as a part of the process data input 5638.

In the same way as with the corresponding process shown in FIG. 56, Formulas 2d1 to 2dn is a process operation characteristic function indicating efficiency variations due to loads, and are stored in the optimization model storage unit 5601 as a part of the optimization model 5630 as shown in FIG. 57. It is assumed that the values of the variables X1, . . . , Xn and Y1, - - - , Yn decided by the optimal operation decision means 5602 are X1*, - - - , Xn* and Y1*, - - - , Yn*, respectively. The values X1*, - - - , Xn* and Y1*, - - - , Yn* indicate optimal operating points for the process operation.

As mentioned above, generally, the steam load facility 5617 requires the steam pressure of the steam header 5624 to be at a predetermined value.

Therefore, as shown in FIG. 57, the control system 5600 controls the steam pressure at the outlet 5621 of the first boiler 5611 to the outlet 5743 of the n-th boiler 5732, instead of controlling the steam flow generated by the first to n-th boilers (5611, 5706, 5732). As a result, the steam load 5627 required by the steam load facility 5617 becomes equal to the constant L given in Formula 2. Further, as shown in Formulas 2d1 to 2dn, variables Y1, - - - , Yn are dependent variables of X1, - - - , Xn, respectively, and when X1*, - - - , Xn* are decided, Y1*, - - - , Yn* are decided.

In the prior art, in order to operate the process at the decided optimal operating points X1*, - - - , Xn*, control gains $\alpha1^*$, - - - , $\alpha n^*$ corresponding to the control gain units 5703, 5704 and 5730 shown in FIG. 57 are set in proportion to the optimal operating points X1, - - - , Xn*, respectively according to the following Formula 3. Here, Formula 3 is composed of Formulas 3a1 to 3an.
Formula 3

$$\alpha 1^* = A \times X1^* \quad (3a1)$$

$$\alpha i^* = A \times X1^* \quad (3ai)$$

$$\alpha n^* = A \times Xn^* \quad (3an)$$

A symbol A indicates a proportional constant. When the fuel is proportionally allotted in correspondence with the optimal operating points X1*, - - - , Xn* by the gain setting as shown in Formula 3, the process 5609 can be operated in the neighborhood of the optimal operating points.

The process operation characteristic functions stored in the optimization model storage unit 5601 shown in FIG. 56, 61, or 57, that is, the characteristic function parameters a1(0), a1(1), a1(2), - - - , ai(0), ai(1), ai(2), - - - , an(0), an(1), an(2) corresponding to Formulas 1e to 1g and Formulas 2d1 to 2dn are conventionally set by manual calculation or automatically prepared by the process data collected from the process 5609.

FIG. 58 shows a conventional art of the automatic generation of process operation characteristic function parameters 5811. A conventional automatic generation device of the process operation characteristic function parameters 5811 is composed of a process operation data storage means 5801, a process operation data erasing means 5804, a process operation characteristic function generation means 3003, and a process operation data storage unit 5802.

Conventionally, the process operation data storage means 5801 stores the process data input 5638 collected from the process 5609 in the process operation data storage unit 5802. The process operation data erasing means 5804 erases process operation data 3011 which is older in time among the process operation data 3011 stored in the process operation data storage unit 5802 so as to control the number of process operation data 3011 stored in the process operation data storage unit 5802 within a given limit range. The process operation characteristic function generation means 3003 generates process operation characteristic function parameters from the process operation data 3011 stored in the process operation data storage unit 5802, by using, for example, the least squares method.

When the number of optimal operating points is one as shown in FIG. 56, and the response of the second fuel control valve 5615 to the steam pressure of the steam header 5624 is slower than that of the control valve 5612, a problem would arise that the pressure of the steam header 5624 is controlled by a control loop of the slow response, and the resultant delay of the control makes the pressure of the steam header 5624 unstable.

The causes of response delay may be, for example, a large process time constant and a small control gain. In the example shown in FIG. 56, due to the boiler combustion delay, a time constant of the pressure change of the steam header 5624 to the second fuel control valve 5615 is larger than that of the pressure change of the steam header 5624 to the control valve 5612. The former is, for example, several minutes and the latter is, for example, several seconds.

To solve this problem, the optimal fuel flow control system shown in FIG. 60 is available. For simplicity of the explanation, it is assumed that in FIG. 60, the steam pressure at the first boiler outlet 5621 is controlled to a predetermined pressure. Accordingly, the description on the first boiler steam pressure control means 5606 and the first fuel control valve 5610 by the prior art as shown in FIG. 56 is omitted.

In the case of optimal fuel flow control, as shown in FIG. 60, the optimal operation decision means 5602 decides the optimal second fuel flow X2* (5901) according to Formula 1 and outputs it to a second fuel flow control means 5905. The second fuel flow control means 5905 outputs a second fuel flow control output 5907 to the second fuel control valve 5615 for controlling so that a second fuel control valve fuel flow 5906 becomes equal to the decided optimal second fuel flow 5901.

On the other hand, a turbine exhaust pressure control means 5902 sends a turbine exhaust pressure control output 5904 to the control valve 5612 and controls a pressure 5903 of the turbine exhaust 5623 by performing the up- or down-operation for the control valve 5612.

However, this method changes the output of the generator 5614 by the flow of the steam load 5627 used by the steam load facility 5617. Namely, when the flow of the steam load 5627 increases (decreases), the steam pressure of the steam header 5624 and then that of the turbine exhaust 5623 decrease (increase). The turbine exhaust pressure control means 5902 performs the up- (down-) operation for the control valve 5612 so as to increase (decrease) the decreased (increased) steam pressure, and thereby the flow of the turbine inlet steam 5622 increases (decreases).

The increase (decrease) of the flow of the steam increases (decreases) the drive torque of the generator 5614, and thereby increases (decreases) the output of the generator 5614. Namely, when the flow of the steam load 5627 increases (decreases), the output of the generator 5614 increases (decreases).

However, there is a case when it is necessary to generate power within a fixed tolerance, for example, on a power contract, regardless of the flow of the steam load 5627. In this case, if the steam load 5627 is changed, it is desirable to absorb the change by the second boiler 5616. Therefore, when the system shown in FIG. 60 is used, the output of the generator 5614 is controlled by the steam load 5627 of the steam load facility 5617. As a result, the generator 5614 cannot be operated within a fixed tolerance regardless of the steam load 5627.

The prior art shown in FIG. 61 can control the steam pressure of the steam header 5624, according to the priority decided for the turbine exhaust pressure control means 5902 and the second boiler steam pressure control means 5607. But the manual operation as explained above is necessary and a burden is placed on a user.

Next, a problem of the conventional coordinate system where there are a plurality of optimal operating points will be explained by referring to FIG. 57. In FIG. 57, the optimal operation decision means 5602 decides a plurality of optimal operating points, that is, a first fuel control optimal gain 5710, - - -, an i-th fuel control optimal gain 5711, - - -, and an n-th fuel control optimal gain 5740 by Formulas 2 and 3.

It is assumed that, for example, among n boilers, the efficiency of the i-th (i=1, - - -, n) boiler is high (low). In this case, the i-th boiler generates much (less) steam Yi at a lower fuel flow X1 according to Formula 2, and the gain $\alpha i$ of the boiler increases (decreases) according to Formula 3. Therefore, an efficient (inefficient) boiler produces a larger (smaller) control gain.

Generally, the load change of a device is limited. For example, in a drum boiler, the maximum change rate of the generated steam flow is decided by the evaporation amount from water to steam per hour, which is decided by the physical volume of the evaporation drum.

Let the maximum values of the change rates corresponding to the respective outputs (5715 to 5741) of the first gain unit 5703 to the n-th gain unit 5730 which are decided by such limitation of the change rate be evenly assumed as Rmax. Further, in consideration of that each boiler (5611 to 5732) is controlled by a common fuel master 5714, the fuel control optimal gains 5710, - - -, and 5740 decided by the optimal operation decision means 5602 are assumed as $\alpha 1^*$, - - -, and $\alpha n^*$. It is further assumed that among $\alpha 1^*$, - - -, and $\alpha n^*$, the maximum gain is $\alpha i^*$. Here, a following Formula 4 is held, which is composed of Formulas (4–1) to (4–n).

Formula 4

$$\alpha i^* \geq \alpha 1^* \quad (4\text{-}1)$$

$$\alpha i^* \geq \alpha n 1^* \quad (4\text{-}n)$$

As the total maximum output change rate RTmax is restricted by the maximum gain $\alpha i^*$, so that a following Formula 5 is held:

$$\text{RTmax} = \text{Rmax} \times ((\alpha 1^*/\alpha i^*) + \text{- - -} + (\alpha i^*/\alpha i^*) + \text{- - -} + (\alpha n^*/\alpha i^*)) \quad (5)$$

A following Formula 6 is obtained from Formulas 4 and 5.

$$\text{RTmax} \leq \text{Rmax} \times n \quad (6)$$

The equal sign (condition for that the left side is equal to the right side) of Formula 6 is held only when a following Formula 7 is held.

$$\alpha 1^* = \text{- - -} = \alpha i = \text{- - -} = \alpha n^* \quad (7)$$

From the aforementioned, in the conventional example, the total maximum output change rate RTmax is restricted by the maximum gain $\alpha i^*$, so that it may be smaller than n times the change rate Rmax (n×Rmax) (when Formula 7 is not held). When the total maximum output change rate RTmax is reduced, a problem arises that the tracking capability of the control system 5600 to the change of the steam load 5627 decreases.

Next, the conventional preparation of process operation characteristic function parameters is made by manual calculation or by the automatic preparation by the means shown in FIG. 58. In the case of manual preparation, problems such as a burden of a preparer and a preparation error by a preparer are imposed.

The problem on automatic preparation will be explained by referring to FIG. 59. The detail of FIG. 34, to which FIG. 59 corresponds, will be explained later. Accordingly, the detailed explanation of FIG. 59 is omitted here. In FIG. 59, for example, when the process operation is continued so that the process input X1 of the operating point is kept within a division 2 (B1<X1≦B2), the process operation data 3011 older in time is erased by the process operation data erasing means 5804. As a result, only the process operation data (X, Y) in the division 2 finally remain as shown in FIG. 59. Here, (X, Y) indicates paired process operation data.

In this case, the process operation characteristic function generation means 3003 generates parameters of the process operation characteristic function 5904 in all the divisions (divisions 1, 2, 3) using only the process operation data 3011 in a certain limited division (division 2), so that a problem arises that the accuracy of the process operation characteristic function 5904 to be generated is reduced.

SUMMARY OF THE INVENTION

Accordingly, one object of this invention is to provide a process control system which can control a process to be controlled stably with a good response, while the control output of the fast response can be controlled at the optimal operating point.

Another object of this invention is to provide a process control system which can control a process to be controlled stably with a good response in accordance with an optimal priority, while the higher-priority control output is controlled toward the upper limit on a priority basis and the lower-priority control output is controlled toward the lower limit on a priority basis in accordance with the optimal priority.

Another object of this invention is to provide a process control system in which the process operation characteristic function for deciding the optimal priority and/or the optimal operating point can be automatically generated precisely with a given storage capacity for storing the process operation data, and thereby the burden for preparing the process operation characteristic function imposed on an operator can be lightened.

Still another object of this invention is to provide a process control system which can control stably a process to be controlled in accordance with the optimal operating point and/or the optimal priority decided based on the generated process operation characteristic function, with a good response.

A further object of this invention is to provide a process control system in a general control system in which an optimal operating point is converted to a minor loop bias value, and thereby the control gain of the minor loop is not reduced, which can control stably a process to be controlled in proportion to the optimal operating point with a good response.

These and other objects of this invention can be achieved by providing a process control system in a multi-input/output coordinate control system including a main input for executing coordinate control of the main input. The process control system includes, operating point setting means for setting an operating point set value for an operating point of an n-th control output of fast response to the main input, n-th output control means for generating the n-th control output of fast response to control the main input based on the n-th control output, and m-th output control means for generating an m-th control output to control the operating point of the n-th control output so that the operating point of the n-th control output becomes equal to the operating point set value set in the operating point setting means based on the m-th control output, thereby to allow the n-th control output of fast response to operate at the operating point set value by controlling the main input.

According to one aspect of this invention, there is provided a process control system in a multi-input/output coordinate control system including a main input for executing coordinate control of the main input. The process control system includes, higher-priority output control means for generating a higher-priority output to control the main input based on the higher-priority output, lower-priority output control means for generating a lower-priority output to control the main input based on the lower-priority output, lower-priority output block means for blocking the lower-priority output so as to prevent the higher-priority output from reducing before the higher-priority output reaches an upper limit value, and higher-priority output block means for blocking the higher-priority output so as to prevent the lower-priority output from increasing before the lower-priority output of reaches a lower limit value, thereby to control the higher-priority output toward the upper limit value on a priority basis and the lower-priority output toward the lower limit value on a priority basis, while executing coordinate control of the main input.

According to another aspect of this invention, there is provided a process control system including process data input means for inputting process data input from a process to be controlled, a process operation data storage unit for storing process operation data dispersedly, process operation data storage means for storing dispersedly the process data input inputted by the process data input means in the process operation data storage unit as the process operation data, and an optimization model storage unit for storing an optimization model necessary to decide an optimal operating point for process operation or an optimal control priority. The optimization model includes a process operation characteristic function indicating a mutual relationship between the process operation data. The process control system further includes optimal operation decision means for inputting the process data input from the process data input means and for deciding the optimal operating point for the process operation or the optimal control priority based on the inputted process data input and the optimization model stored in the optimization model storage unit, process operation data dispersion erasing means for erasing the process operation data dispersedly on a priority basis, which is old in time, depending on a size of the process operation data among the process operation data stored in the process operation data storage unit, and process operation characteristic function generation means for generating a process operation characteristic function parameter based on the process operation data stored in the process operation data storage unit, and for updating the process operation characteristic function included in the optimization model stored in the optimization model storage unit by the generated process operation characteristic function parameters, thereby to generate the process operation characteristic function necessary to decide the optimal operating point for the process operation by the process operation data recently dispersedly stored in the process operation data storage unit.

According to still another aspect of this invention, there is provided a process control system in a general control system for controlling a plurality of minor loops composed of master value generation means for generating a master value by deviation integration of a process value of main input and a set value for the main input, a plurality of bias setting means for generating bias values corresponding to each minor control loops, respectively and a plurality of addition-subtraction means for generating addition-subtraction results of the master value, minor inputs from the process and the bias values as instruction values for minor outputs of the minor control loops, respectively. The process control system includes an optimization model storage unit for storing an optimization model necessary to decide an optimal operating point for process operation, optimal operation decision means for inputting process data input and for deciding an optimal operating point based on the inputted process data input and the optimization model stored in the optimization model storage unit, and bias conversion means for converting the decided optimal operating point to optimal bias values and for outputting the converted optimal bias values to the bias setting means to give the optimal bias values as the bias values, respectively, thereby controlling the main input without reducing a control gain thereof.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
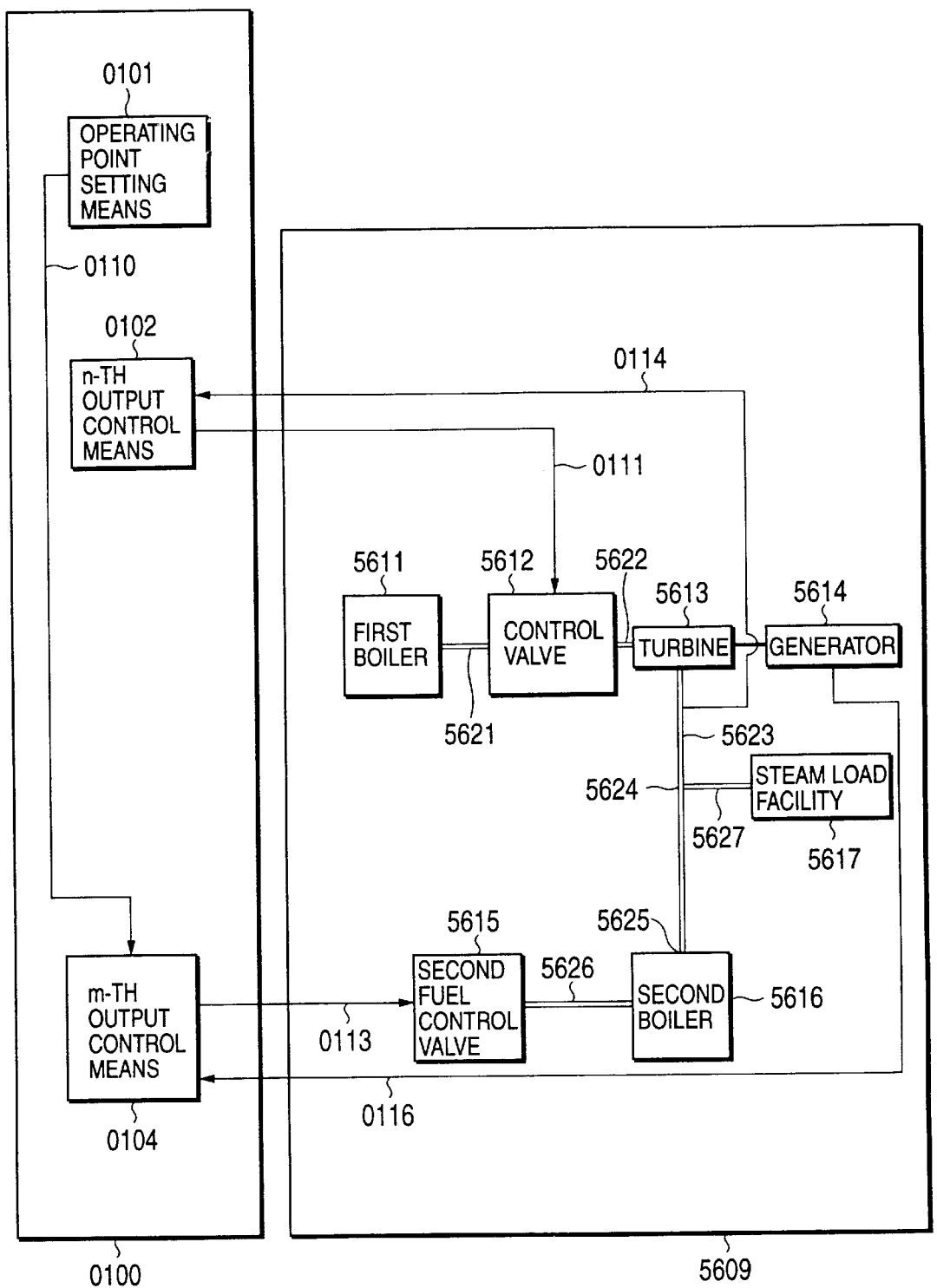
FIG. 1 is a block diagram showing a process control system according to a first embodiment of the present invention.

Referring now to the drawings, wherein like reference numerals designate identical or corresponding parts throughout the several views, the embodiments of the present invention will be described below.

First Embodiment

FIG. 1 is a block diagram showing a process control system according to a first embodiment of the present invention. In FIG. 1, a process control system 0100 according to this embodiment of the present invention is composed of an n-th output operating point setting means 0101, an n-th output control means 0102, and an m-th output control means 0104. An n-th output operating point set value 0110 set by the n-th output operating point setting means 0101 is input to the m-th output control means 0104. The m-th output control means 0104 inputs an n-th control output operating point 0116 from the generator 5614 and outputs an m-th control output 0113 to the second fuel control valve 5615. The n-th output control means 0102 inputs a main input 0114 from the turbine exhaust 5623 and outputs an n-th control output 0111 to the control valve 5612.

The main input 0114 is a main process input which can be directly controlled by the n-th control output 0111 and the m-th control output 0113. The main input 0114 in this embodiment is the steam pressure of the steam header 5624.

In this embodiment, the steam pressure of the steam header 5624 is assumed to be equivalent to that of the turbine exhaust 5623. The n-th control output operating point 0116 is the output of the generator 5614. Generally, when the steam pressure of the first boiler outlet 5621 and the steam pressure of the turbine exhaust 5623 are given, the output of the generator 5614 is decided based on the opening of the control valve 5612. Further, when the output of the generator 5614 is decided, the opening of the control valve 5612 is decided, and the operating point of the n-th control output 0111 of the n-th output control means 0102 is decided.

Figure 2:
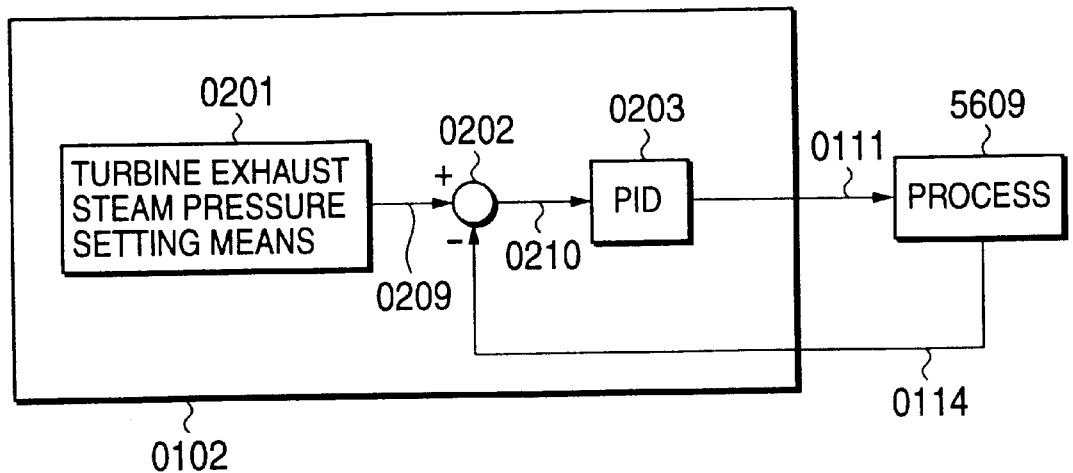
FIG. 2 is a block diagram showing the n-th output control means of the first embodiment.
Figure 4:
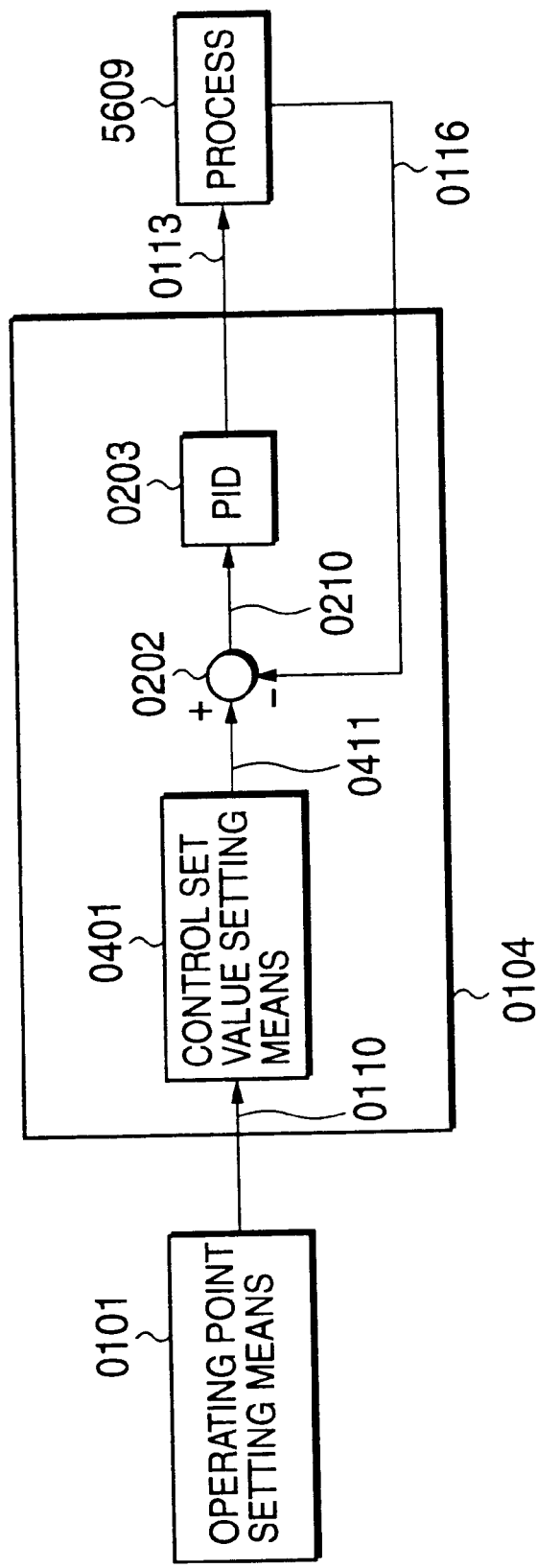
FIG. 4 is a block diagram showing the m-th output control means of the first embodiment.

FIGS. 2 and 4 are prepared for the explanation of the operations of the n-th output control means 0102 and the m-th output control means 0104, respectively. In FIG. 2, the n-th output control means 0102 outputs the n-th control output 0111 to the process 5609, that is, the control valve 5612 for controlling so that the main input 0114 inputted from the process 5609, that is, the steam pressure of the turbine exhaust 5623 becomes equal to a turbine exhaust steam pressure set value 0209 set by a turbine exhaust steam pressure setting means 0201. An adder 0202 calculates a deviation 0210 between the turbine exhaust steam pressure set value 0209 and the main input 0114, and a PID processor 0203 calculates the amount of the n-th control output 0111 so as to bring the deviation 0210 close to zero.

In FIG. 4, the operating point set value 0110 set by the n-th operating point setting means 0101 is output to a control set value setting means 0401 of the m-th output control means 0104. The m-th output control means 0104 outputs the m-th control output 0113 to the process 5609, that is, the second fuel control valve 5615 for controlling so that the n-th control output operating point 0116 input from the process 5609, that is, the output of the generator 5614 becomes equal to a control set value 0411 set by the control set value setting means 0401, that is, the n-th output operating point set value 0110 set by the n-th output operating point setting means 0101, and controls the n-th control output operating point 0116.

In FIG. 4, the adder 0202 calculates the deviation 0210 between the control set value 0411 and the n-th control output operating point 0116, and the PID processor 0203 calculates the amount of the m-th control output 0113 so as to bring the deviation 0210 close to zero.

Figure 3:
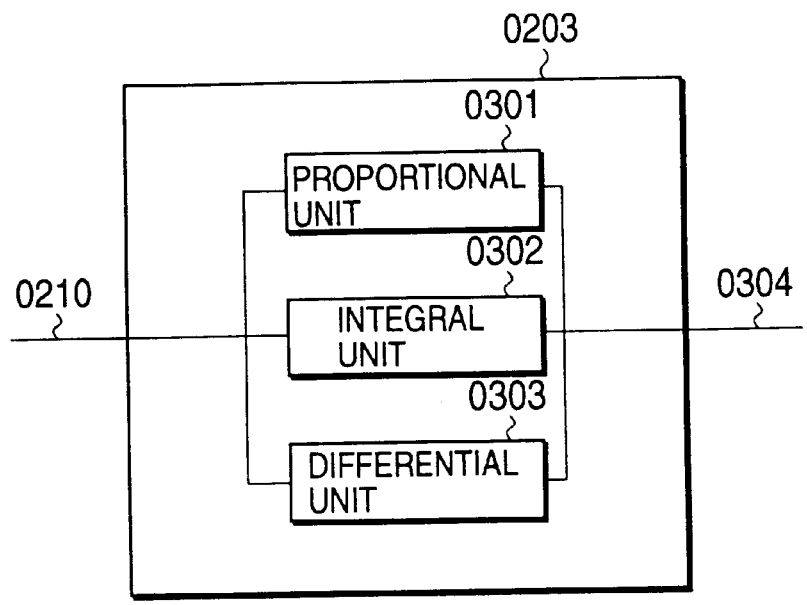
FIG. 3 is a block diagram showing the PID processor of the first embodiment.

The construction of the PID processor 0203 is shown in FIG. 3. In FIG. 3, the PID processor 0203 is composed of a proportional unit 0301, an integral unit 0302, and a differential unit 0303, and the amount of PID processor control output 0304 is calculated by the operations of proportion (P), integration (I), and differentiation (D) so as to bring the deviation 0210 close to zero.

In FIG. 2 and in FIG. 4, PID processor control output 0304 corresponds to the n-th control output 0111 and the m-th control output 0113, respectively.

In this way, the m-th output control means 0104 controls so that the n-th control output operating point 0116 of the n-th output control means 0102 of the fast response to the main input 0114 becomes equal to the output operating point set value 0110. As a result, the n-th output control means 0102 of the fast response to the main input 0114 can execute the process control of the good response while keeping the desired operating point.

By doing this, the n-th output control means 0102 can execute the steam pressure control of the good response for the steam header 5624 while keeping the output of the generator 5614, that is, the operating point of the n-th output control means 0102 at the desired output value. Since it is desired to supply the steam at the stable steam pressure to the steam load facility 5617, this embodiment of the present invention produces an effect of supplying stable steam pressure under the control of the good response while keeping the desired operating point.

Modified Example

In the embodiment shown in FIG. 1, the output of the generator 5614 is used as the n-th control output operating point 0116, and is inputted to the m-th output control means 0104. The n-th output operating point set value 0110 set by the n-th output operating point setting means 0101 is the output set value of the generator 5614.

Figure 5:
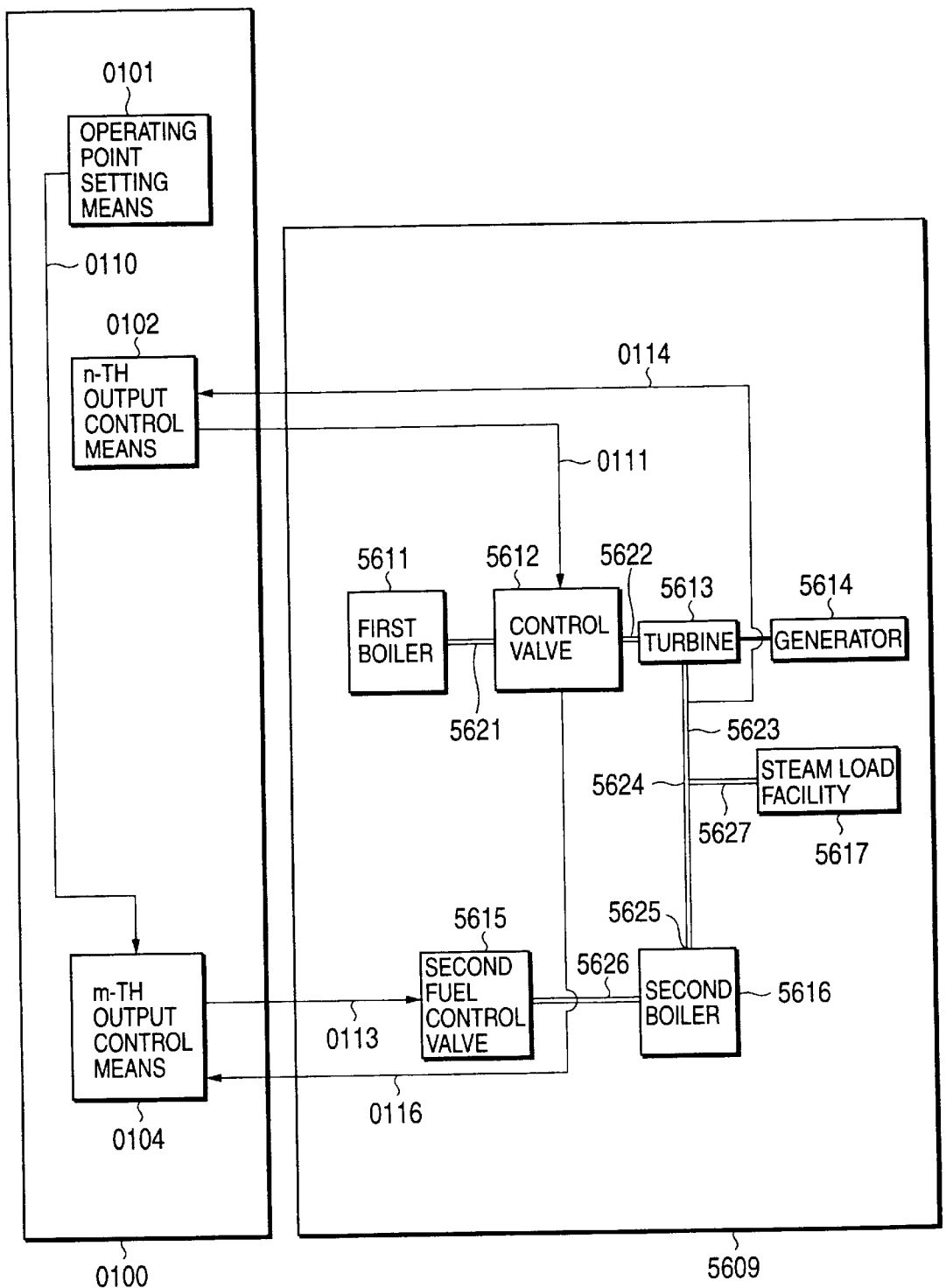
FIG. 5 is a block diagram showing a modified example of the first embodiment.

A modified example thereof is shown in FIG. 5.

In FIG. 5, an opening of the control valve 5612 is used as the n-th control output operating point 0116, and is inputted to the m-th output control means 0104. The n-th output operating point set value 0110 set by the n-th output operating point setting means 0101 is an opening set value of the control valve 5612. The m-th output control means 0104 controls the control valve 5612 so that the opening of the control valve 5612 becomes equal to the opening set value of the control valve 5612 set by the n-th output operating point setting means 0101.

In this modified example, the n-th output control means 0102 can execute the steam pressure control of the good response for the steam header 5624 while keeping the opening of the control valve 5612, that is, the operating point 0116 of the n-th output control means 0102 at the desired output value.

Generally, when the steam pressure of the first boiler outlet 5621 and that of the turbine exhaust 5623 are given, as the output of the generator 5614 is decided based on the opening of the control valve 5622, by keeping the opening of the control valve 5612 at the desired set value, the output of the generator 5614 can be kept almost at the desired output. Since the output of the generator 5614 is changed after the opening of the control valve 5612 is changed, when the opening of the control valve 5612 is used as the operating point of the n-th output control means 0102, an effect can be produced that the change in the operating point can be detected faster, and little control delay occurs, and thus a more stable process control system can be provided.

Second Embodiment

Figure 6:
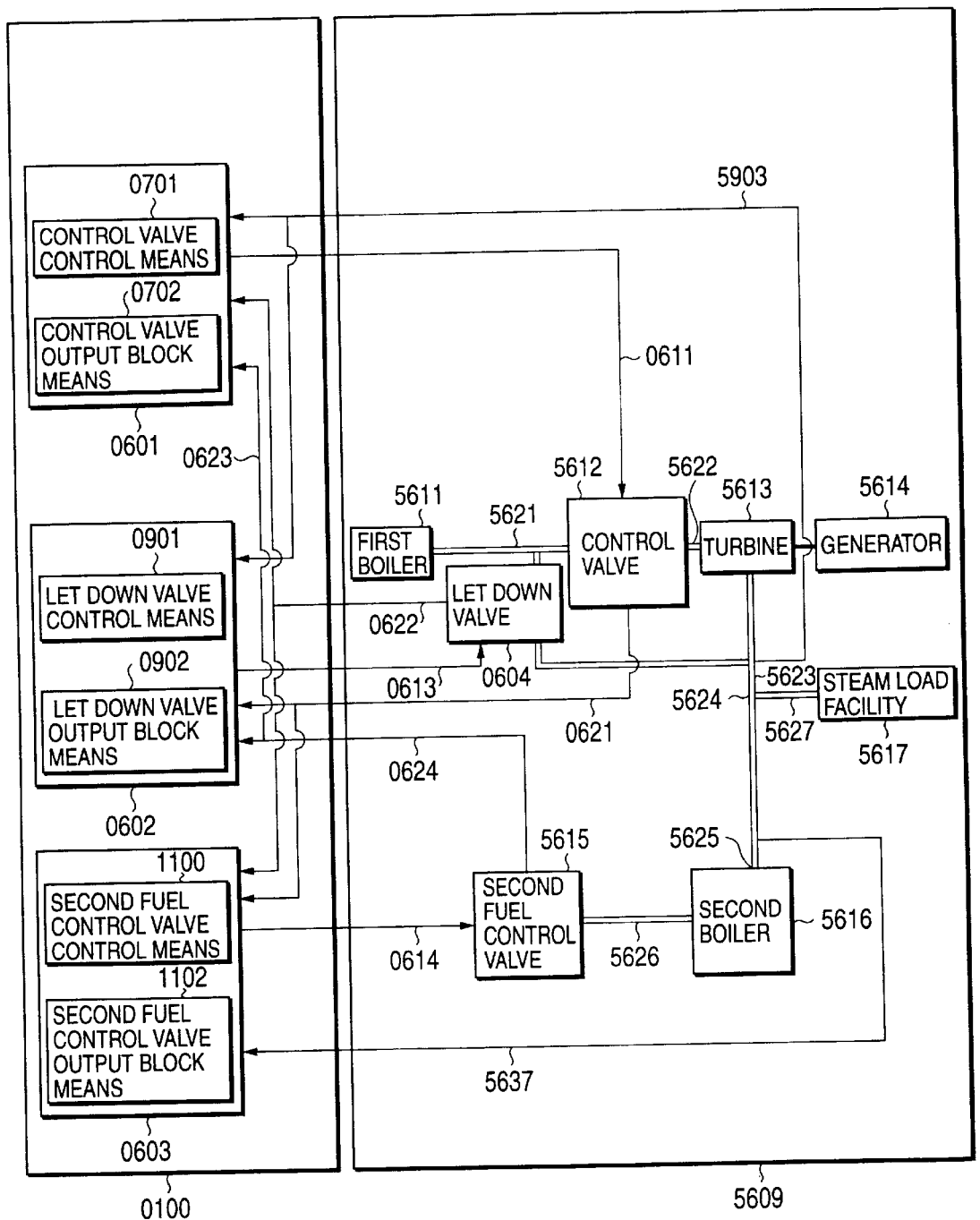
FIG. 6 is a block diagram showing a process control system according to a second embodiment of the present invention.

FIG. 6 is a block diagram showing a process control system according to a second embodiment of the present invention. In FIG. 6, a process control system 0100 according to this embodiment of the present invention is composed of a control valve control subsystem 0601, a second fuel control valve subsystem 0603, and a let down valve control subsystem 0602. The control valve control subsystem 0601 is composed of a control valve control means 0701 and a control valve output block means 0702, and the second fuel control valve subsystem 0603 is composed of a second fuel control valve control means 1100 and a second fuel control valve output block means 1102, and the let down valve control subsystem 0602 is composed of a let down valve control means 0901 and a let down valve output block means 0902.

Figure 13:
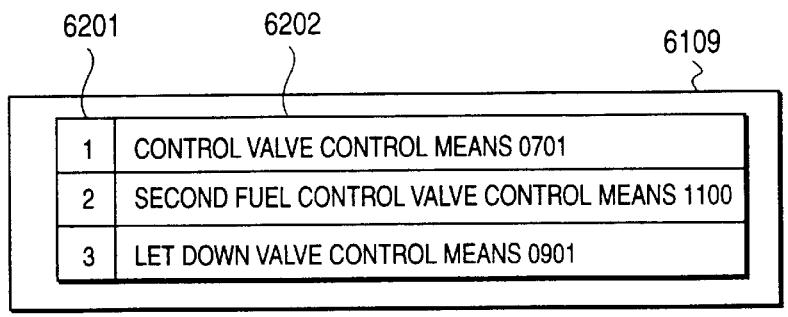
FIG. 13 is a schematic view showing the priority set value of the second embodiment.

The priority of control means (0701, 1100, 0901) is shown in FIG. 13. In FIG. 13, a control means indicated in the control means section 6202 corresponding to a lower number indicated in the priority level section 6201 is an output control means of higher priority. A control means indicated in the control means section 6202 corresponding to a higher number indicated in the priority level section 6201 is an output control means of lower priority. Namely, the control valve control means 0701 is an output control means of higher priority than those of the second fuel control valve control means 1100 and the let down valve control means 0901. The second fuel control valve control means 1100 is an output control means of lower priority than that of the control valve control means 0701 and of higher priority than that of the let down valve control means 0901. The let down valve control means 0901 is an output control means of lower priority than those of the control valve control means 0701 and the second fuel control valve control means 1100.

Figure 7:
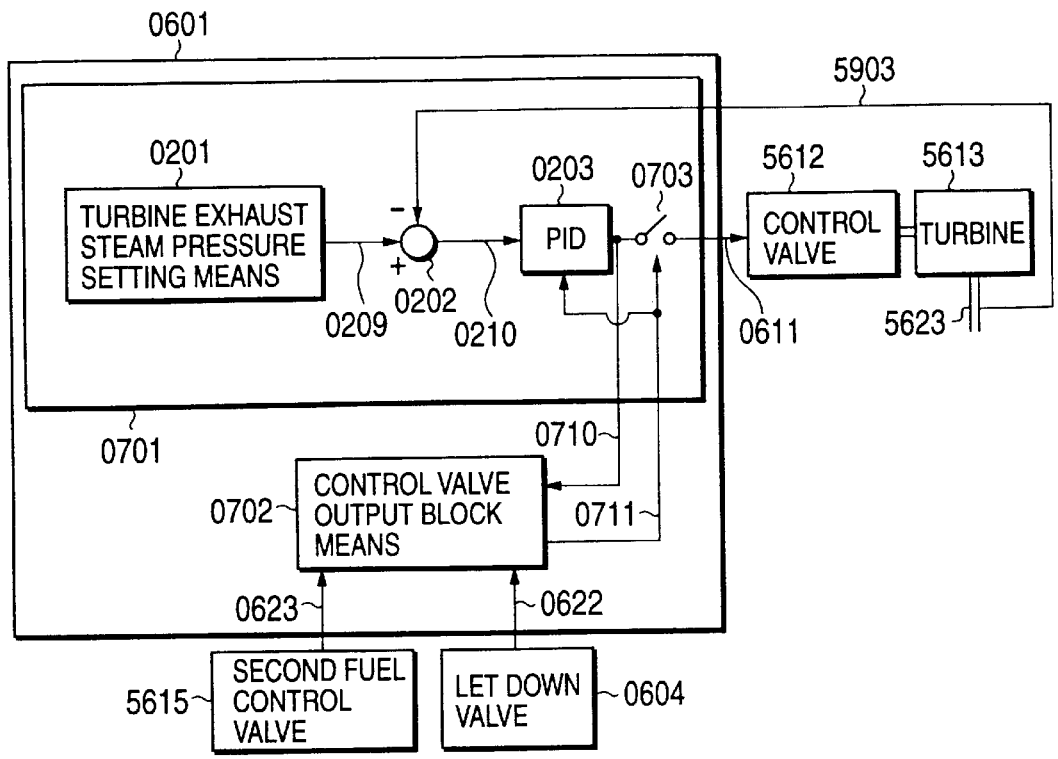
FIG. 7 is a block diagram showing the control valve subsystem of the second embodiment.

As shown in FIG. 7, the control valve control means 0701 is composed of the turbine exhaust steam pressure setting means 0201, the adder 0202, the PID processor 0203, and an output block switch 0703.

Figure 8:
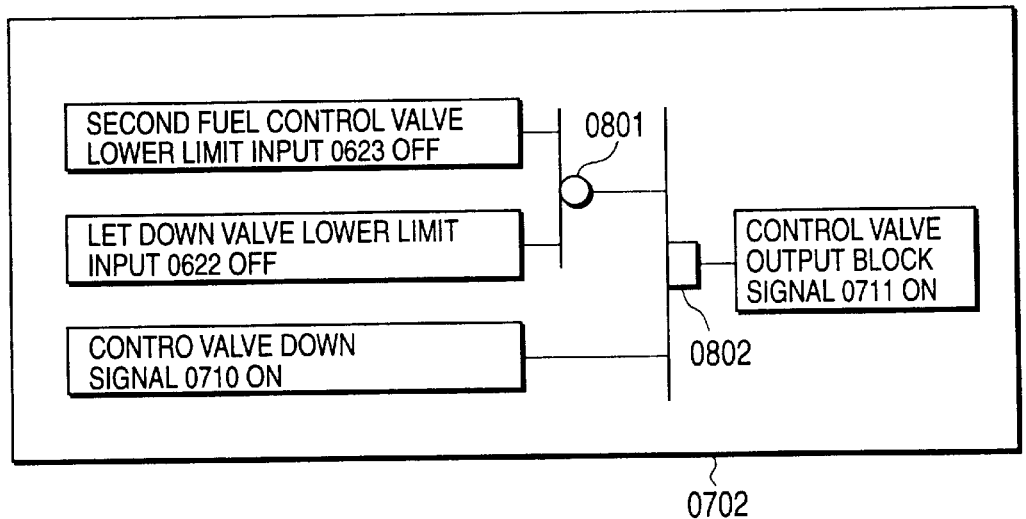
FIG. 8 is a logic diagram showing the control valve output block means of the second embodiment.

The control conditions of the control valve output block means 0702 are shown in FIG. 8.

Figure 9:
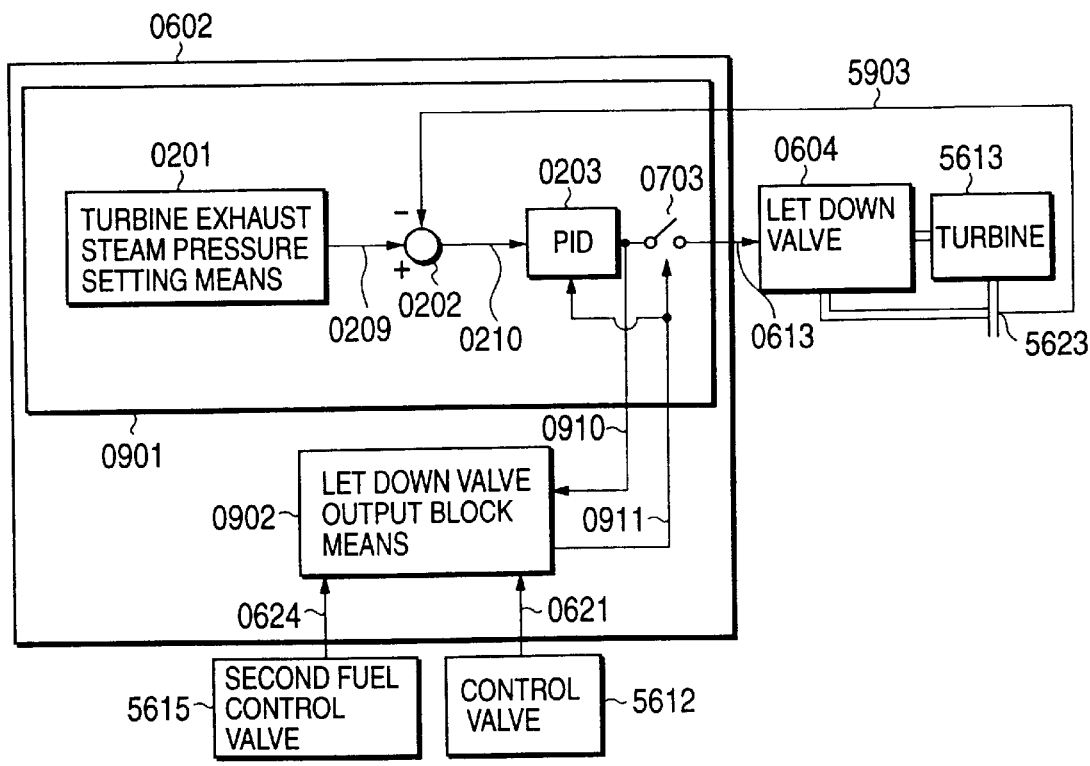
FIG. 9 is a block diagram showing the let down valve control subsystem of the second embodiment.

As shown in FIG. 9, the let down valve control means 0901 is composed of the turbine exhaust steam pressure setting means 0201, the adder 0202, the PID processor 0203, and the output block switch 0703.

Figure 10:
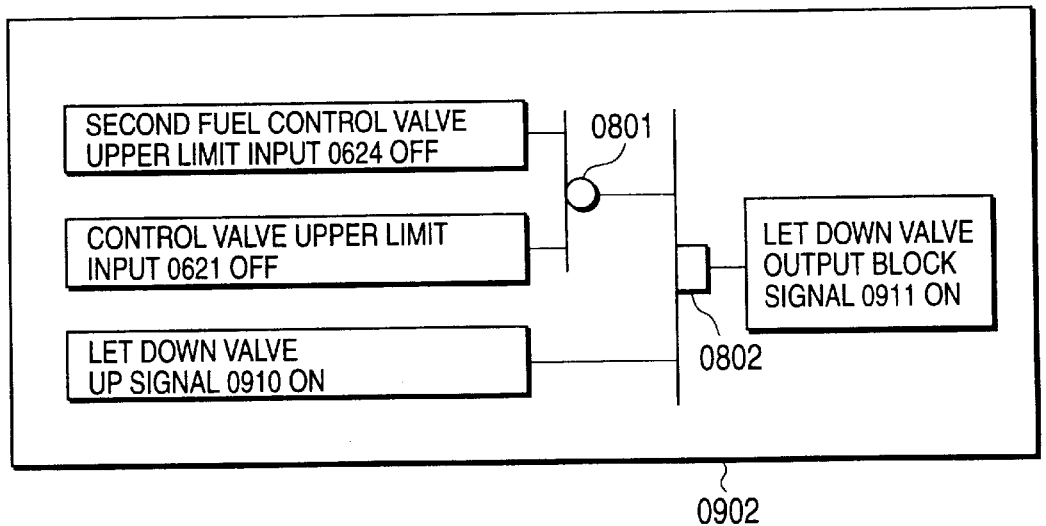
FIG. 10 is a block diagram showing the let down valve output block means of the second embodiment.

The control conditions of the let down valve output block means 0902 are shown in FIG. 10.

Figure 11:
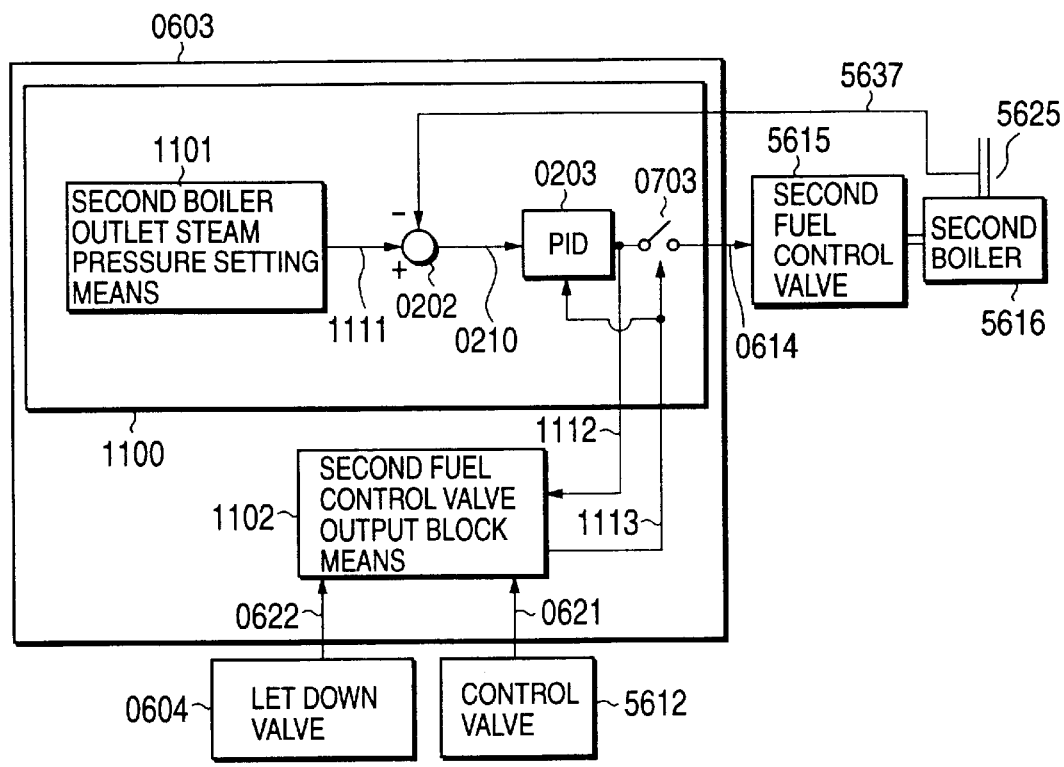
FIG. 11 is a block diagram showing the second fuel control valve subsystem of the second embodiment.

As shown in FIG. 11, the second fuel control valve control means 1100 is composed of a second boiler outlet steam pressure setting means 1101, the adder 0202, the PID processor 0203, and the output block switch 0703.

Figure 12:
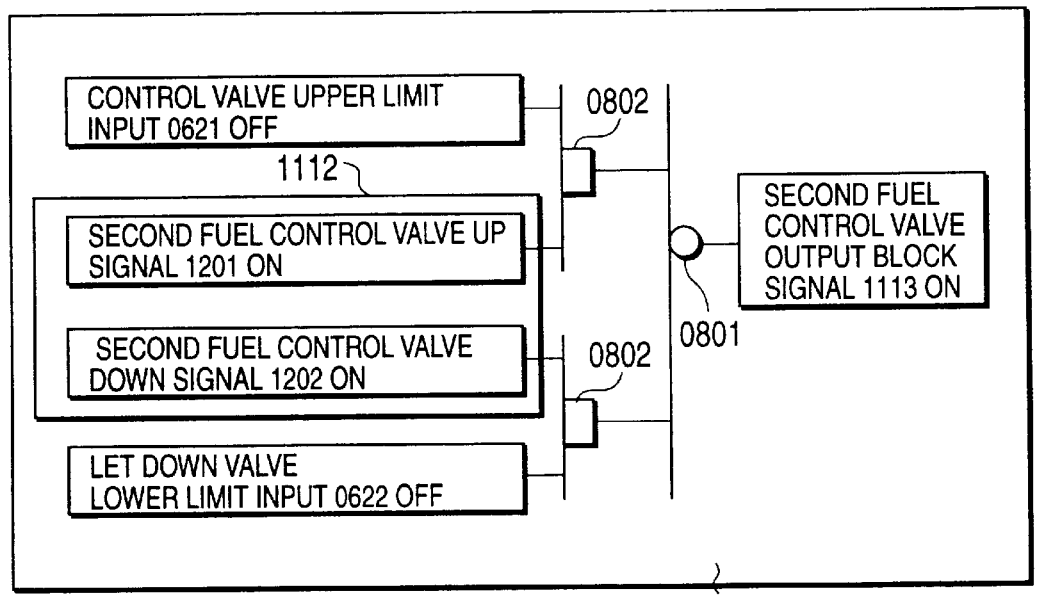
FIG. 12 is a logic diagram showing the second fuel control valve output block means of the second embodiment.

The control conditions of the second fuel control valve output block means 1102 are shown in FIG. 12.

The operation of this embodiment will be explained hereunder. In FIG. 7, the control valve control means 0701, when the output block switch 0703 is closed, outputs the control valve control output 0611 to the control valve 5612 for controlling so that the main input inputted from the turbine exhaust 5623, that is, the turbine exhaust pressure 5903 becomes equal to the turbine exhaust steam pressure set value 0209 set by the turbine exhaust steam pressure setting means 0201.

The adder 0202 calculates the deviation 0210 between the turbine exhaust steam pressure set value 0209 and the turbine exhaust pressure 5903, and the PID processor 0203 calculates the amount of-the control valve control output 0611 SO as to bring the deviation 0210 close to zero. When the output block switch 0703 is opened, the control valve control output 0611 from the control valve control means 0701 to the control valve 5612 is blocked.

In FIG. 8, 0801 is an OR circuit and 0802 is an AND circuit. As shown in FIG. 8, when any one of a second fuel control valve lower limit input 0623 and a let down valve lower limit input 0622 is off and a control valve down signal 0710 is on, the control valve output block means 0702 turns a control valve output block signal 0711 on, and in another case, it turns the control valve output block signal 0711 off. When the control valve output block signal 0711 shown in FIG. 8 is turned on, in FIG. 7, the control valve output block means 0702 outputs the turned-on control valve output block signal 0711 to the output block switch 0703, and opens the output block switch 0703 so as to block the control valve control output 0611 from the control valve control means 0701 to the control valve 5612. Furthermore, the control valve output block means 0702 outputs the turned-on control valve output block signal 0711 to the PID processor 0203, so as to hold the integration operation (FIG. 3) of the PID processor 0203 to prevent it from the excessive integration.

Further, when the control valve output block signal 0711 shown in FIG. 8 is turned off, in FIG. 7, the control valve output block means 0702 outputs the turned-off control valve output block signal 0711 to the output block switch 0703, and closes the output block switch 0703 so as to output the control valve control output 0611 from the control valve control means 0701 to the control valve 5612 as it is without blocking. Furthermore, the control valve output block means 0702 outputs the turned-off control valve output block signal 0711 to the PID processor 0203, so as to cancel the holding of the integration operation (FIG. 3) of the PID processor 0203.

In FIG. 9, the let down valve control means 0901, when the output block switch 0703 is closed, outputs the let down valve control output 0613 to a let down valve 0604 for controlling so that the main input inputted from the turbine exhaust 5623, that is, the turbine exhaust pressure 5903 becomes equal to the turbine exhaust steam pressure set value 0209 set by the turbine exhaust steam pressure setting means 0201.

The adder 0202 calculates the deviation 0210 between the turbine exhaust steam pressure set value 0209 and the turbine exhaust pressure 5903, and the PID processor 0203 calculates the amount of the let down valve control output 0613 so as to bring the deviation 0210 close to zero. When the output block switch 0703 is opened, the let down valve control output 0613 from the let down valve control means 0901 to the let down valve 0604 is blocked.

As shown in FIG. 10, when any one of a second fuel control valve upper limit input 0624 and a control valve upper limit input 0621 is off and a let down valve up signal 0910 is on, the let down valve output block means 0902 turns a let down valve output block signal 0911 on, and in another case, it turns the let down valve output block signal 0911 off. When the let down valve output block signal 0911 shown in FIG. 10 is turned on, in FIG. 9, the let down valve output block means 0902 outputs the turned-on let down valve output block signal 0911 to the output block switch 0703, and opens the output block switch 0703 so as to block the let down valve control output 0613 from the let down valve control means 0901 to the let down valve 0604. Furthermore, the let down valve output block means 0902 outputs the turned-on let down valve output block signal 0911 to the PID processor 0203, so as to hold the integration operation (FIG. 3) of the PID processor 0203 to prevent it from the excessive integration.

Further, when the let down valve output block signal 0911 shown in FIG. 10 is turned off, in FIG. 9, the let down valve output block means 0902 outputs the turned-off let down valve output block signal 0911 to the output block switch 0703, and closes the output block switch 0703 so as to output the let down valve control output 0613 from the let down valve control means 0901 to the let down valve 0604 as it is without blocking. Furthermore, the let down valve output block means 0902 outputs the turned-off let down valve output block signal 0911 to the PID processor 0203, so as to cancel the holding of the integration operation (FIG. 3) of the PID processor 0203.

In FIG. 11, the second fuel control valve control means 1100, when the output block switch 0703 is closed, outputs the second fuel control valve control output 0614 to the second fuel control valve 5615 for controlling so that the main input inputted from the second boiler outlet 5625, that is, the second boiler outlet steam pressure 5637 becomes equal to a second boiler outlet steam pressure set value 1111 set by a second boiler outlet steam pressure setting means 1101.

The adder 0202 calculates the deviation 0210 between the second boiler outlet steam pressure set value 1111 and the second boiler outlet steam pressure 5637, and the PID processor 0203 calculates the amount of the second fuel control valve control output 0614 so as to bring the deviation 0210 close to zero. When the output block switch 0703 is opened, the second fuel control valve control output 0614 from the second fuel control valve control means 1100 to the second fuel control valve 5615 is blocked.

As shown in FIG. 12, a second fuel control valve up and down signal 1112 shown in FIG. 11 is composed of a second fuel control valve up signal 1201 and a second fuel control valve down signal 1202. As shown in FIG. 12, when the control valve upper limit input 0621 is off and the second fuel control valve up signal 1201 is on, or when the second fuel control valve down signal 1202 is on and the let down valve lower limit input 0622 is off, a second fuel control valve output block means 1102 turns a second fuel control valve output block signal 1113 on, and in another case, it turns the second fuel control valve output block signal 1113 off.

When the second fuel control valve output block signal 1113 shown in FIG. 12 is turned on, in FIG. 11, the second fuel control valve output block means 1102 outputs the turned-on second fuel control valve output block signal 1113 to the output block switch 0703, and opens the output block switch 0703 so as to block the second fuel control valve control output 0614 from the second fuel control valve control means 1100 to the second fuel control valve 5615. Furthermore, the second fuel control valve output block means 1102 outputs the turned-on second fuel control valve output block signal 1113 to the PID processor 0203, so as to hold the integration operation (FIG. 3) of the PID processor 0203 to prevent it from the excessive integration.

Further, when the second fuel control valve output block signal 1113 shown in FIG. 12 is turned off, in FIG. 11, the second fuel control valve output block means 1102 outputs the turned-off second fuel control valve output block signal 1113 to the output block switch 0703, and closes the output block switch 0703 so as to output the second fuel control valve control output 0614 from the second fuel control valve control means 1100 to the second fuel control valve 5615 as it is without blocking. Furthermore, the second fuel control valve output block means 1102 outputs the turned-off second fuel control valve output block signal 1113 to the PID processor 0203, so as to cancel the holding of the integration operation (FIG. 3) of the PID processor 0203.

In the above explanation, each of the turbine exhaust pressure 5903 and the second boiler outlet steam pressure 5637 is the main input, and the pressure of each of them is controlled almost to its set value in the aforementioned embodiment.

In this case, it is assumed that, for example, the turbine exhaust steam pressure set value 0209 of the turbine exhaust steam pressure setting means 0201 and the second boiler outlet steam pressure set value 1111 of the second boiler outlet steam pressure setting means 1101 are 100 PSIG, respectively. It is also assumed that due to the pressure loss of the steam header 5624, the turbine exhaust pressure 5903 is high and the second boiler outlet steam pressure 5637 is low, and the difference between them is, for example, 5 PSIG. According to this embodiment, the turbine exhaust pressure 5903 and the second boiler outlet steam pressure 5637 are controlled within the range from 95 PSIG to 105 PSIG, and the higher-priority output is controlled toward the upper limit value on a priority basis and the lower-priority output is controlled toward the lower limit value.

As the detection points of the turbine exhaust pressure 5903 and the second boiler outlet steam pressure 5637 are brought near to each other, the pressure difference due to the pressure loss is reduced. When the pressure is detected by the same sensor, the turbine exhaust pressure 5903 and the second boiler outlet steam pressure 5637 are controlled to 100 PSIG, respectively.

In this way, in this embodiment, to prevent the output of the higher-priority output control means from decreasing before the output of the higher-priority output control means reaches the upper limit value, the output of the lower-priority output control means is blocked. Further, to prevent the output of the lower-priority output control means from increasing before the output of the lower-priority output control means reaches the lower limit value, the output of the higher-priority output control means is blocked. As a result, an effect is produced that the higher-priority output is controlled toward the upper limit value on a priority basis and the lower-priority output is controlled toward the lower limit value, while controlling the steam pressure.

Third Embodiment

Figure 14:
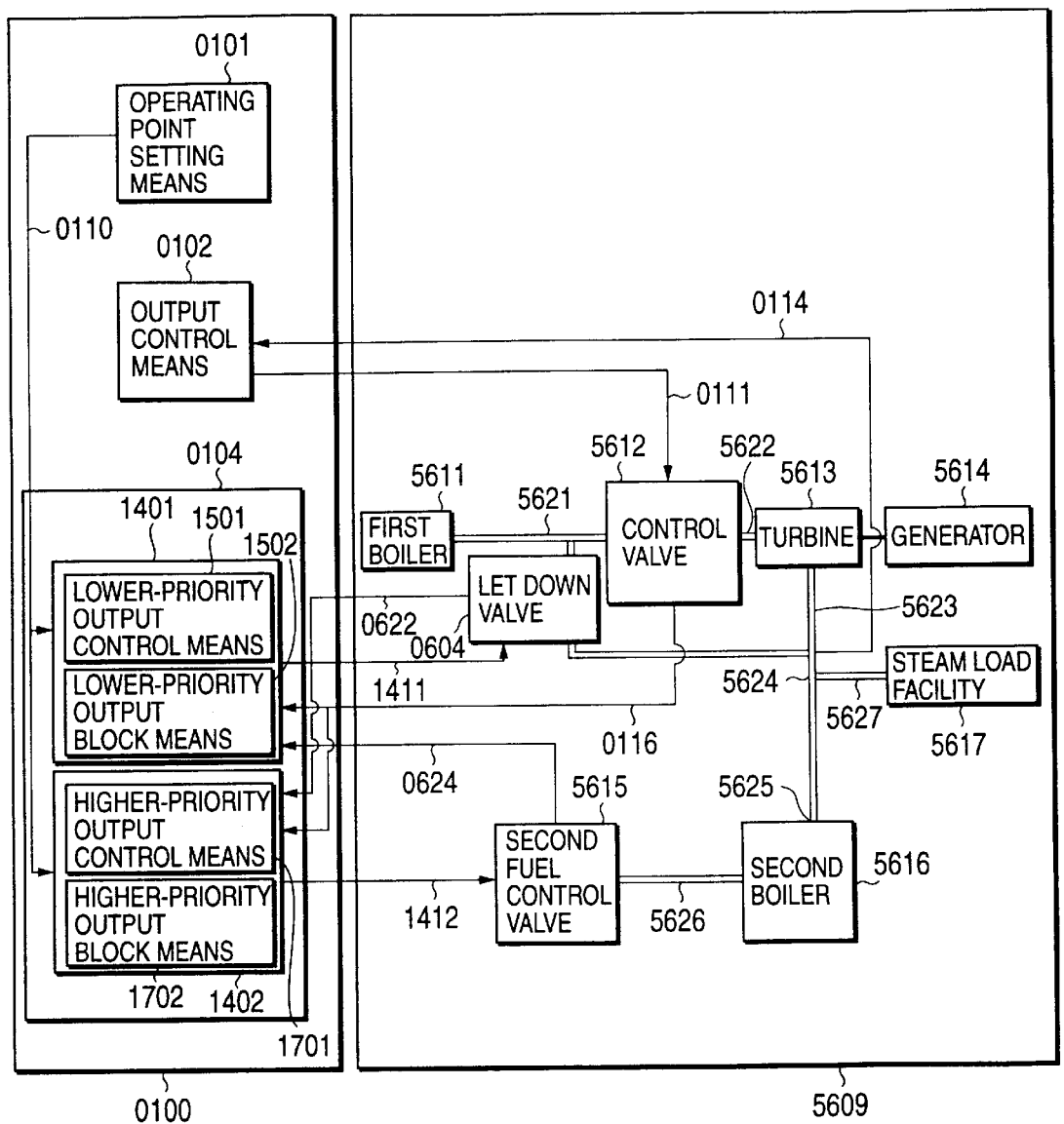
FIG. 14 is a block diagram showing a process control system according to a third embodiment of the present invention.

FIG. 14 is a block diagram showing a process control system according to a third embodiment of the present invention. In FIG. 14, a process control system 0100 according to this embodiment of the present invention is composed of the n-th output operating point setting means 0101, the n-th output control means 0102, and the m-th output control means 0104. The m-th output control means 0104 is composed of a lower-priority output control subsystem 1401 and a higher-priority output control subsystem 1402. The lower-priority output control subsystem 1401 is composed of a lower-priority output control means 1501 and a lower-priority output block means 1502. The higher-priority output control subsystem 1402 is composed of a higher-priority output control means 1701 and a higher-priority output block means 1702. Detailed constructions of the lower-priority output control means 1501, the lower-priority output block means 1502, the higher-priority output control means 1701, and the higher-priority output block means 1702 are shown in FIGS. 15, 16, 17, and 18, respectively.

The operation of this embodiment of the present invention will be explained hereunder. The n-th output control means 0102 shown in FIG. 14 corresponds to the n-th output control means 0102 of the first embodiment of the present invention shown in FIG. 1, and the detailed construction thereof is shown in FIG. 2. As explained in the first embodiment, the n-th output control means 0102 outputs the n-th control output 0111 to the control valve 5612 for controlling so that the steam pressure of the turbine exhaust 5623, that is, the main input 0114 becomes equal to the turbine exhaust steam pressure set value 0209 set by the turbine exhaust steam pressure setting means 0201.

The m-th output control means 0104 shown in FIG. 14 corresponds to the m-th output control means 0104 of the first embodiment of the present invention shown in FIG. 1, and controls so that the opening of the control valve 5612, that is, the n-th control output operating point 0116 becomes equal to the operating point set value 0110 set by the operating point setting means 0101. In the third embodiment shown in FIG. 14, the output of the m-th output control means 0104 is composed of a plurality of outputs having the priority including a lower-priority control output 1411 and a higher-priority control output 1412. The m-th output control means 0104 which generates a plurality of outputs having the priority like this embodiment corresponds to the second embodiment shown in FIG. 6.

In the second embodiment, there are provided three outputs having the priority, while two outputs having the priority are provided in the third embodiment. The m-th output control means 0104 which generates the two outputs having the priority, as shown in FIG. 14, is composed of the lower-priority output control means 1501 (FIG. 15), the lower-priority output block means 1502 (FIG. 16), the higher-priority output control means 1701 (FIG. 17), and the higher-priority output block means 1702 (FIG. 18). They correspond to the let down valve control means 0901 (FIG. 9), the let down valve output block means 0902 (FIG. 10), the second fuel control valve control means 1100 (FIG. 11), and the second fuel control valve output block means 1102 (FIG. 12), respectively, of the second embodiment (FIG. 6).

Figure 15:
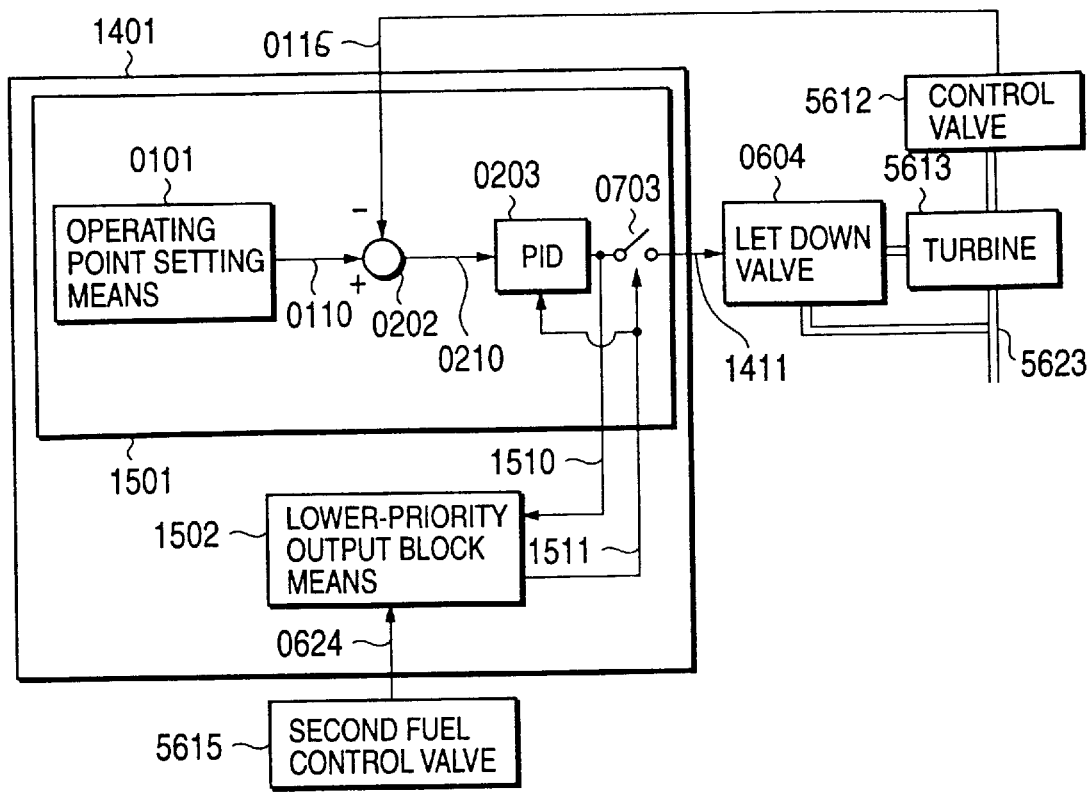
FIG. 15 is a block diagram showing the lower-priority output control subsystem of the third embodiment.

As shown in FIG. 15, the lower-priority output control means 1501 is composed of the operating point setting means 0101, the adder 0202, the PID processor 0203, and the output block switch 0703.

Figure 16:
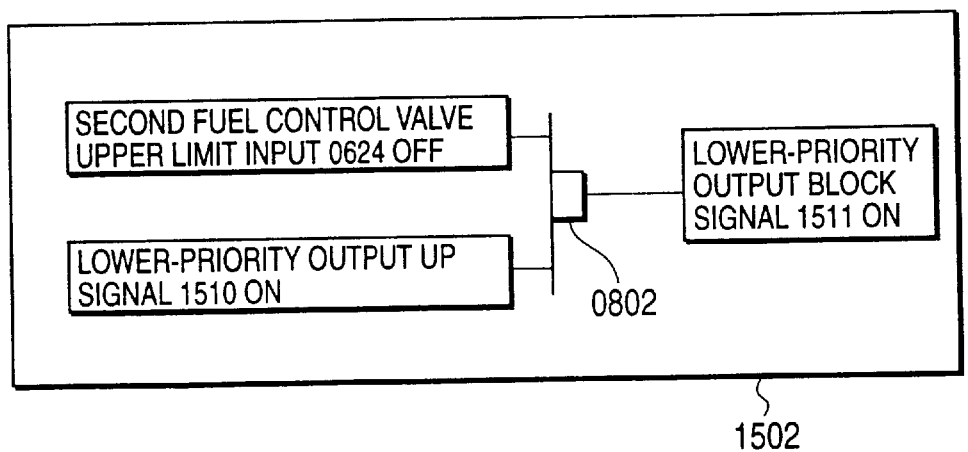
FIG. 16 is a logic diagram showing the lower-priority output block means of the third embodiment.

The control conditions of the lower-priority output block means 1502 are shown in FIG. 16.

As shown in FIG. 16, when the second fuel control valve upper limit input 0624 is off and a lower-priority output up signal 1510 is on, the lower-priority output block means 1502 turns a lower-priority output block signal 1511 on, and in another case, it turns the lower-priority output block signal 1511 off.

The lower-priority output block means 1502 outputs the turned on (or turned off) lower-priority output block signal 1511 to the PID processor 0203 and the output block switch 0703 in the lower-priority output control means 1501 shown in FIG. 15.

The operations of the lower-priority output control means 1501 and the lower-priority output block means 1502 are similar to those of the let down valve control means 0901 shown in FIG. 9 and the let down valve output block means 0902 shown in FIG. 10. Accordingly, the detailed description thereof can be omitted.

Figure 17:
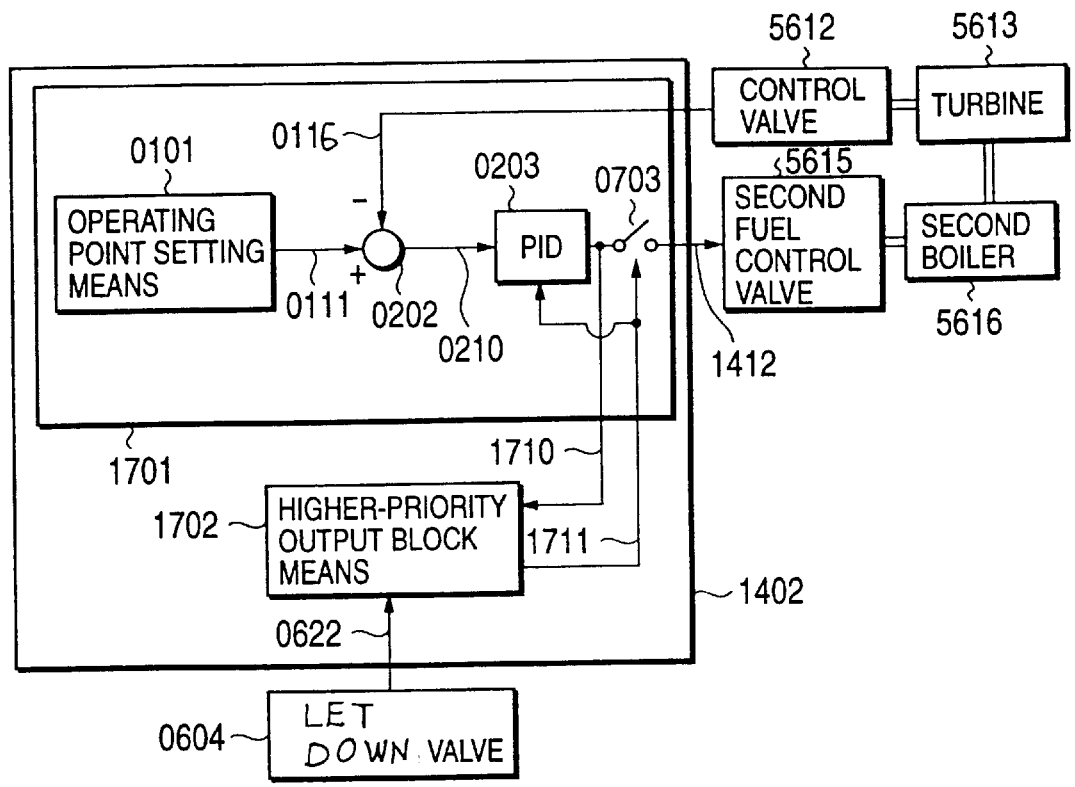
FIG. 17 is a block diagram showing the higher-priority output control subsystem of the third embodiment.
Figure 18:
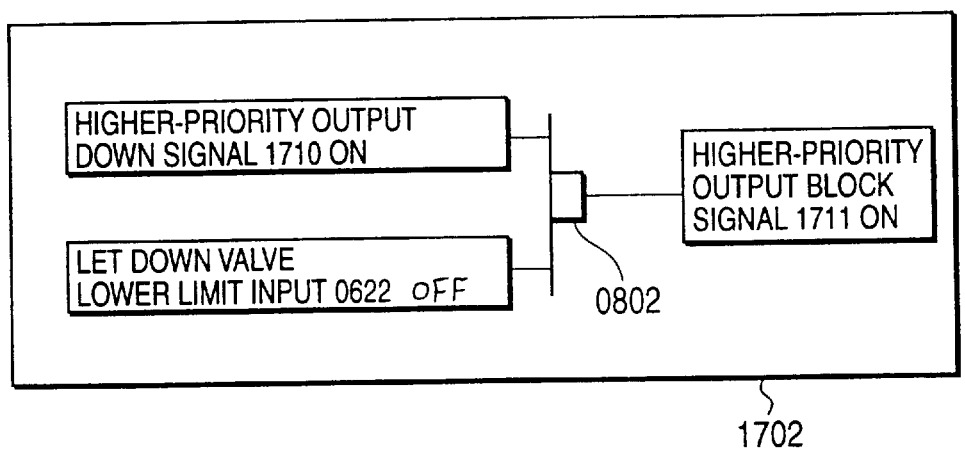
FIG. 18 is a logic diagram showing the higher-priority output block means of the third embodiment.

As shown in FIG. 17, the higher-priority output control means 1701 is composed of the operating point setting means 0101, the adder 0202, the PID processor 0203, and the output block switch 0703.

The control conditions of the higher-priority output block means 1702 are shown in FIG. 18.

As shown in FIG. 18, when a higher-priority output down signal 1710 is on and the let down valve lower limit input 0622 is off, the higher-priority output block means 1702 turns a higher-priority output block signal 1711 on, and in another case, it turns the higher-priority output block signal 1711 off.

The higher-priority output block means 1702 outputs the turned on (or turned off) higher-priority output block signal 1711 to the PID processor 0203 and the output block switch 0703 in the higher-priority output control means 1701 shown in FIG. 17.

The operations of the higher-priority output control means 1701 and the higher-priority output block means 1702 are similar to those of the second fuel control valve control means 1100 shown in FIG. 11 and the second fuel control output block 1202 shown in FIG. 12. Accordingly, the detailed description thereof can be omitted.

In correspondence with the first and second embodiments, the third embodiment controls so that the opening of the control valve 5612, that is, the operating point 0116 of the n-th output control means 0102 becomes equal to the operating point set value 0110 set by the operating point setting means 0101. While doing such the control, it is possible to open the second fuel control valve 5615 corresponding to the higher-priority control output 1412 on a priority basis, and then to open the let down valve 0604 corresponding to the lower-priority control output 1411, and it is also possible to close the let down valve 0604 corresponding to the lower-priority control output 1411 on a priority basis, and then to close the second fuel control valve 5615 corresponding to the higher-priority control output 1412.

From the aforementioned, this embodiment produces an effect that while the control valve 5615 is operated at the desired operating point, the higher-priority output is controlled toward the upper limit value on a priority basis, and the lower-priority output is controlled toward the lower limit value on a priority basis.

Fourth Embodiment

Figure 19:
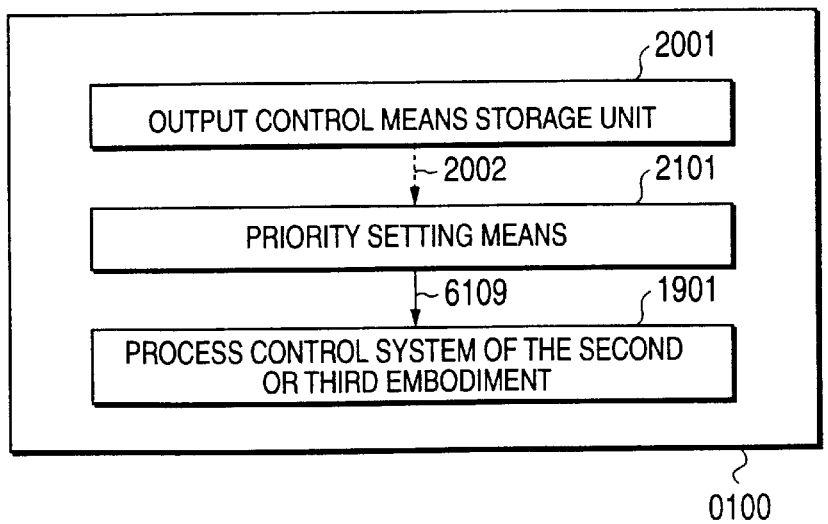
FIG. 19 is a block diagram showing a process control system according to a fourth embodiment of the present invention.
Figure 20:
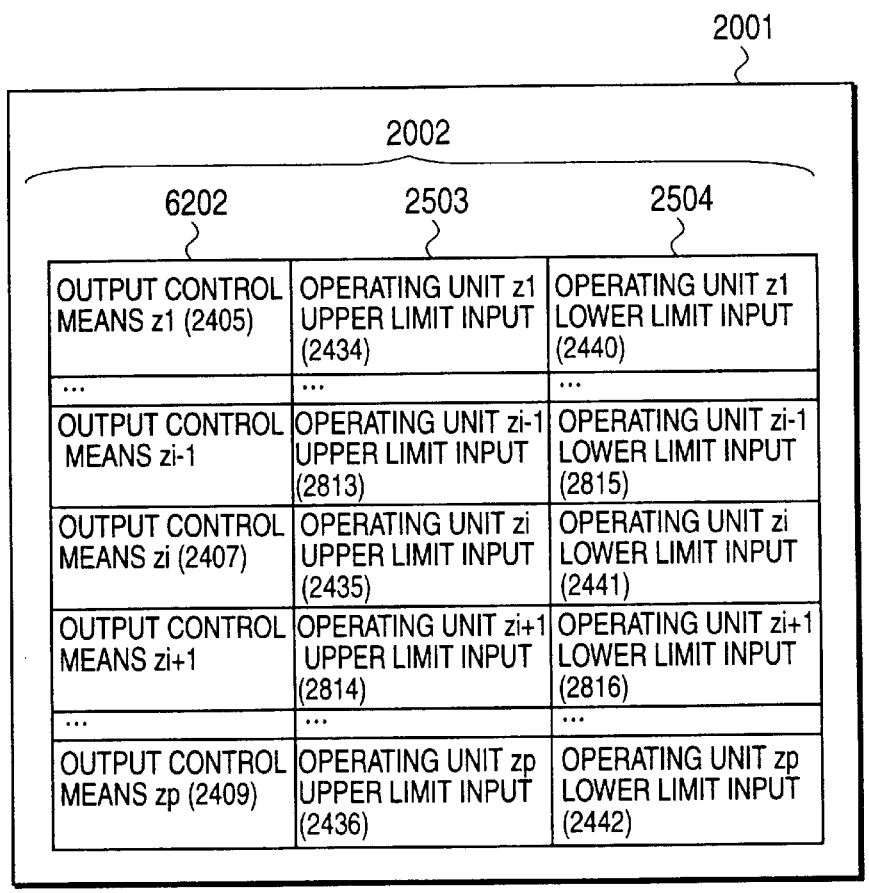
FIG. 20 is a drawing showing the output control means storage unit of the fourth embodiment.
Figure 25:
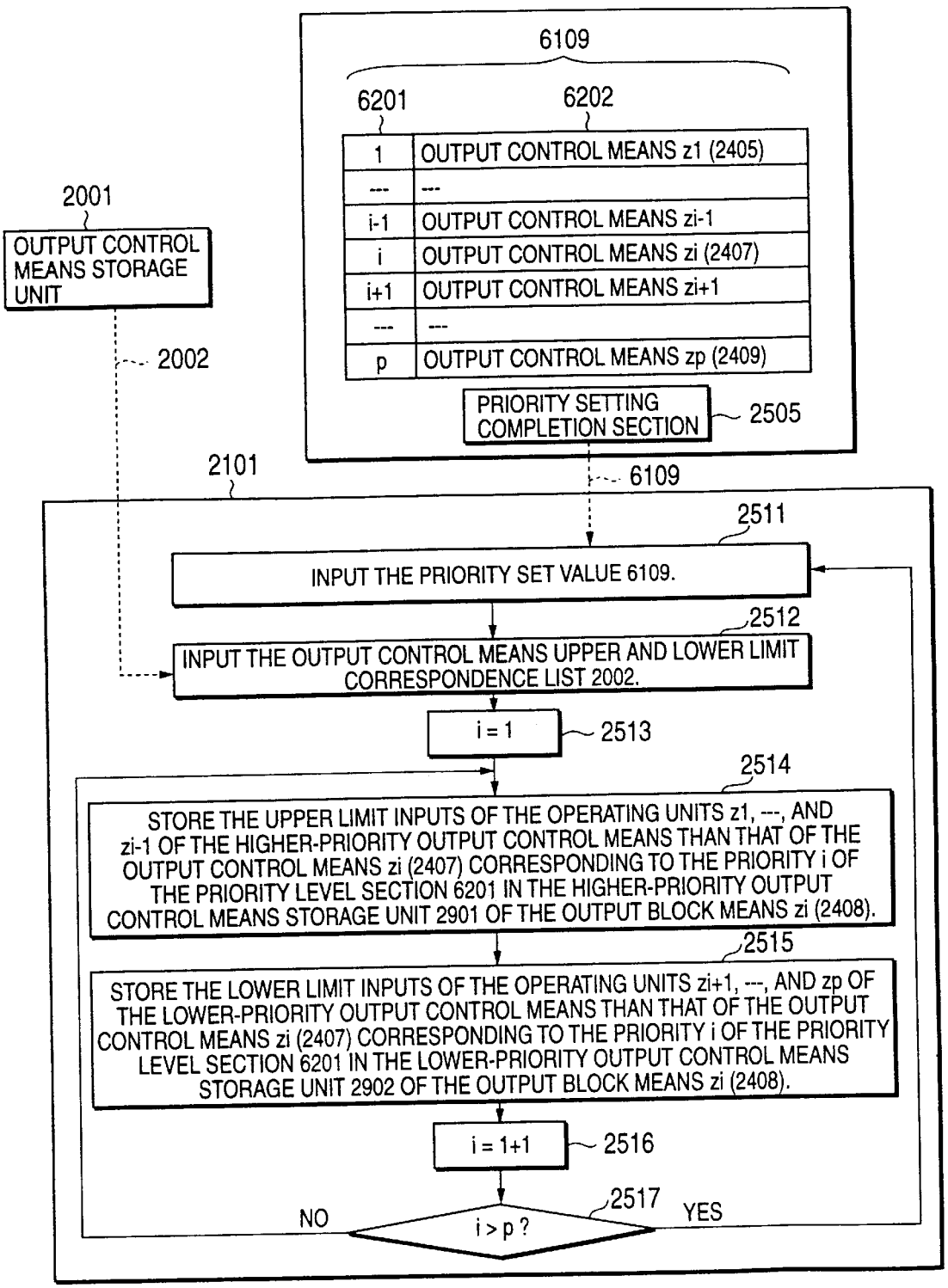
FIG. 25 is a flow chart of the process of the priority setting means of the fourth embodiment.

FIG. 19 is a block diagram showing a process control system according to a fourth embodiment of the present invention. In FIG. 14, a process control system 0100 according to this embodiment of the present invention is constructed by further providing an output control means storage unit 2001 and a priority setting means 2101 on a process control system 1901 of the second or third embodiment. The process control system 1901 of the second or third embodiment is structured like the process control system 0100 shown in FIG. 6 or FIG. 14. The construction of the output control means storage unit 2001 and the process of the priority setting means 2101 are shown in FIGS. 20 and 25, respectively.

Figure 21:
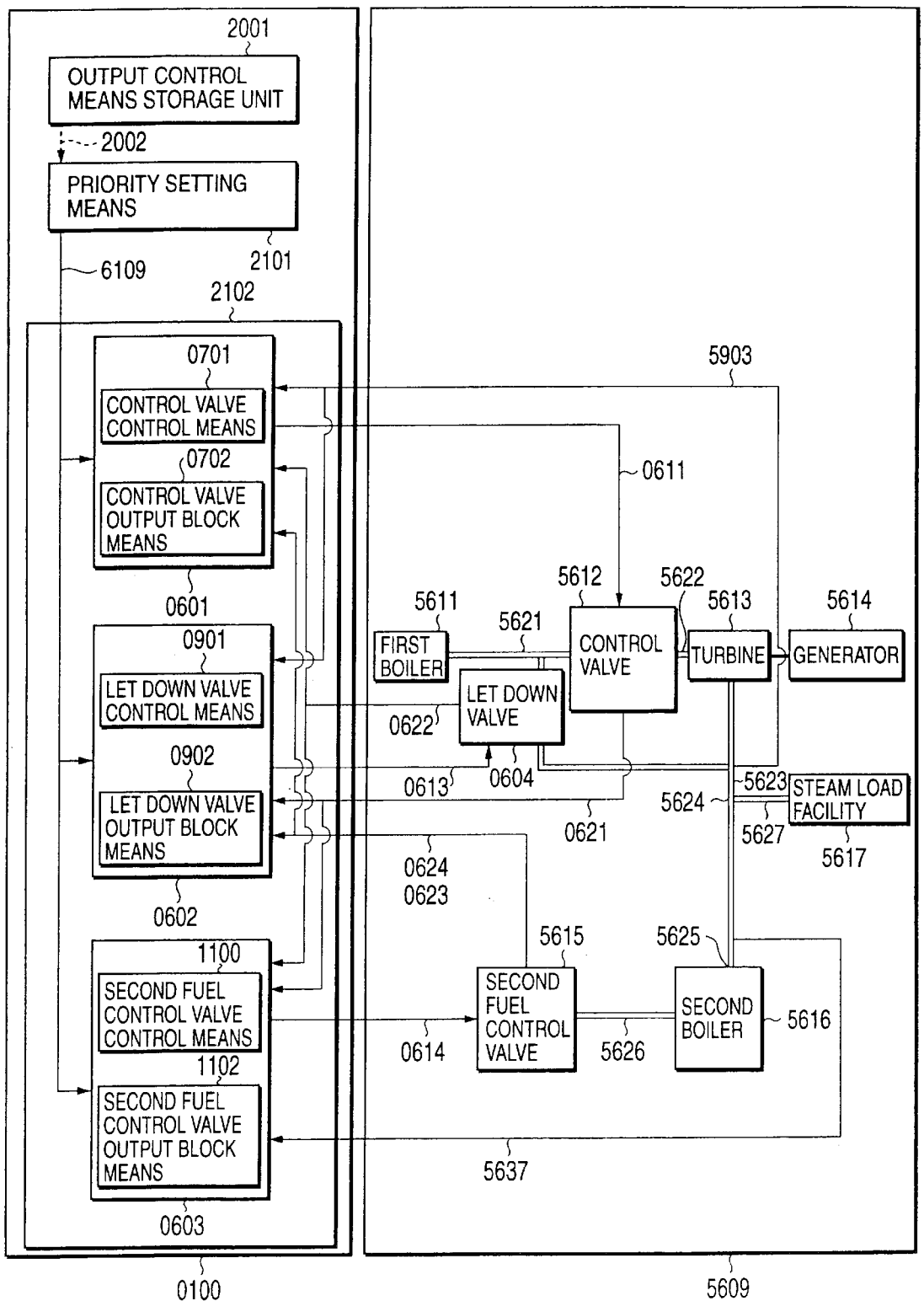
FIG. 21 is a block diagram showing the construction of the fourth embodiment when three output control means are provided.
Figure 22:
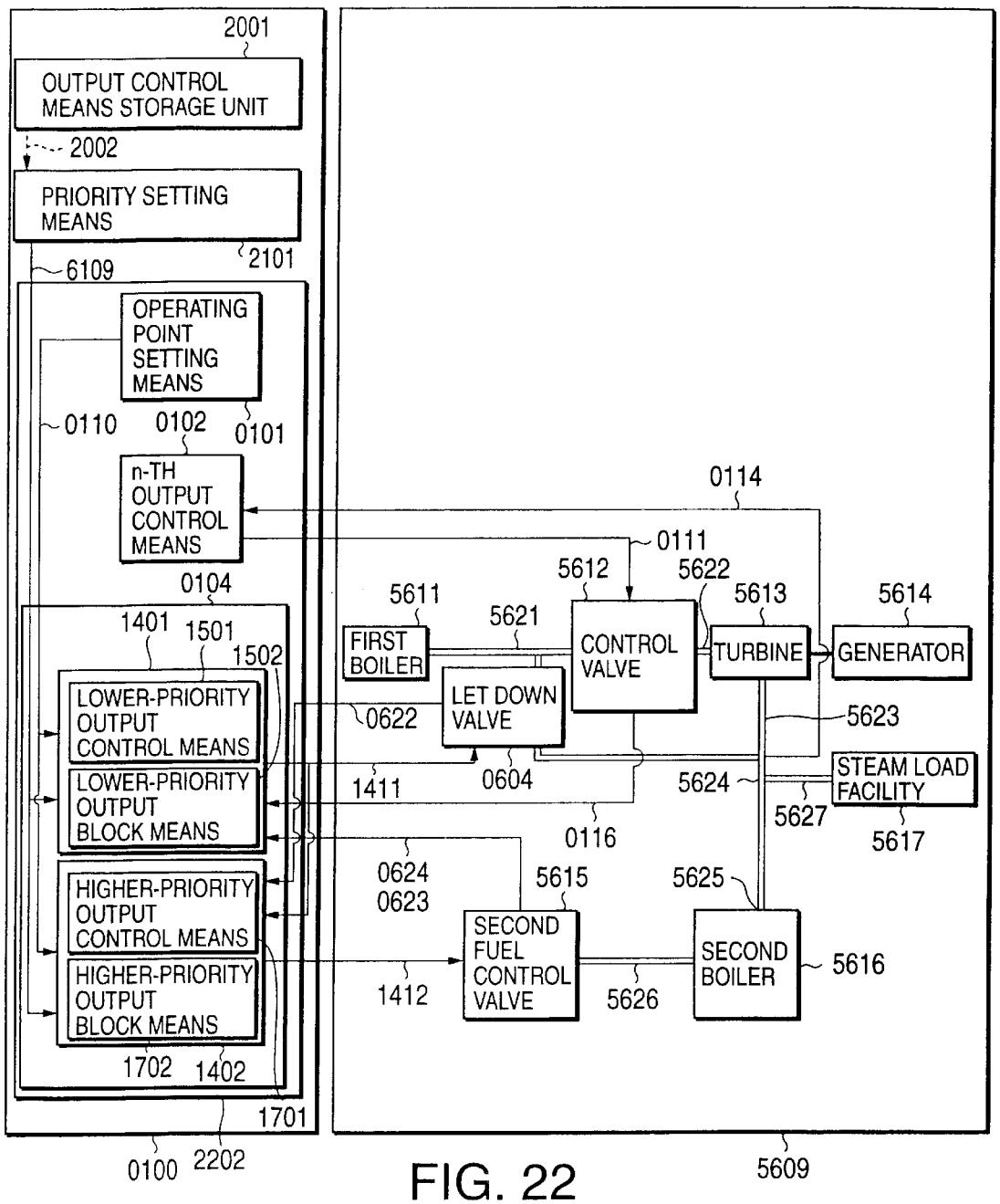
FIG. 22 is a block diagram showing the construction of the fourth embodiment when two output control means are provided.

FIG. 21 shows an embodiment that the output control means storage unit 2001 and the priority setting means 2101 are further provided on a process control system 2102 (corresponding to the process control system 0100 of the second embodiment shown in FIG. 6). FIG. 22 shows an embodiment that the output control means storage unit 2001 and the priority setting means 2101 are further provided on a process control system 2202 (corresponding to the process control system 0100 of the third embodiment shown in FIG. 14). The numbers of output control means included in the embodiment shown in FIG. 21 and the embodiment shown in FIG. 22 are three (0701, 0901, 1100) and two (1501, 1701), respectively.

Figure 24:
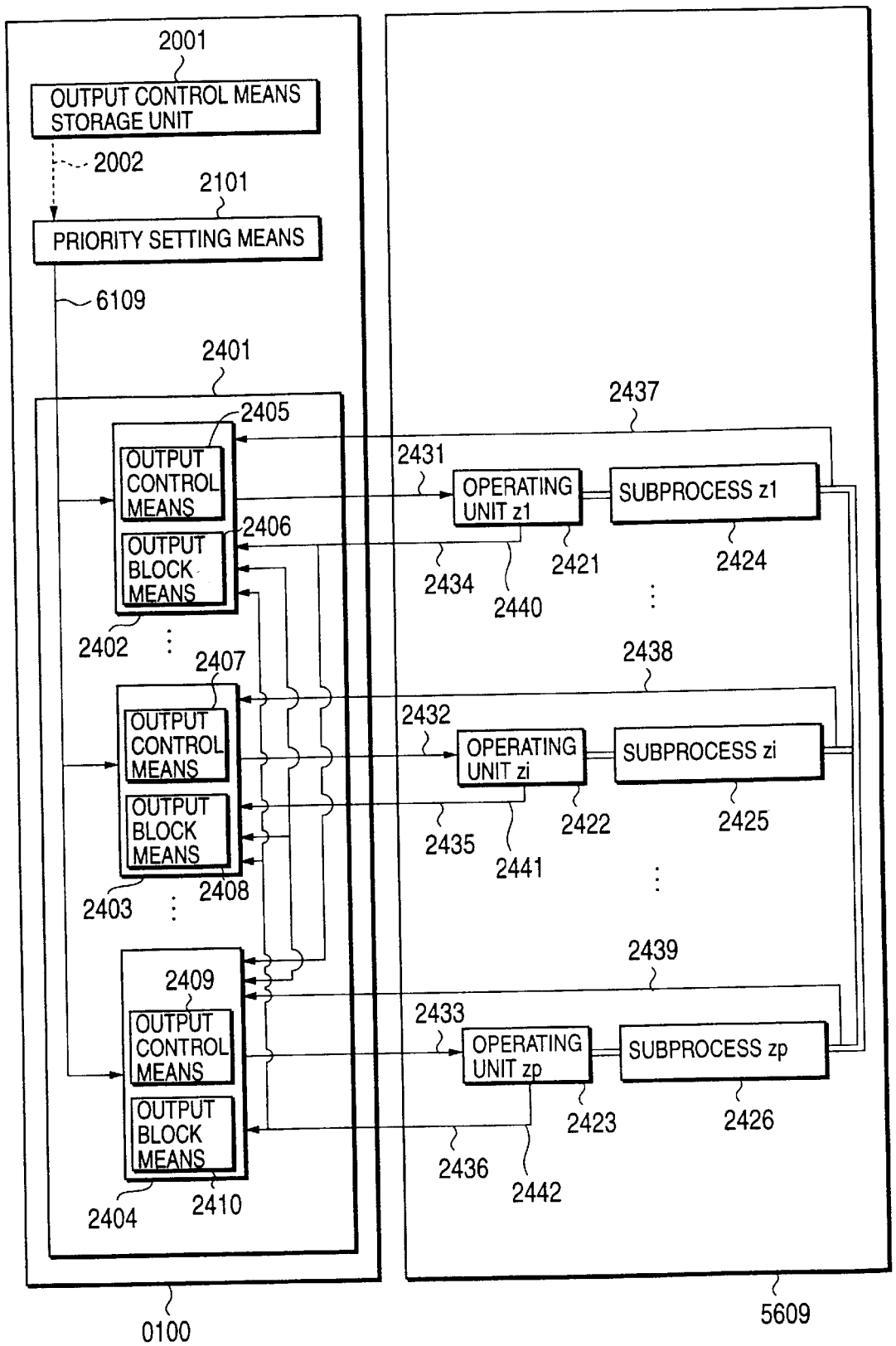
FIG. 24 is a block diagram showing the construction of the fourth embodiment when p output control means are provided.

Here, a detailed construction of the embodiment of the present invention, when p output control means are included for the generalization, is shown in FIG. 24. Hereunder, the operation of this embodiment will be explained by referring to these drawings. In FIG. 24, the case with the p output control means will be explained first. Then the correspondence to the case with the three output control means (FIG. 21) and the case with the two output control means (FIG. 22) will be explained.

As shown in FIG. 24, a process control system 0100 according to this embodiment of the present invention is composed of the output control means storage unit 2001, the priority setting means 2101, and an output control means 2401 for generating a plurality of control outputs having the priority. The output control means 2401 is composed of p output control subsystems, that is, an output control subsystem 1 (2402), - - - , an output control subsystem i (2403), - - - , and an output control subsystem p (2404). Each of the output control subsystem (2402, 2403, 2404) is composed of output control means (2405, 2407, 2409) and output block means (2406, 2408, 2410), respectively. The respective output control subsystems (2402, 2403, 2404) send control outputs (2431, 2432, 2433) to corresponding operating units (2421, 2422, 2423), and control the main inputs (2437, 2438, 2439) from the corresponding subprocesses (2424, 2425, 2426).

Figure 28:
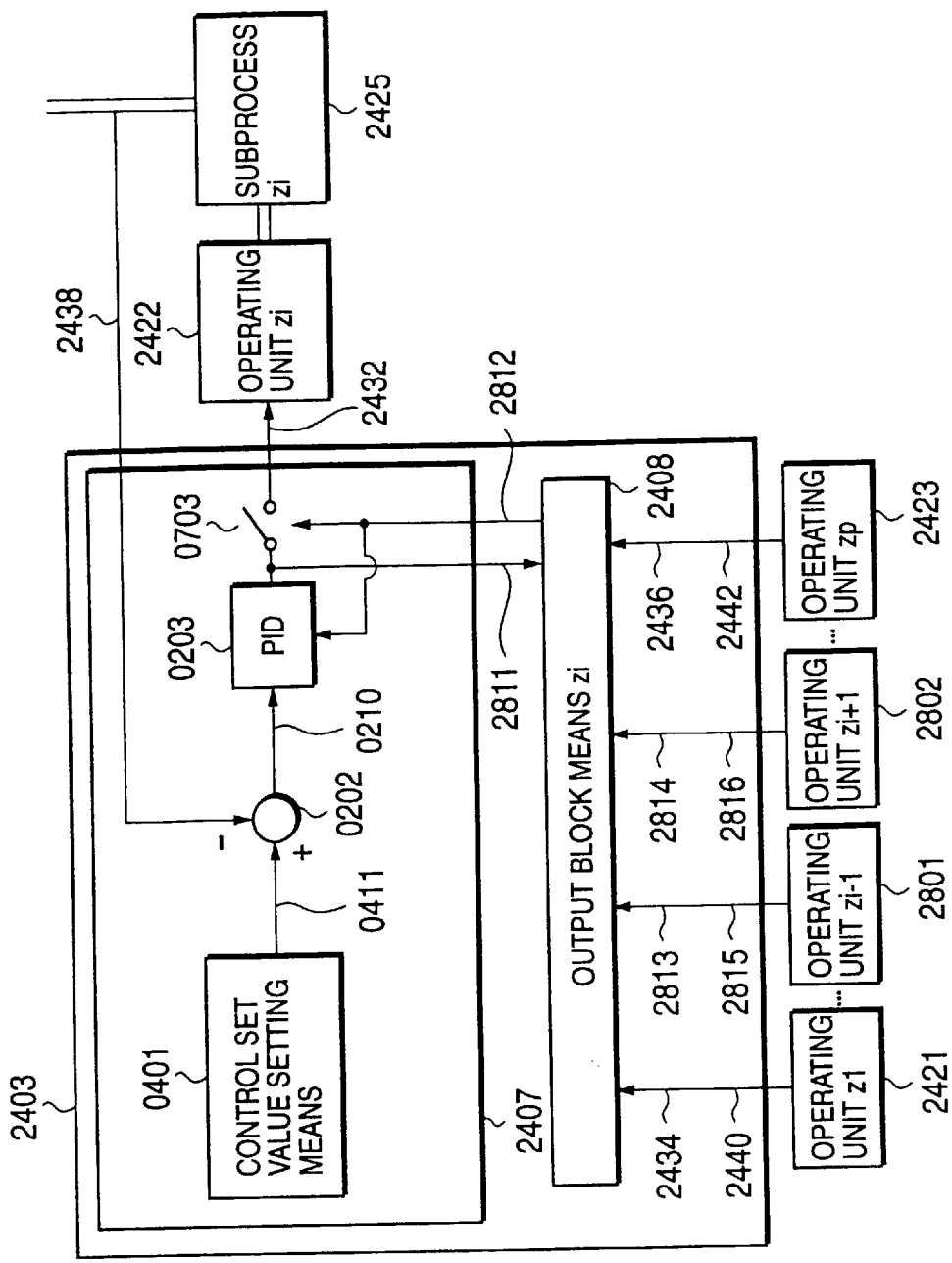
FIG. 28 is a block diagram of the output control subsystem $z_i$ of the fourth embodiment.

FIG. 25 shows a detailed process of the priority setting means 2101 shown in FIG. 24. The p output control means (2405, - - - , 2407, - - - , 2409) in FIG. 24 have the same structure, though the detail of the output control means zi (2407) is shown in FIG. 28 as the representative. The construction thereof corresponds to those of the second and third embodiments (FIGS. 7, 9, 11, 15, 17).

Figure 29:
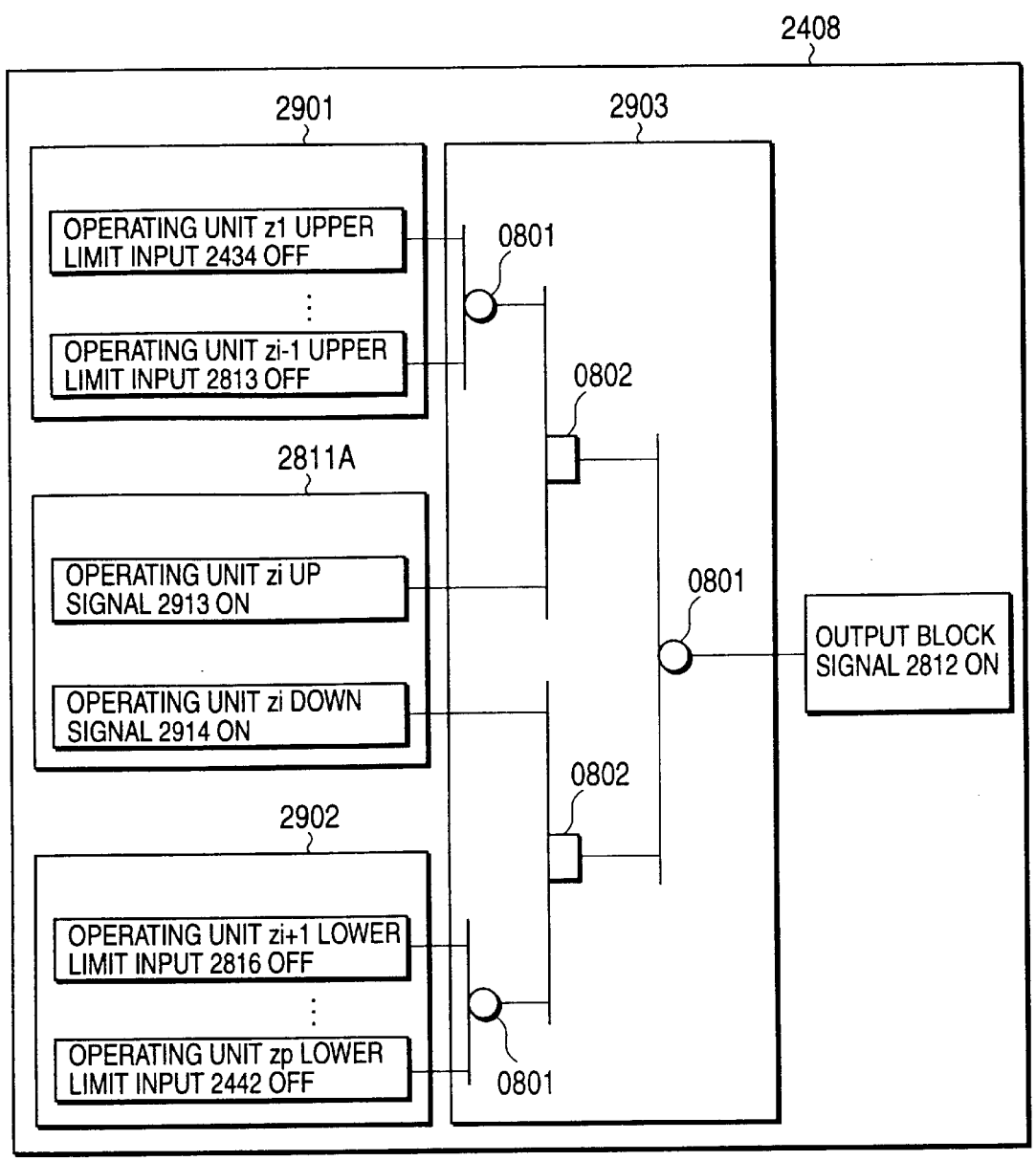
FIG. 29 is a logic diagram of the output block means $z_i$ of the fourth embodiment.

In FIG. 24, the p output block means (2406, - - - , 2408, - - - , 2410) have the same structure, though the detail of the output block means zi (2408) is shown in FIG. 29 as the representative. In FIG. 29, the output block means zi (2408) is composed of a higher-priority output control storage unit 2901, an output up and down signal unit 2811A, a lower-priority output control storage unit 2902, and a logical operation unit 2903. Operating unit zi up and down signals (2913, 2914) in the output up and down signal unit 2811A shown in FIG. 29 correspond to an output up and down signal 2811 shown in FIG. 28. As shown in FIG. 29, the output up and down signal 2811 is composed of the operating unit zi up signal 2913 and the operating unit zi down signal 2914.

In FIG. 25, the priority setting means 2101 is composed of Process 1 (2511) to Process 7 (2517). Process 1 (2511) inputs the priority set value 6109 from a terminal 3700. The terminal 3700 is composed of, for example, a keyboard and a CRT with a mouse. An operator sets the priority set value 6109 as shown in FIG. 25 by the mouse and keyboard at the terminal 3700. As shown in FIG. 25, the priority set value 6109 is composed of the priority level section 6201 and the control means section 6202. When the number indicated in the priority level section 6201 is lower, the priority of the control means indicated in the corresponding control means section 6202 is higher, and when the number indicated in the priority level section 6201 is higher, the priority of the control means indicated in the corresponding control means section 6202 is lower. In this embodiment, it is assumed that the priority of the output control means z1 is highest and the priority of the output control means zp is lowest.

When an operator, at the terminal 3700, sets the priority set value 6109 as shown in FIG. 25 and clicks a priority setting completion section 2505 by the mouse, the terminal 3700 outputs the priority set value 6109 set in the priority level section 6201 and the control means section 6202 to Process 1 (2511). Process 2 (2512) inputs an output control means upper and lower limit correspondence list 2002 from the output control means storage unit 2001. As shown in FIG. 20, the output control means upper and lower limit correspondence list 2002 stored in the output control means storage unit 2001 is composed of the control means section 6202, an upper limit input storage section 2503, and a lower limit input storage section 2504. An upper limit input (2434, - - - , 2813, 2435, 2814, - - - , 2436) of each operating unit indicated in the upper limit input storage section 2503 and a lower limit input (2440, - - - , 2815, 2441, 2816, - - - , 2442) of each operating unit indicated in the lower limit input storage section 2504 correspond to those of the respective output 6202.

The processes from Process 3 (2513) to Process 7 (2517) are sequentially executed for the p output block means z1, - - - , zp (from 2406 to 2410). Process 3 (2513) set i=1 as an initial value of i so as to process the first output control means. Process 4 (2514) stores upper limit inputs of operating units z1, - - - , and zi−1 in the upper limit input storage section 2503 corresponding to the output control means z1, - - - , and zi−1 having the higher-priority than that of the output control means zi (2407) corresponding to the priority i of the priority level section 6201 in the higher-priority output control means storage unit 2901 of the output block means zi (2408) shown in FIG. 29. Process 5 (2515) stores lower limit inputs of operating units zi+1, - - - , and zp in the lower limit input storage section 2504 corresponding to the output control means zi+1, - - - , and zp having lower-priority than that of the output control means zi (2407) corresponding to the priority i of the priority level section 6201 in the lower-priority output control means storage unit 2902 of the same output block means zi (2408).

In FIG. 29, the output block means zi (2408) carries out logic operations in the logical operation unit 2903 from the upper limit inputs (2434–2813) of the operating units zi, - - -, and zi−1 in the higher-priority output control means storage unit 2901 set by the priority setting means 2101 and the lower limit inputs (2816–2442) of the operating units zi+1, - - -, and zp in the lower-priority output control means storage unit 2902 based on a preset condition in the output up and down signal unit 2811A, and generates an output block signal on (2812) depending on the result of the logical operation. Here, as shown in the drawing, when any one of the upper limit inputs (2434, - - -, 2813) from the higher-priority operating units z1 to zi−1 inputted from the process 5609 is off and the operating unit zi up signal 2913 inputted from the output control means zi (2407) is on, or when any one of the lower limit inputs (2816, - - -, 2442) from the lower-priority operating units zi+1 to zp inputted from the process 5609 is off and the operating unit zi down signal 2914 inputted from the output control means zi (2407) is on, the output block signal 2812 is turned on, and in another case, the output block signal 2812 is turned off.

In FIG. 28, the output control means zi (2407) outputs the control output 2432 to the operating unit zi (2422) for controlling so that the subprocess zi input (2438) inputted from the subprocess zi (2425) becomes equal to the control set value 0411 set by the control set value setting means 0401 when the output block switch 0703 is closed. The adder 0202 calculates the deviation 0210 between the control set value 0411 and the subprocess zi input (2438), and the PID processor 0203 calculates the amount of the control output 2432 to the operating unit zi so as to bring the deviation 0210 close to zero. When the output block switch 0703 is opened, the control output 2432 from the output control means zi (2407) to the operating unit zi (2422) is blocked.

In FIG. 25, Process 6 (2516) sets i to i+1 (i=i+1) so as to process the next output control means. Process 7 (2517) judges whether or not the p output control means are processed. When the judgment result shows that the process of the p output control means is not completed (i≦p), the process is returned to Process 4 (2514) so as to process the next control means. When the judgment result shows that the process of the p output control means is completed (i>p), the process is returned to Process 1 (2511). Next, when the operator sets the priority set value 6109 as shown in FIG. 25 at the terminal 3700 and clicks the priority setting completion section 2505 by the mouse, the aforementioned process is performed again.

Figure 26:
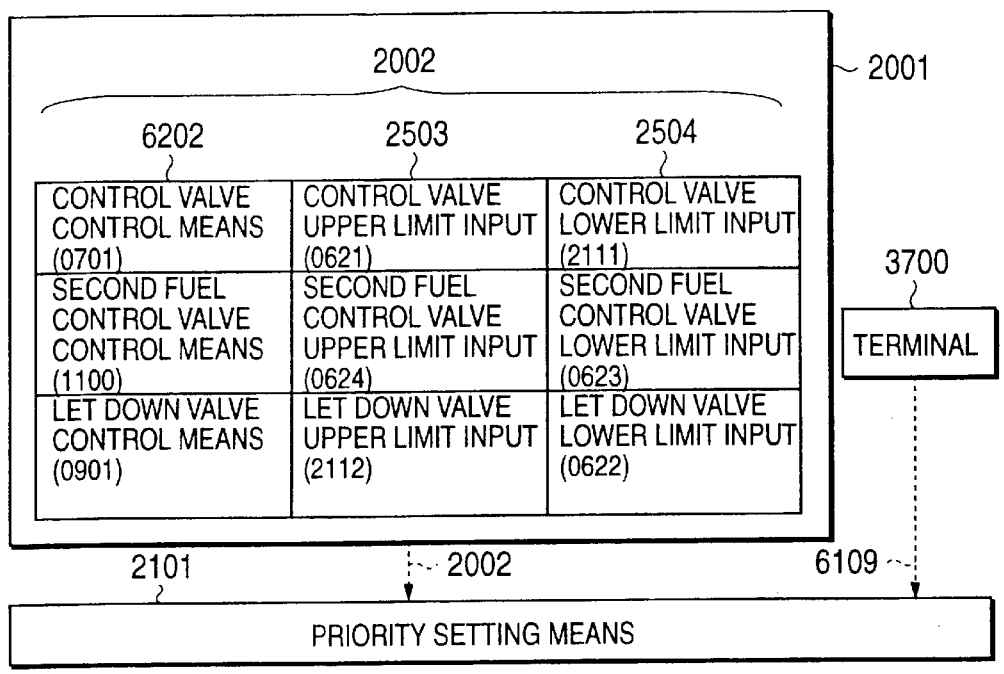
FIG. 26 is a flow chart of the process of the priority setting means of the fourth embodiment when three output control means are provided.

The case that there are provided p output control means is explained above. Hereinafter, a case having three output control means as shown in FIG. 21 will be explained in correspondence with the aforementioned case having p output control means. FIG. 13 shows an example of the priority of each output control means shown in FIG. 21. FIG. 26 shows a flow of the process of the priority setting means 2101 when there are three output control means provided in correspondence with FIG. 25. Here, an operator sets the priority set value 6109 as shown in FIG. 13 at the terminal 3700 shown in FIG. 26 in correspondence with FIG. 25, and clicks the priority setting completion section 2505 corresponding to that shown in FIG. 25 by the mouse. As explained above, in this embodiment, the higher-priority output can be controlled toward the upper limit value on a priority basis and the lower-priority output can be controlled toward the lower limit value on a priority basis.

Figure 23:
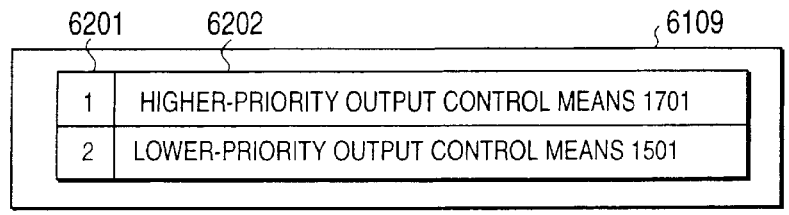
FIG. 23 is a drawing showing the construction of the priority set value of the fourth embodiment.
Figure 27:
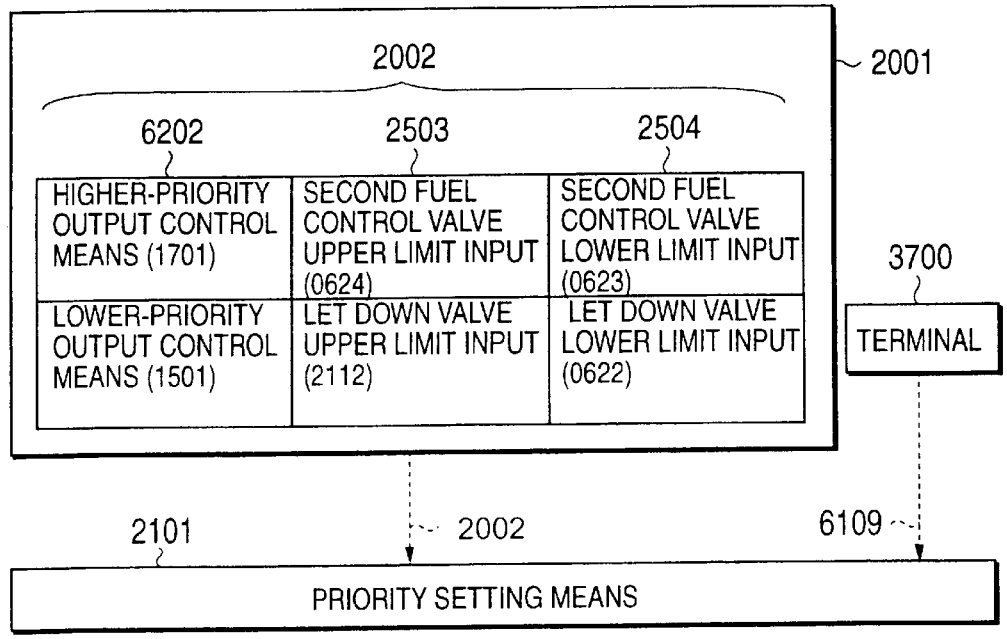
FIG. 27 is a flow chart of the process of the priority setting means of the fourth embodiment when two output control means are provided.

Next, a case having two output control means as shown in FIG. 22 will be explained in correspondence with the aforementioned case having p output control means. FIG. 23 shows an example of the priority of each output control means shown in FIG. 22. FIG. 27 shows a flow of the process of the priority setting means 2101 when there are two output control means provided in correspondence with FIG. 25. Here, when an operator sets the priority set value 6109 as shown in FIG. 23 at the terminal 3700 shown in FIG. 27 in correspondence with FIG. 25, and clicks the priority setting completion section 2505 corresponding to that shown in FIG. 25 by the mouse. As explained above, in this embodiment, while the control output of the fast response operates at the desired operating point, the higher-priority output can be controlled toward the upper limit value on a priority basis, and the lower-priority output can be controlled toward the lower limit value on a priority basis.

As explained above, according to the process control system shown in FIG. 21, an effect is produced that by an optionally set priority, the higher-priority output can be controlled toward the upper limit value on a priority basis and the lower-priority output can be controlled toward the lower limit value on a priority basis. Further, according to the process control system shown in FIG. 22, an effect is produced that by an optionally set priority, while the control output of the fast response operates at the desired operating point, the higher-priority output can be controlled toward the upper limit value on a priority basis, and the lower-priority output can be controlled toward the lower limit value on a priority basis.

Fifth Embodiment

Figure 30:
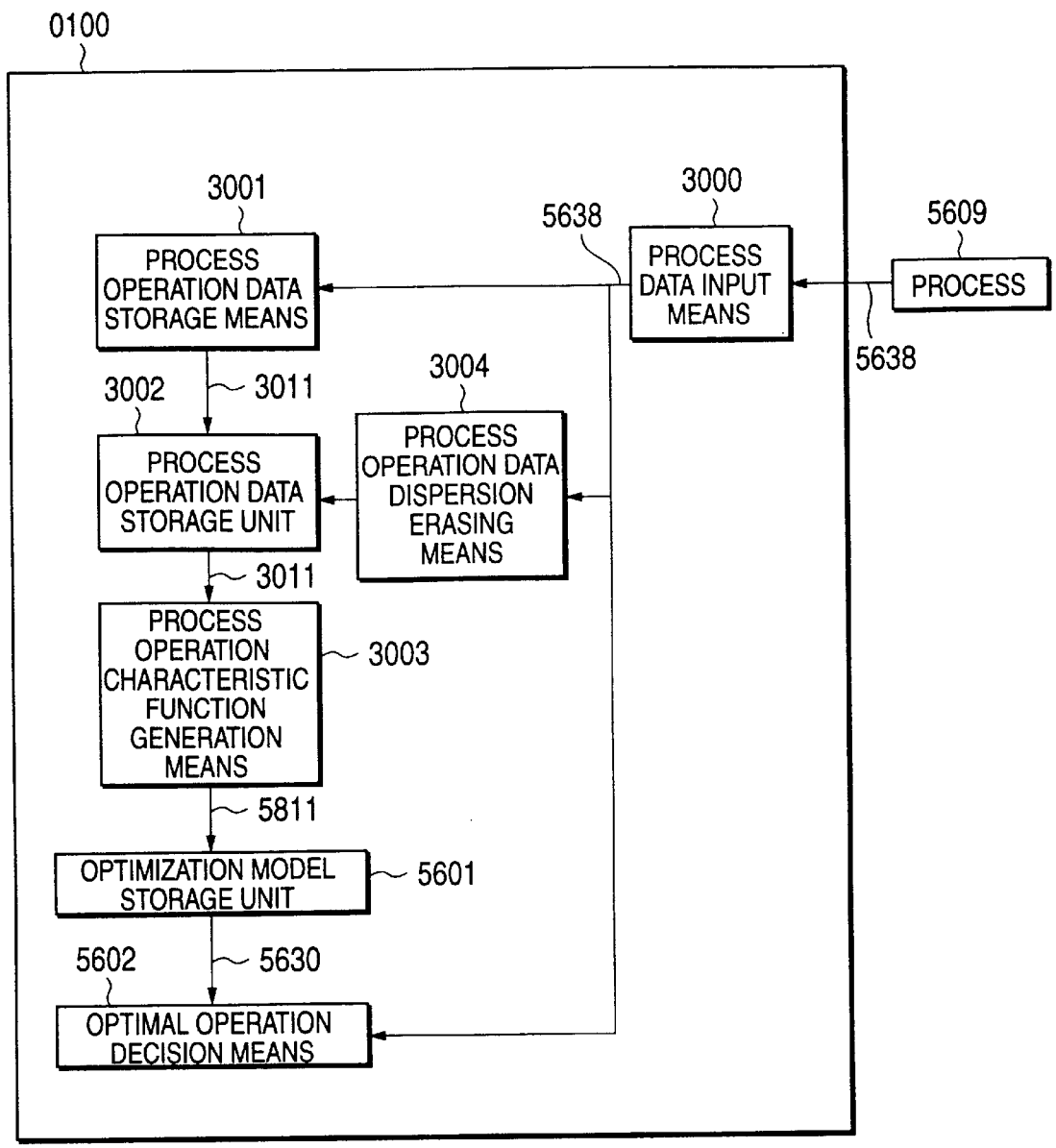
FIG. 30 is a block diagram showing a process control system according to a fifth and a sixth embodiment of the present invention.
Figure 31:
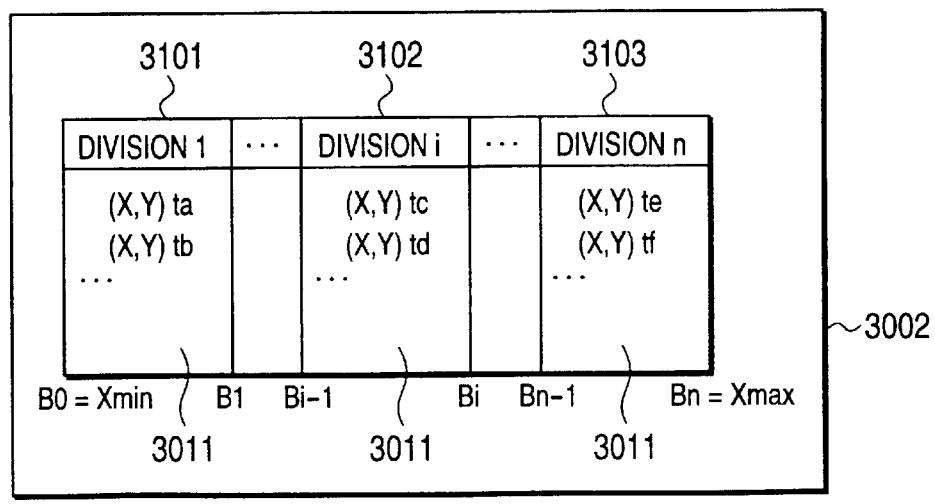
FIG. 31 is a drawing showing the construction of the process operation data storage unit of the fifth and sixth embodiments.

FIG. 30 is a block diagram showing a process control system according to a fifth embodiment of the present invention. In FIG. 30, a process control system 0100 according to this embodiment of the present invention is composed of a process data input means 3000, a process operation data storage means 3001, a process operation data dispersion erasing means 3004, a process operation data storage unit 3002, a process operation characteristic function generation output means 3003, the optimization model storage unit 5601, and the optimal operation decision means 5602. The format of process operation data 3011 stored in the process operation data storage unit 3002 is shown in FIG. 31. As shown in the drawing, the process operation data 3011 is composed of, for example, a paired input (X, Y) composed of X and Y (for example, X is a boiler fuel flow and Y is a boiler steam flow). A maximum possible value of X and a minimum possible value of X are a break point B0 (=Xmin) and a break point Bn (=Xmax), respectively, as shown in FIG. 31. The process operation data 3011 (X, Y)tz (z=a, b, c, d, e, f, - - -) are stored together with the time tz (z=a, b, c, d, e, f, - - -) when the data are collected. The process operation data 3011 are stored dispersedly in n divisions (3101, 3102, 3103), respectively. Each division is delimited by (n−1) break points B1, - - -, and Bn−1.

Figure 33:
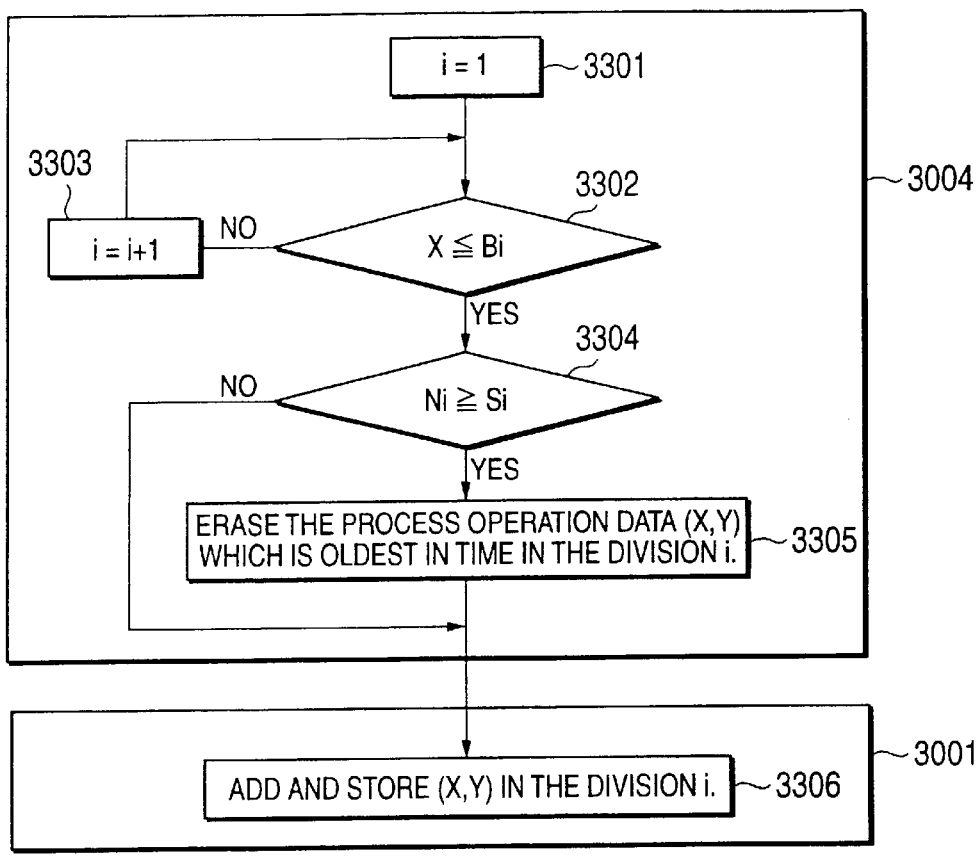
FIG. 33 is a flow chart of the process of the process operation data dispersion erasing means and the process operation data storage means of the fifth embodiment.

FIG. 33 shows a detailed construction of the process operation data storage means 3001 and the process operation data dispersion erasing means 3004 according to this embodiment. As shown in FIG. 33, the process operation data dispersion erasing means 3004 is composed of Process 1 (3301), Process 2 (3302), Process 3 (3303), Process 4 (3304), and Process 5 (3305), and the process operation data storage means 3001 is composed of Process 6 (3306). An example of the optimization model 5630 stored in the optimal model storage unit 5601 is expressed by Formula 1 or 2.

The operation of this embodiment will be explained. As shown in FIGS. 33 and 30, the process data input means 3000 inputs the process data input 5638 from the process 5609. Process 1 (3301), Process 2 (3302) and Process 3 (3303) in the process operation data dispersion erasing means 3004 judge and process the division (3101, 3102, and 3103 shown in FIG. 31) in which the paired process data input 5638 (X, Y) inputted by the process data input means 3000 is stored depending on the size of X based on the (n−1) break points 1, - - - , and Bn−1 f each division. Here, on the assumption that as a result of the judgment, the process data input 5638 is stored in Division i (3102 shown in FIG. 31), the operation will be explained. Process 4 (3304) compares the number Ni of process operation data 3011 stored in Division i with a preset storage size Si of Division i. When the comparison result shows that the number Ni of process operation data 3011 in Division i is equal to or more than the size Si (Ni≧Si), Process 5 (3305) erases (Ni—Si+1) process operation data (X, Y) 3011, which are oldest in time in Division i, together with the time. When the comparison result shows that the number Ni of the process operation data 3011 is smaller than the size Si (Ni<Si), the process operation data (X, Y) 3011 in Division i is not erased. Process 6 (3306) of the process operation data storage means 3001 stores the process operation data (X, Y) 3011 in Division i (3102) together with the time when the process operation data (X, Y) 3011 is inputted depending on the judgment result of Process 2 (3302).

Figure 32:
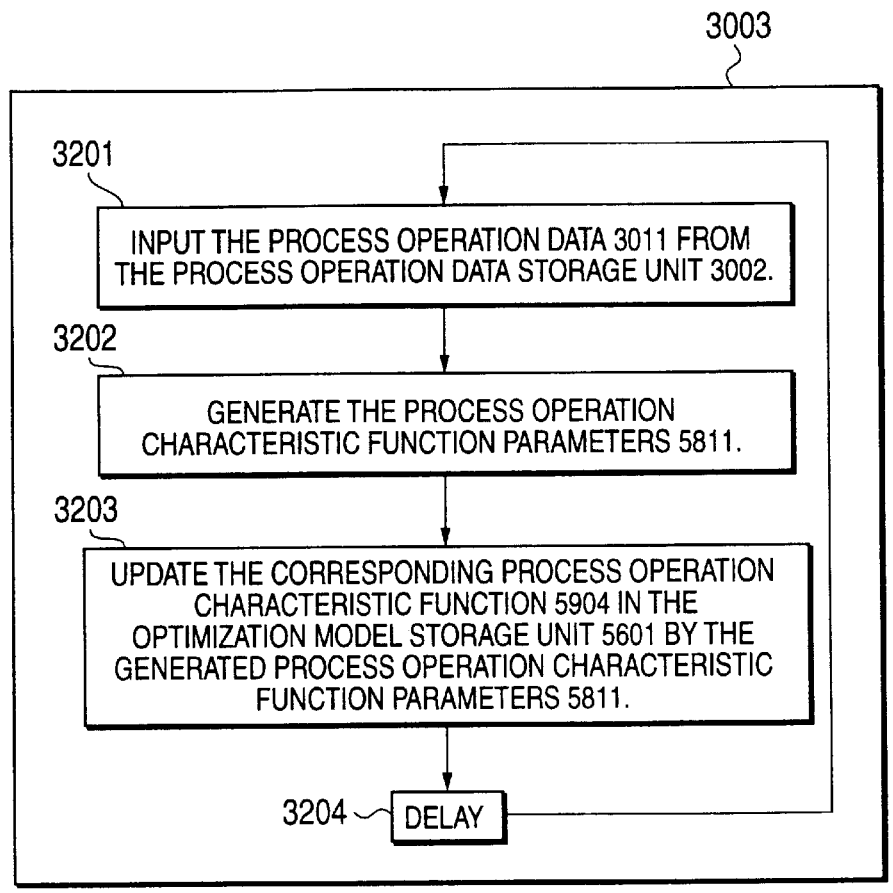
FIG. 32 is a flow chart of the process of the process operation characteristic function generation means of the fifth embodiment.

A detailed process of the process operation characteristic function generation means 3003 shown in FIG. 30 is shown in FIG. 32. As shown in the drawing, the process operation characteristic function generation means 3003 is composed of Process 1 (3201) to Process 4 (3204). Process 1 (3201) inputs the process operation data 3011 from the process operation data storage unit 3002. Process 2 (3202) generates the process operation characteristic function parameters 5811 by the inputted process operation data 3011 (X, Y). The generation method thereof is, for example, the method of least squares. When the process operation characteristic function 5904 stored in the optimization model storage unit 5601 is assumed as a quadratic function as expressed by Formula 1 or 2 and the number of process operation data 3011 (X, Y) stored in the process operation data storage unit 3002 is assumed as M, the process operation characteristic function parameters a(0), a(1), and a(2) (5811) generated by the method of least squares are given by Formula 8.
Formula 8

$$\sum_{k=0}^{2}\left\{\sum_{j=1}^{M} x_j^{k+Q}\right\} a(k) = \sum_{j=1}^{2} x_j^{Q} y_j \qquad (8)$$

$$Q = 0, 1, \ldots, M$$

Here, (X, Y) indicates the process operation data 3011 stored in the process operation data storage unit 3002. Process 3 (3203) updates the process operation characteristic function parameters 5811 corresponding to the optimization model storage unit 5601 by the process operation characteristic function parameters a(0), a(1), and a(2) (5811) calculated by Process 2. Here, for example, assuming that the parameters a(0), a(1), and a(2) given by Formula 8 correspond to a1(0), a1(1), and a1(2) of Formula 1e or 2d1, Process 3 (3203) updates the parameters a1(0), a1(1), and a1(2) of the process operation characteristic function 5904 (Formula 1e or 2d1) stored in the optimization model storage unit 5601 using the parameters a(0), a(1), and a(2) given by Formula 8. Process 4 (3204) performs a delay process, and then the process is returned to Process 1 (3201). Then new process operation characteristic function parameters 5811 are generated by the new process operation data 3011.

Figure 34:
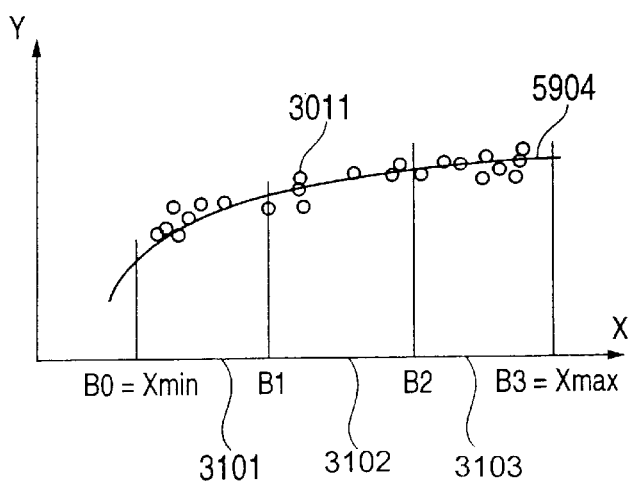
FIG. 34 is a drawing showing the process operation characteristic function by dispersion and the process data of the fifth embodiment.

As shown in FIG. 34, the process operation data 3011 (X, Y) are dispersedly stored, so that the process operation characteristic function generation means 3003 can generate the process operation characteristic function 5904 by the process operation data 3011 (X, Y) stored in all the divisions 1, 2, and 3.

In FIG. 30, the optimal operation decision means 5602 decides the optimal operating point of the process operation or the priority of the output control means from the optimization model 5630 (Formula 1 or 2) stored in the optimization model storage unit 5601 as explained above and the process data input 5638 from the process 5609.

As explained above, according to this embodiment, the process operation characteristic function parameters 5811 for deciding the optimal operating point of the process operation or the priority of the output control means are automatically generated from the process operation data 3011 stored in all the divisions, so that the precision of the process operation characteristic function 5904 to be generated is high. By use of the highly precise process operation characteristic function 5904, the optimal operating point for the process operation or the priority of the output control means can be decided with a more highly preciseness. By the automatic preparation of the process operation characteristic function parameters 5811, the burden imposed on the manual adjustment operation of the process operation characteristic function parameters 5811 for responding to a change with time of the process can be lightened.

Modified Example

Figure 35:
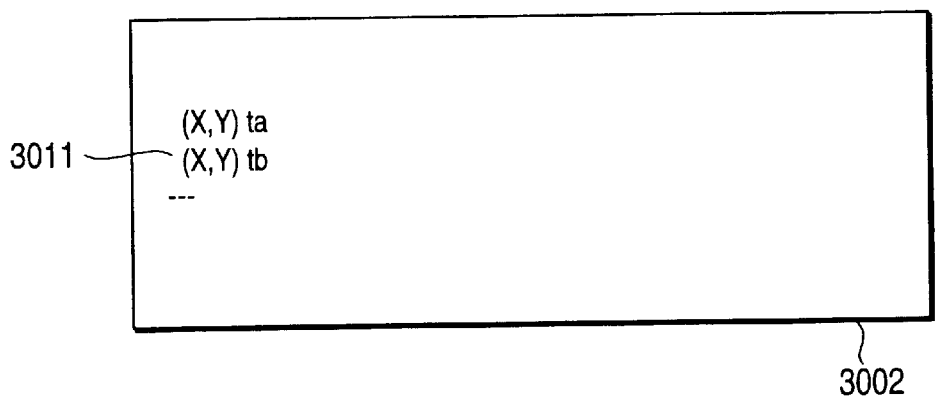
FIG. 35 is a drawing showing a modified example of a process operation data storage unit of the fifth embodiment.
Figure 36:
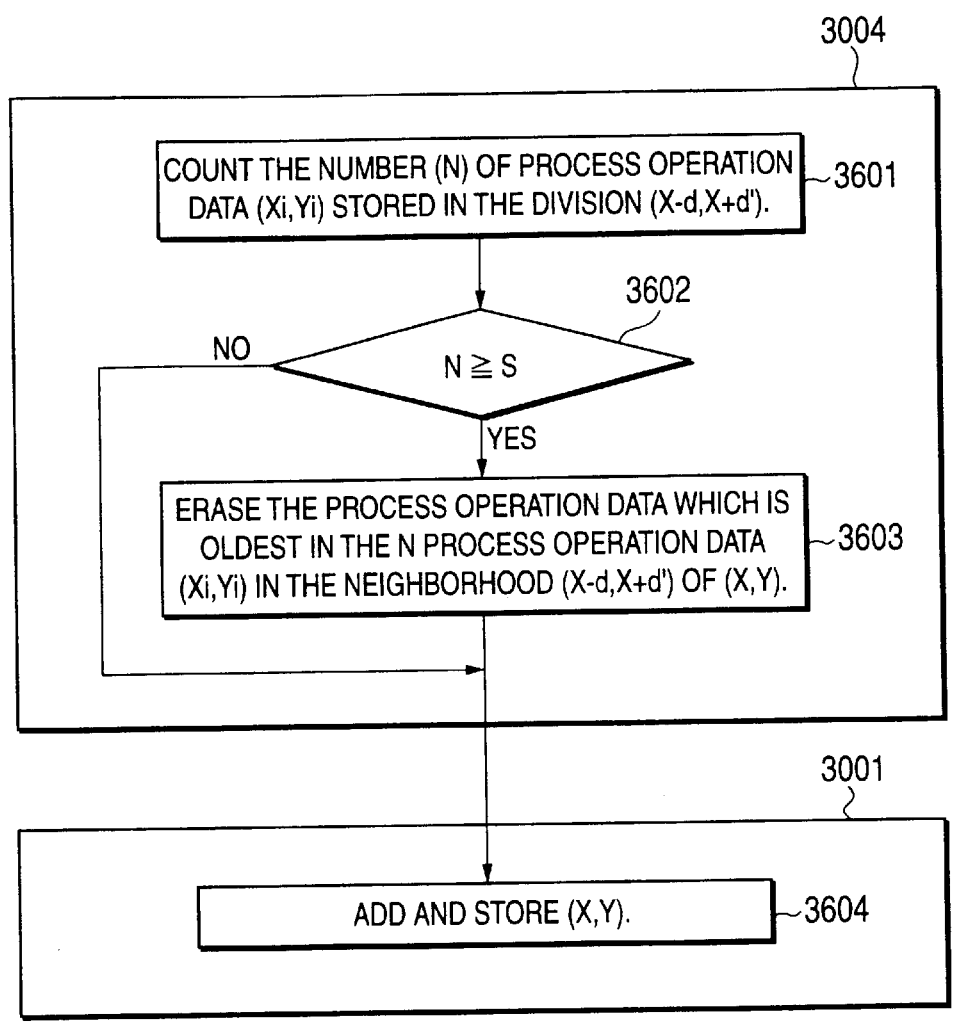
FIG. 36 is a flow chart of the process of a modified example of a process operation data storage means and a process operation data dispersion erasing means of the fifth embodiment.

Next, a modified example of the fifth embodiment will be explained. The construction of this modified example is the same as that of the fifth embodiment shown in FIG. 30. The construction of the process operation data storage unit 3002, and the process operation data storage means 3001 and the process operation data dispersion erasing output means 3004 according to this modified example are shown in FIGS. 35 and 36, respectively. FIG. 35 shows a modified example corresponding to the process operation data storage unit 3002, and FIG. 36 shows a modified example corresponding to the process operation data storage means 3001 and the process operation data dispersion erasing output means 3004.

The operation of this modified example will be explained hereunder. In FIG. 35, the process operation data 3011 (X, Y) tz (z=a, b, - - - ) indicates data collected at the time tz (z=a, b, - - - ). Process 1 (3601) shown in FIG. 36 counts the number N of process operation data 3011 (X1, Yi) in the neighborhood (X−d, X+d') of the paired process data input 5638 (X, Y) inputted by the process data input means (3000 shown in FIG. 30) among all the process operation data 3011 (X, Y) stored in the process operation data storage unit (3002 shown in FIG. 35). Here, assuming that in all the process operation data 3011 (Xi, Yi), (i=1, - - - , and M) stored in the process operation data storage unit (3002 shown in FIG. 35), and M indicates the total number of all the process operation data (Xi, Yi) stored in the process operation data storage unit (3002 shown in FIG. 35), Process 1 (3601) counts a number N of the process operation data 3011 (Xi, Yi) meeting the following formula.

$$X-d \leq Xi \leq X-d' \qquad (9)$$

Here, X corresponds to X of the paired process data input 5638 (X, Y) inputted by the process data input means (3000 shown in FIG. 30), and Xi corresponds to Xi in all the process operation data 3011 (Xi, Yi) stored in the process operation data storage unit (3002 shown in FIG. 35), and d and d' indicate preset sizes of the neighborhoods, respectively. Hereinafter, the process operation data 3011 which meets Formula 9 is called as a neighboring process operation data to (X, Y). Here, assuming the number of neighboring process operation data to (X, Y) as N, Process 2 (3602) compares N with a preset neighboring storage size S. When the comparison result shows that the number N of neighboring process operation data to (X, Y) is equal to or larger than the size S (N≧S), Process 3 (3603) erases the (N−S+1) process operation data 3011, which are oldest in time, among the N process operation data 3011 (Xi, Yi) in the neighborhood (X−d, X+d') of the process operation data 3011 (X, Y). When the comparison result shows that the number N of neighboring process operation data to (X', Y) is smaller than the size S (N<S), the process operation data 3011 (X, Y) is not erased. Process 4 (3604) in the process operation data storage means 3001 stores the paired process data input 5638 (X, Y) inputted by the process data input means 3000 in the process operation data storage unit 3002 as process operation data 3011 (X, Y) together with the time when the paired process data input 5638 (X, Y) is inputted.

As explained above, when the process operation data 3011 is to be erased, the number of process operation data 3011 stored in the neighborhood is judged. As a result, the process operation data 3011 necessary to generate the optimal operating point for the process operation or the priority of the output control means by the process operation characteristic function generation means 3003 can be stored within the overall range of process data inputs 5638, and the highly precise process operation characteristic function 5904 can be generated.

Sixth Embodiment

Next, a process control system according to a sixth embodiment of the present invention will be explained. The construction of this embodiment is the same as the process control system 0100 of the fifth embodiment shown in FIG. 30. The process control system according to this embodiment is composed of the process data input means 3000, the process operation data storage means 3001, the process operation data dispersion erasing means 3004, the process operation data storage unit 3002, the process operation characteristic function generation means 3003, the optimization model storage unit 5601, and the optimal operation decision means 5602.

Figure 37:
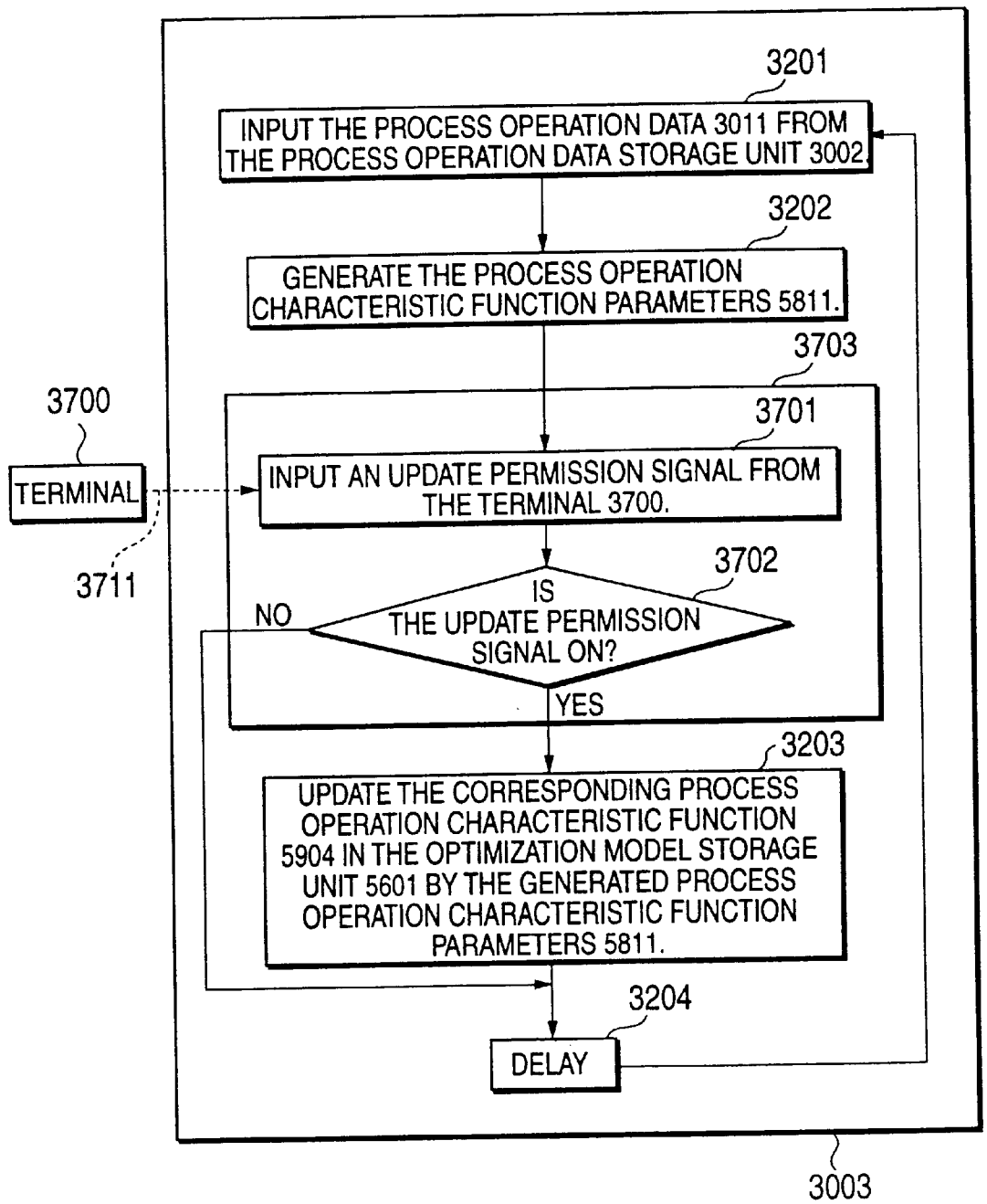
FIG. 37 is a flow chart of the process of the process operation characteristic function generation means having the process operation characteristic function update permission means of the sixth embodiment.

In correspondence with the process operation characteristic function generation means 3003 (FIG. 32) of the fifth embodiment, a detailed process of the process operation characteristic function generation means 3003 of this embodiment is shown in FIG. 37. As shown in FIG. 37, the process operation characteristic function generation means 3003 of this embodiment is composed of Process 1 (3201) to Process 4 (3204) and a process operation characteristic function update permission means 3703. The processes in Process 1 (3201) to Process 4 (3204) shown in FIG. 37 correspond to those in Process 1 (3201) to Process 4 (3204) shown in FIG. 32. In FIG. 37, Process 1 (3201) and Process 2 (3202) generate the process operation characteristic function parameters 5811 based on the process operation data 3011 stored in the process operation data storage unit 3002 in the same way as with the aforementioned. The terminal 3700 is composed of, for example, a keyboard and a CRT with a mouse.

An operator gives an update permission signal 3711 to the process operation characteristic function update permission means 3703 via the terminal 3700. The process operation characteristic function update permission means 3703 is composed of Process a (3701) and Process b (3702). Process a (3701) inputs the update permission signal 3711 from the terminal 3700, and Process b (3702) judges the input update permission signal 3711. When the judgment result shows that the update permission signal 3711 is ON, Process 3 (3203), as mentioned above, updates the corresponding process operation characteristic function 5904 stored in the optimization model storage unit 5601 using the process operation characteristic function parameters 5811 generated by Process 2 (3202). When the judgment result shows that the update permission signal 3711 is OFF, Process 3 (3203) is not performed, and the process is jumped to Process 4 (3204). The process operation characteristic function parameter 5811 generated by Process 2 (3202) is not stored in the process characteristic function storage unit 5601. In this case, the past process operation characteristic function 5904 is stored in the process characteristic function storage unit 5601, so that the optimal operation decision means (5602 shown in FIG. 30) generates the optimal operating point for the process operation or the priority of the output control means using the process operation characteristic function 5904 stored in the past. Process 4 performs a delay process, and then the process is returned to Process 1 (3201). Then Process 1 generates the process operation characteristic function parameters 5811 using next new process operation data 3011.

As explained above, this embodiment is further provided with the process operation characteristic function update permission means 3703. Accordingly, by the permission of an operator, it is possible to decide the optimal operating point for the process operation or the priority of the output control means using the newest process operation characteristic function parameter 5811 generated by the process operation characteristic function generation means 3003. Further, when the process data input 5638 are not normal data due to the device inspection or the like, the operator turns the permission signal OFF, and thereby this embodiment can decide the optimal operating point for the process operation or the priority of the output control means using the process operation characteristic function parameter 5811 stored in the past.

Seventh Embodiment

Figure 38:
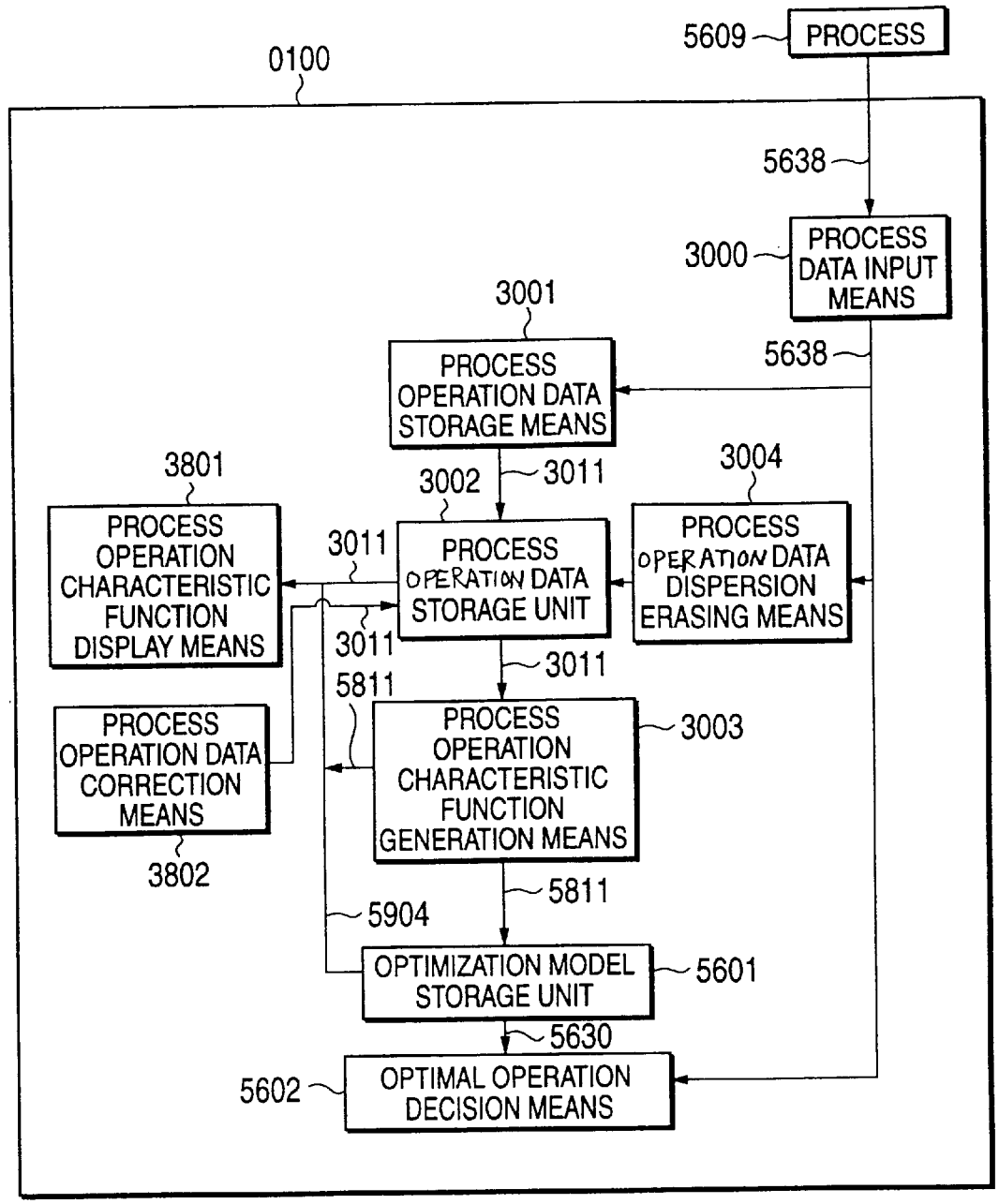
FIG. 38 is a block diagram showing a process control system according to a seventh embodiment of the present invention.

FIG. 38 is a block diagram showing a process control system according to a seventh embodiment of the present invention. In FIG. 38, a process control system 0100 according to this embodiment of the present invention is composed of the process data input means 3000, the process operation data storage means 3001, the process operation data dispersion erasing means 3004, the process operation data storage unit 3002, the process operation characteristic function generation means 3003, the optimization model storage unit 5601, a process operation characteristic function display means 3801, a process operation data correction means 3802, and the optimal operation decision means 5602.

The operation of this embodiment will be explained hereunder. The seventh embodiment shown in FIG. 38 is an embodiment that the process operation characteristic function display means 3801 and the process operation data correction means 3802 are further provided in the fifth or sixth embodiment (FIG. 30). Hereinafter, the operations of the process operation characteristic function display means 3801 and the process operation data correction means 3802 will be mainly explained.

Figure 39:
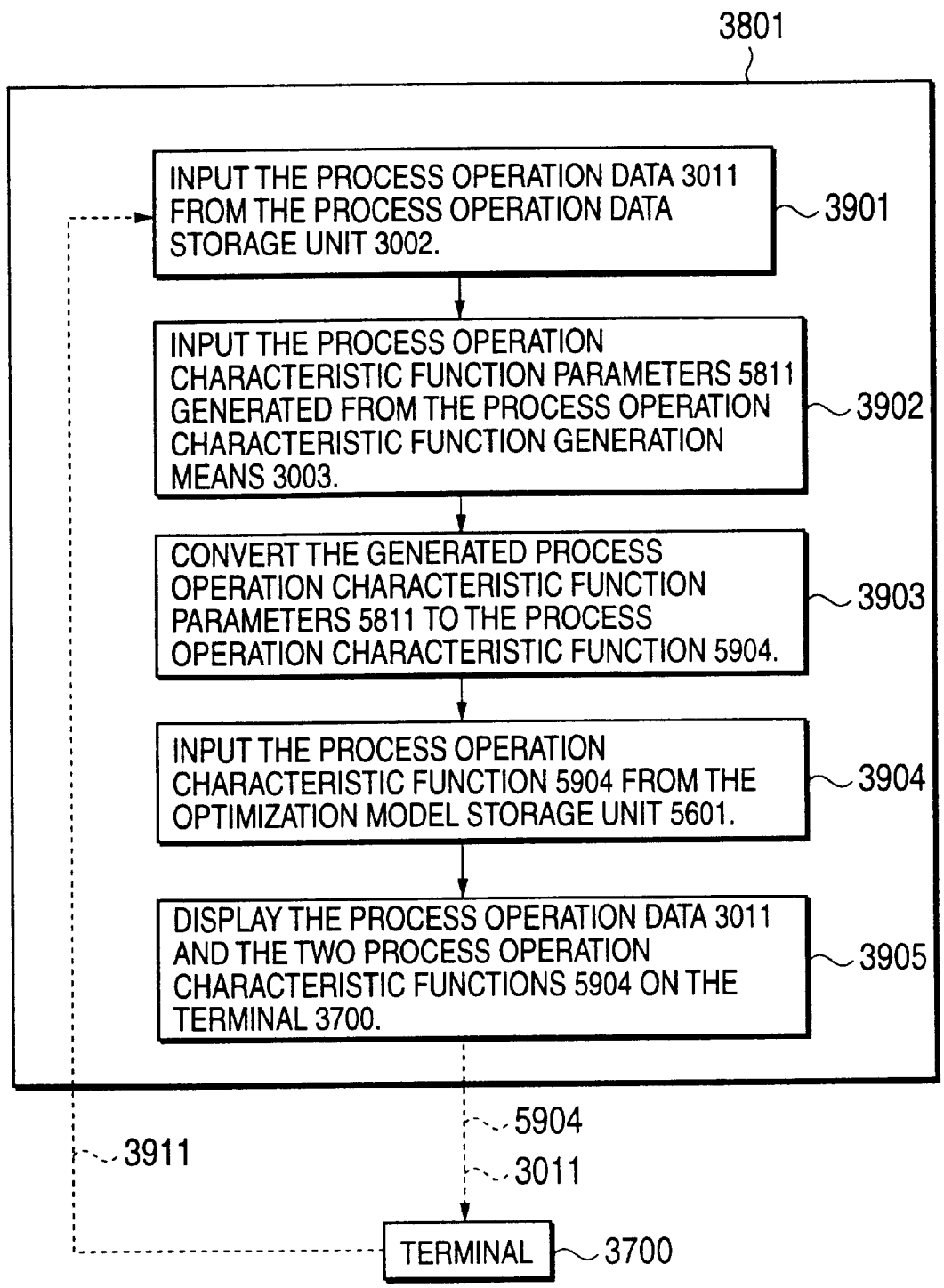
FIG. 39 is a flow chart of the process of the process operation characteristic function display means of the seventh embodiment.

FIG. 39 shows a process in the process operation characteristic function display means 3801. In the drawing, the process operation characteristic function display means 3801 is composed of Processes 1 to 5 (3901 to 3905). The process operation characteristic function display means 3801 starts its processing by a display request 3911 by an operator from the terminal 3700. Process 1 (3901) inputs the process operation data 3011 from the process operation data storage unit 3002. The process operation data 3011 is composed of the paired input of (X, Y), which has the previously explained construction shown in FIG. 35 or 31. Process 2 (3902) inputs the process operation characteristic function parameters 5811 generated by the process operation characteristic function generation means 3003 based on the process operation data 3011 stored in the process operation data storage unit 3002 (FIG. 35 or 31) and inputted by Process 1. Here, it is assumed that the process operation characteristic function parameters 5811 (a(0), a(1), a(2)) inputted by Process 2 are given by Formula 8 and the parameters (a(0), a(1), a(2)) correspond to parameters (a1(0), a1(1), a1(2)) of Formula 1e or 2d1, respectively. Process 3 (3903) generates the process operation characteristic function 5904 for displaying on the terminal 3700 based on Formula 1e or 2d1. Process 4 (3904) inputs the process operation characteristic function 5904 corresponding to the process operation data 3011 stored in the optimization model storage unit 5601 and inputted by Process 1 (3901). Process 5 (3905) outputs the process operation data 3011 obtained by the aforementioned processes (Process 1 to Process 4 (3901 to 3904)) and two process operation characteristic functions 5904 to the terminal 3700 and displays them on the X and Y axes as shown in FIG. 40.

Figure 40:
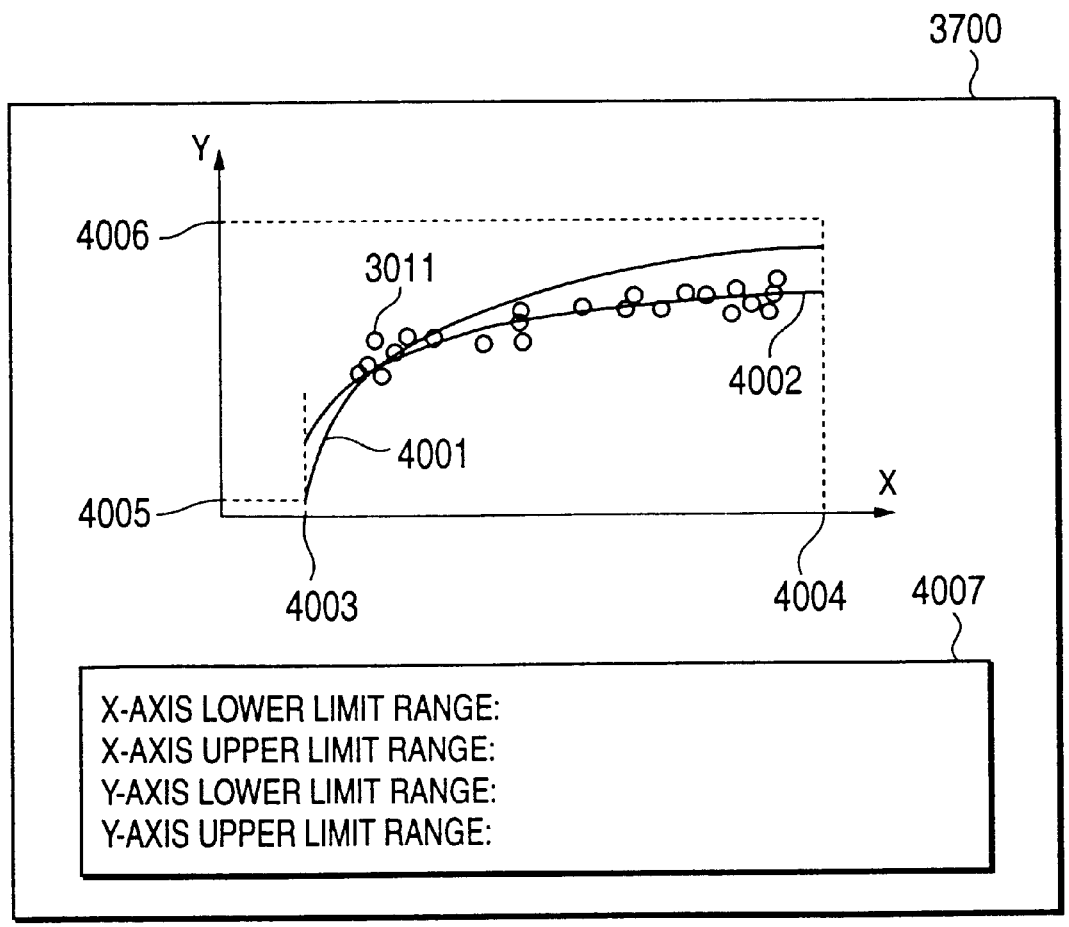
FIG. 40 is a drawing showing a display example on the terminal by the process operation characteristic function display means of the seventh embodiment.

In FIG. 40, the process operation data 3011, a process operation characteristic function (1) (4002), and a process operation characteristic function (2) (4001) correspond to the process operation data 3011 inputted by Process 1 (3901), the process operation characteristic function 5904 obtained by Process 2 (3902) and Process 3 (3903), and the process operation characteristic function 5904 inputted by Process 4 (3904), respectively. The display range on the terminal 3700, that is, an X-axis lower limit range 4003, an X-axis upper limit range 4004, a Y-axis lower limit range 4005, and a Y-axis upper limit range 4006 are decided by setting of an operator in a display range setting section 4007 as shown in FIG. 40.

Figure 41:
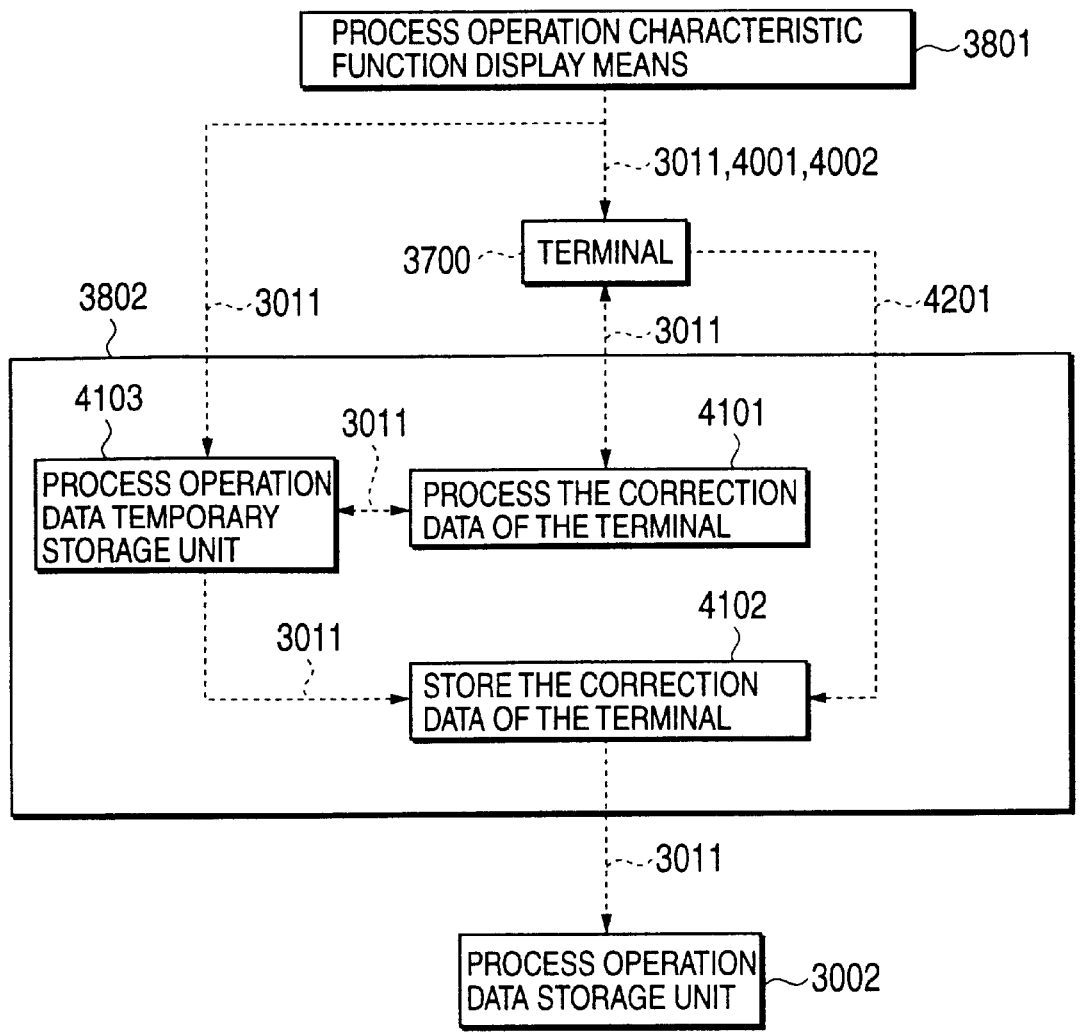
FIG. 41 is a flow chart of the process of the process operation data correction means of the seventh embodiment.

FIG. 41 shows the process in the process operation data correction means 3802. As shown in the drawing, the process operation data correction means 3802 is composed of Process 1 (4101), Process 2 (4102), and a process operation data temporary storage unit (4103). Process 1 (4101) performs the process concerning the process operation data 3011 to be corrected at the terminal 3700. As shown in FIG. 41, the process operation data 3011 displayed on the terminal 3700 by the process operation characteristic function display means 3801 is stored in the process operation data temporary storage unit 4103. The format of the process operation data 3011 stored in the process operation data temporary storage unit 4103 is the same as that of the division system (FIG. 31) explained in the fifth embodiment or that of the neighboring system (FIG. 35) explained in the modified example thereof, that is, the values of the pair (X, Y) of process operation data 3011 and the time thereof are stored.

Figure 42:
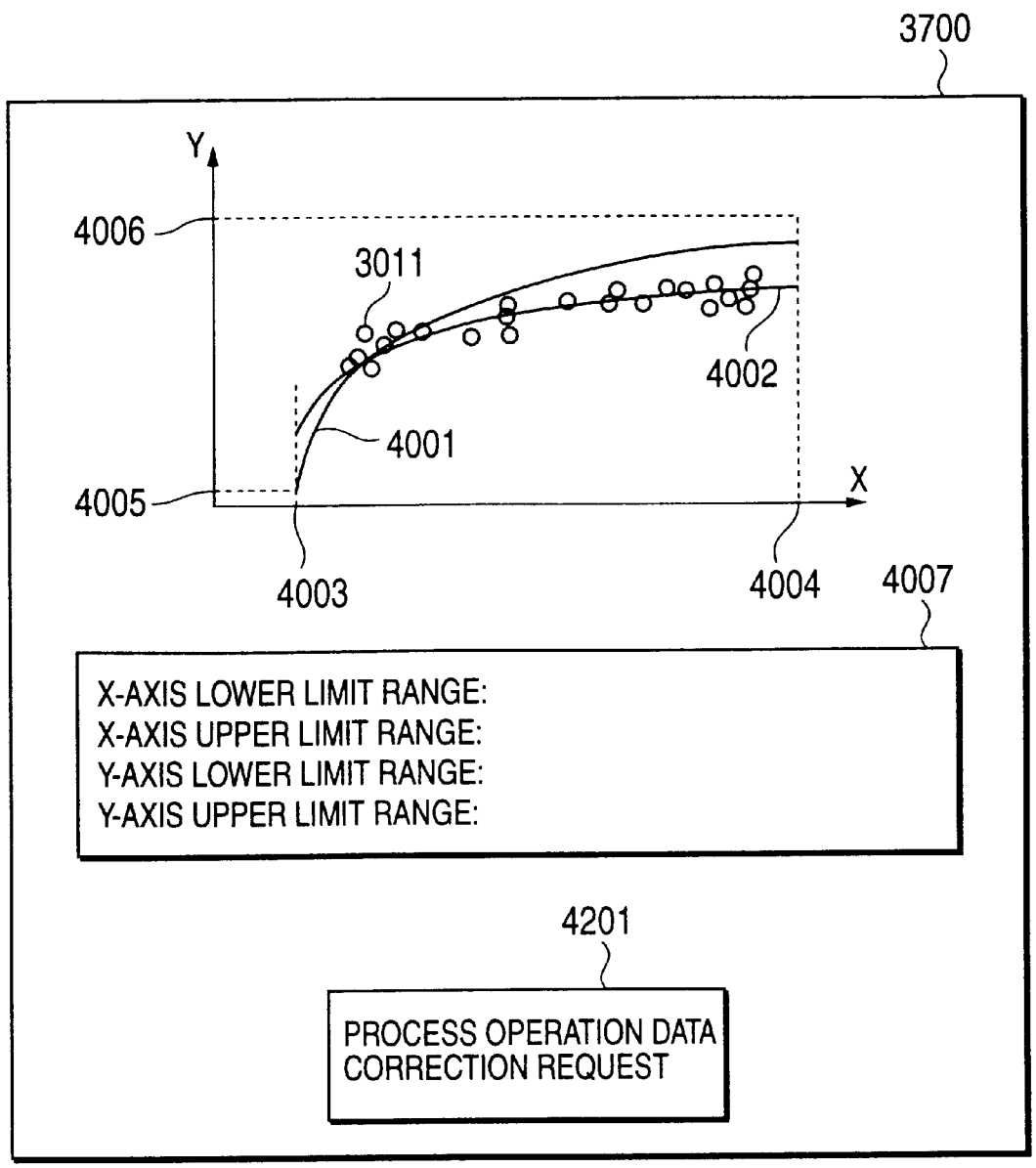
FIG. 42 is a drawing showing a correction screen display example on the terminal by the process operation data correction means of the seventh embodiment.

FIG. 42 shows a screen of a correction terminal of process operation data. In the drawing, the initial data of the process operation data 3011, the process operation characteristic function (1) (4002), and the process operation characteristic function (2) (4001) are displayed based on the processing result of the process operation characteristic function display means 3801 as mentioned above. When the displayed process operation data 3011 is to be corrected by an operator, the correction is carried out such that in FIG. 42, the process operation data 3011 is deleted or added using the keyboard and mouse of the terminal 3700. The deletion means to delete the process operation data 3011 displayed on the terminal 3700 (FIG. 42), and the addition means to add the process operation data 3011 in a certain location on the display screen of the terminal 3700 (FIG. 42). The terminal 3700 calculates the value (X, Y) of the deleted or added process operation data 3011 based on the display range 4007 on the screen, and outputs it to Process 1 (4101 shown in FIG. 41) of the process operation data correction means 3802 together with the time of original data in the case of the deletion and the time of the addition in the case of the addition.

Figure 43:
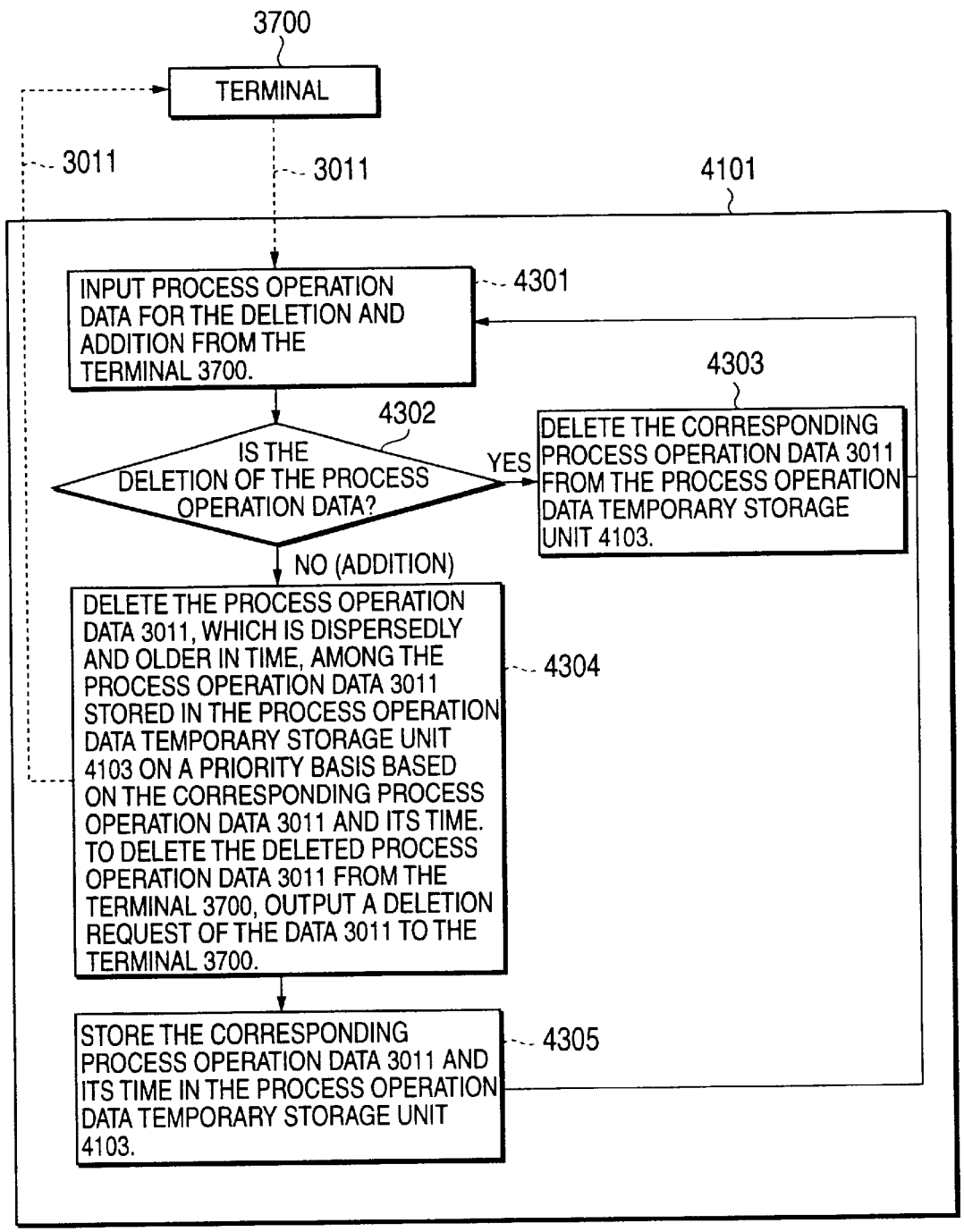
FIG. 43 is a flow chart of the process of the process operation data correction means of the seventh embodiment.

FIG. 43 shows the detail of Process 1 (4101 shown in FIG. 41) of the process operation data correction means 3802. As shown in the drawing, Process 1 (4101) of the process operation data correction means 3802 shown in FIG. 41 is composed of Process 1 (4301) to Process 5 (4305). Process 1 (4301) inputs process operation data (X, Y)t (3011) which is to be deleted or added from the terminal 3700.

Figure 44:
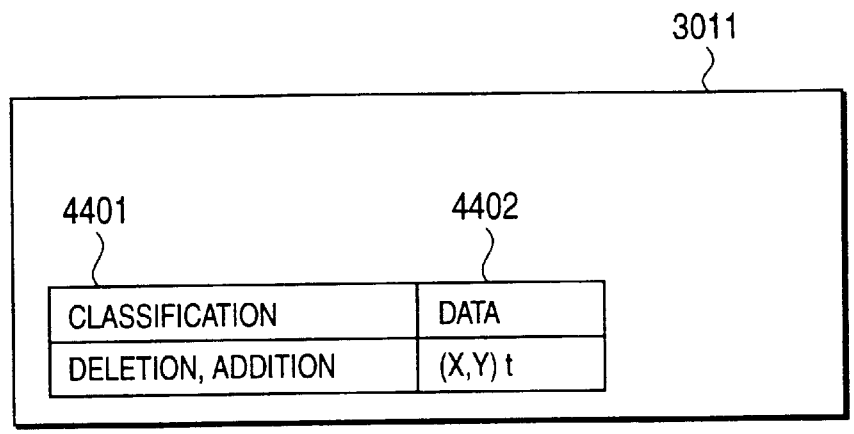
FIG. 44 is a drawing showing the construction of the process operation data of the seventh embodiment.

FIG. 44 shows the format of the process operation data (X, Y)t (3011) which is to be deleted or added and to be outputted to Process 1 (4301) from the terminal 3700. In the drawing, a classification section 4401 shows the classification of the process operation data 3011 outputted to Process 1 (4301) from the terminal 3700. There are two kinds of classifications, that is, the deletion and addition, available. A data section 4402 stores the data and time (X, Y)t of the process operation data 3011.

When an operator deletes the process operation data 3011 at the terminal 3700, the terminal 3700 outputs "deletion" to the classification section 4401, and outputs the process operation data and time 3011 (X, Y)t to be deleted in the corresponding data section 4402 to Process 1 (4301). The time in this case is the original time attached to the process operation data 3011. The attached original time, when the process operation data 3011 is the data displayed by the process operation characteristic function display means 3801, is the time stored in the corresponding process operation data storage unit (3002) (FIG. 31 or 35). When the process operation data 3011 is the data generated by addition, it is the time of addition. When the operator adds the process operation data 3011 at the terminal 3700, the terminal 3700 outputs "addition" to the classification section 4401, and outputs the process operation data and time 3011 (X, Y)t to be added in the corresponding data section 4402 to Process 1 (4301). The time in this case is the time of addition.

Process 2 (4302) judges the classification section 4401 of the process operation data 3011 inputted by Process 1(4301), and when the judgment result shows "deletion", Process 3 (4303) deletes the process operation data 3011 (X, Y) t of the corresponding process operation data temporary storage unit 4103 and returns the processing to Process 1 (4301).

When the judgment result shows "addition", Process 4 (4304) performs the process corresponding to the process operation data dispersion erasing means 3004 explained in the fifth embodiment. When the storage format of the process operation data (3011) stored in the process operation data temporary storage unit 4103 is the division format shown in FIG. 31, Process 4 (4304) deletes the process operation data 3011 which is old in time in the division belonging to the process operation data 3011 (X, Y) to be added, from the process operation data temporary storage unit 4103. When the storage format is the neighboring format shown in FIG. 35, Process 4 (4304) deletes the process operation data 3011 which is old in time in the neighborhood of the process operation data 3011 (X, Y)t to be added, from the process operation data temporary storage unit 4103. In this case, as shown in FIG. 43, Process 4 (4304)

outputs the process operation data 3011 deleted from the process operation data temporary storage unit 4103 to the terminal 3700. The terminal 3700 deletes the corresponding process operation data 3011 from the display screen of the terminal 3700 so as to allow the process operation data 3011 displayed on the terminal 3700 to correspond to the process operation data 3011 stored in the process operation data temporary storage unit 4103. Process 5 (4305) stores the process operation data 3011 inputted from Process 1 (4301) together with the time of the addition in the process operation data temporary storage unit 4103.

When an operator selects a process operation data correction request 4201 on the display screen 4201 (FIG. 42) of the terminal 3700 by clicking the mouse, the terminal 3700 outputs the process operation data correction request 4201 to Process 2 (4102) as shown in FIG. 41. Upon receipt of the process operation data correction request 4201 from the terminal 3700, Process 2 (4102) inputs the process operation data 3011 stored in the process operation data temporary storage unit 4103 and outputs the inputted process operation data 3011 to the process operation data storage unit 3002 for storing it therein.

As explained above, according to this embodiment, an operator can correct the process operation data 3011 by observing the process operation data 3011 and the process operation characteristic function 5904 (4001, 4002) displayed on the terminal 3700. When the process operation data 3011 can not be inputted correctly due to an error of the detector for the process data input 5638, and a part of the inputted process operation data 3011 greatly differs from the stored process operation characteristic function 5904, the operator can correct process operation data 3011 which seems to be faulty by observing the stored process operation characteristic function 5904.

Eighth Embodiment

Figure 45:
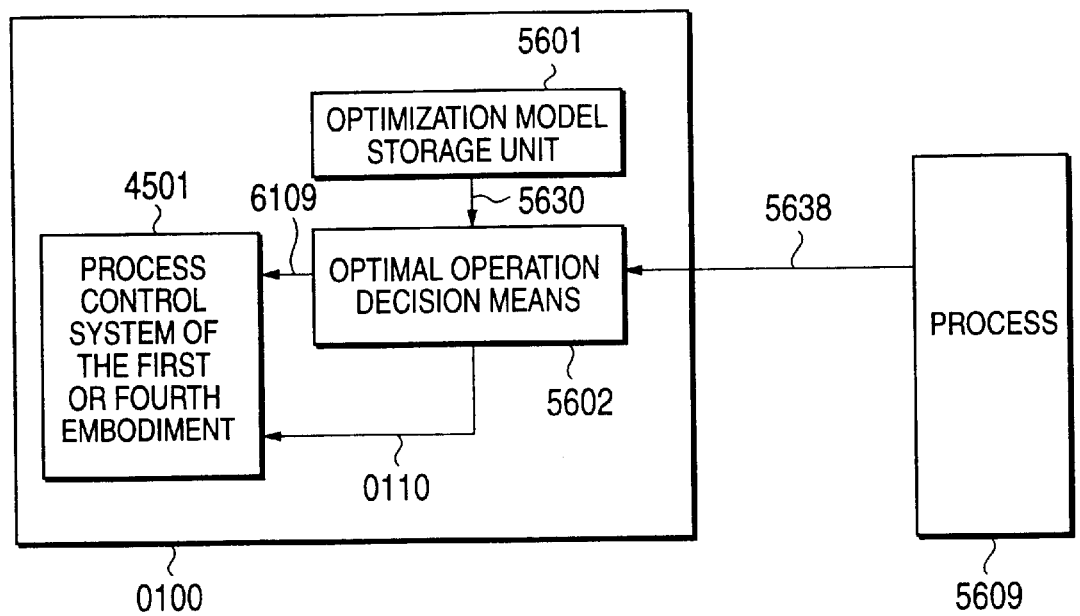
FIG. 45 is a block diagram showing a process control system according to an eighth embodiment of the present invention.

FIG. 45 is a block diagram showing a process control system according to an eighth embodiment of the present invention. In FIG. 45, a process control system 0100 according to this embodiment of the present invention is constructed such that the optimization model storage unit 5601 and the optimal operation decision means 5602 are further provided on the process control system 4501 of the first or fourth embodiment. The process control system 4501 of the first or fourth embodiment corresponds to the process control system 0100 shown in FIG. 1, 5, 21, or 22. The optimization model storage unit 5601, as mentioned above, stores the optimization model 5630 (Formula 1 or 2) necessary to decide the optimal operating point set value 0110 or the optimal priority set value 6109. The optimal operation decision means 5602 is composed of Process 1 (4901) to Process 5 (4905) as shown in FIG. 49.

Figure 46:
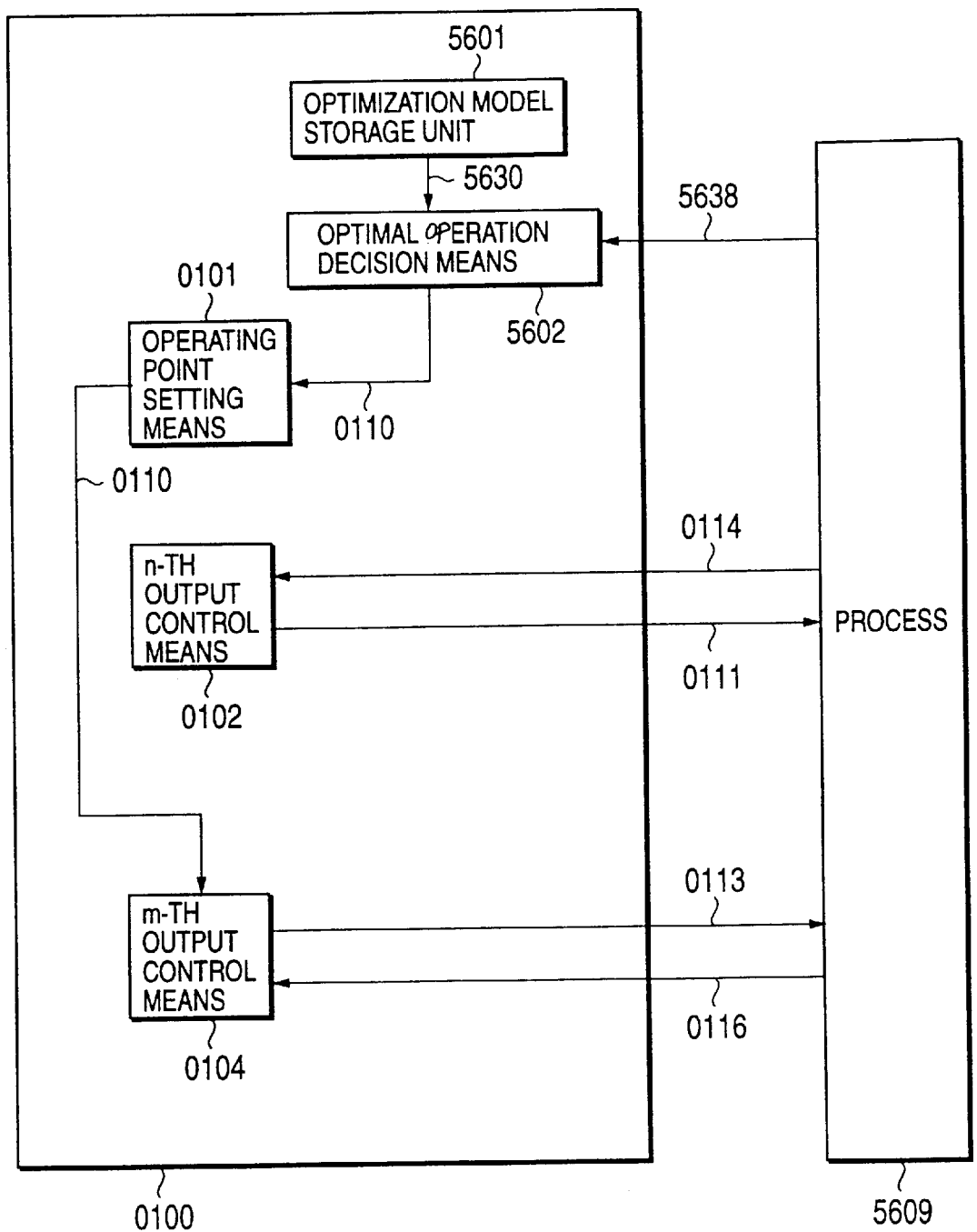
FIG. 46 is a drawing showing a construction example of a process control system relating to the present invention when the eighth embodiment and the embodiment shown in FIG. 1 or a modified example of the embodiment shown in FIG. 5 are combined.
Figure 47:
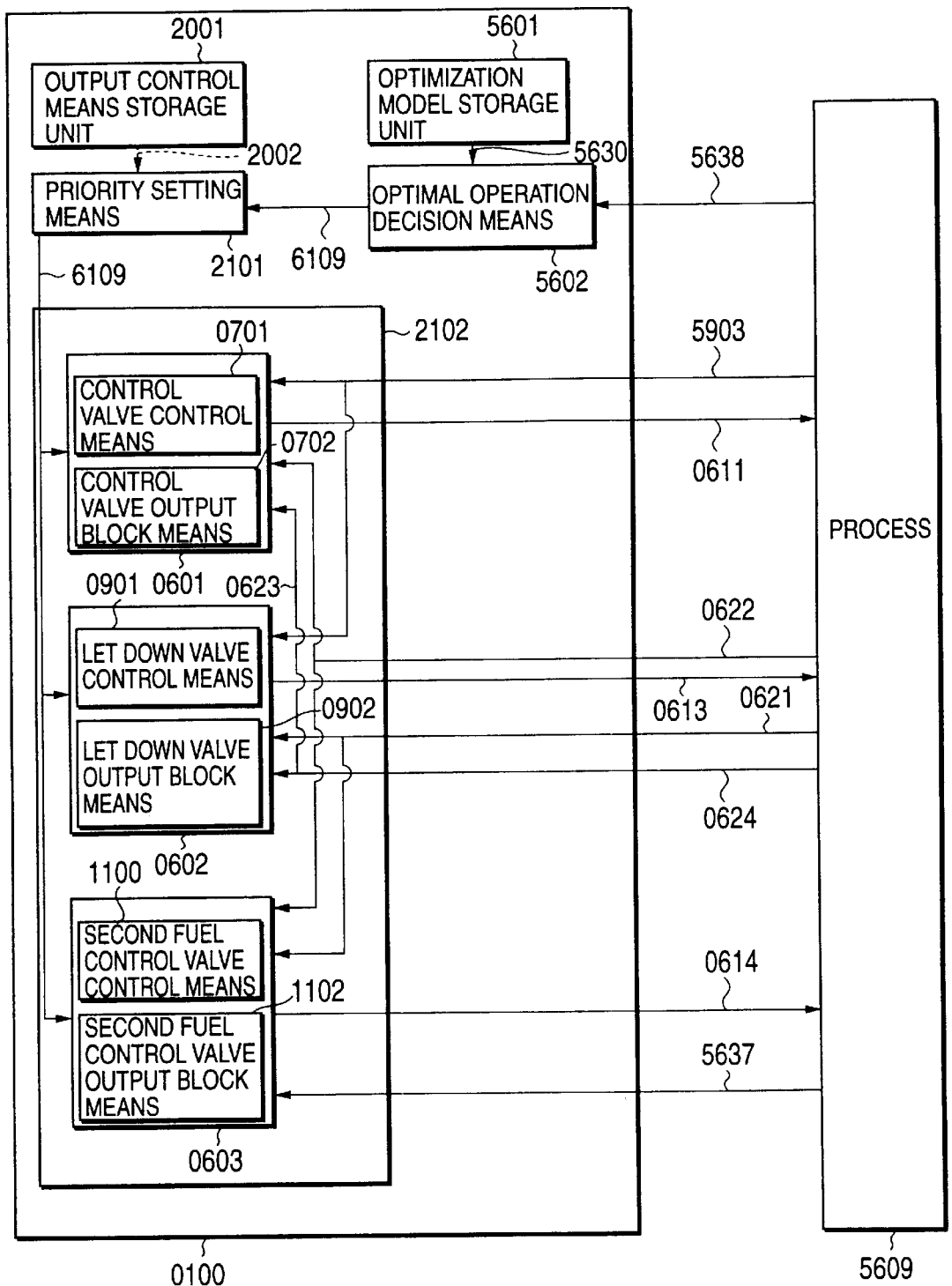
FIG. 47 is a drawing showing a construction example of a process control system relating to the present invention when the eighth embodiment and the embodiment shown in FIG. 21 are combined.
Figure 48:
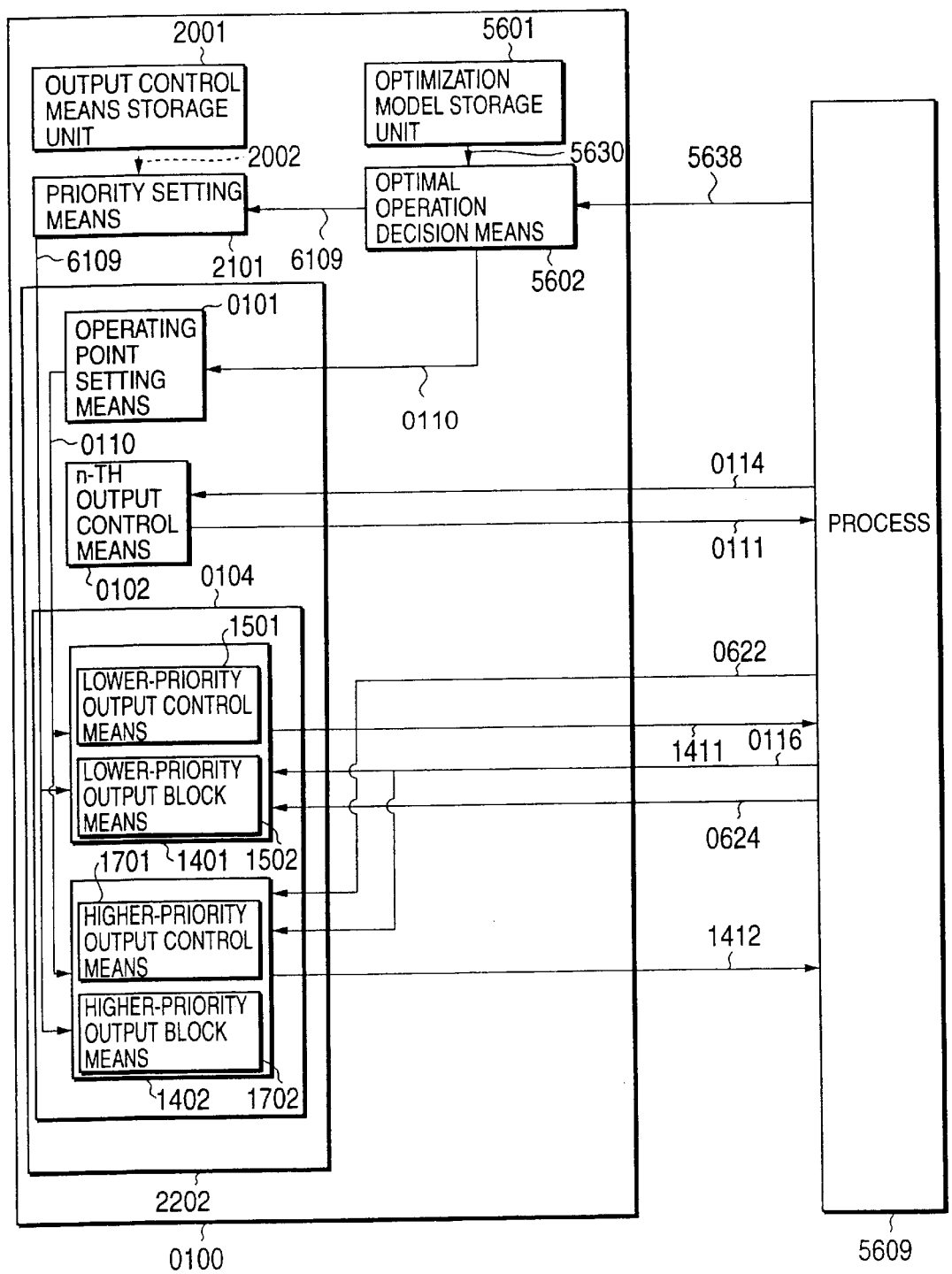
FIG. 48 is a drawing showing a construction example of a process control system relating to the present invention when the eighth embodiment and the embodiment shown in FIG. 22 are combined.

FIGS. 46, 47, and 48 respectively show the constructions of embodiments when the optimization model storage unit 5601 and the optimal operation decision means 5602 are further provided to the process control system 0100 shown in FIG. 1 or 5, FIG. 21 and FIG. 22. The operation of this embodiment will be explained hereunder by referring to those drawings.

Figure 49:
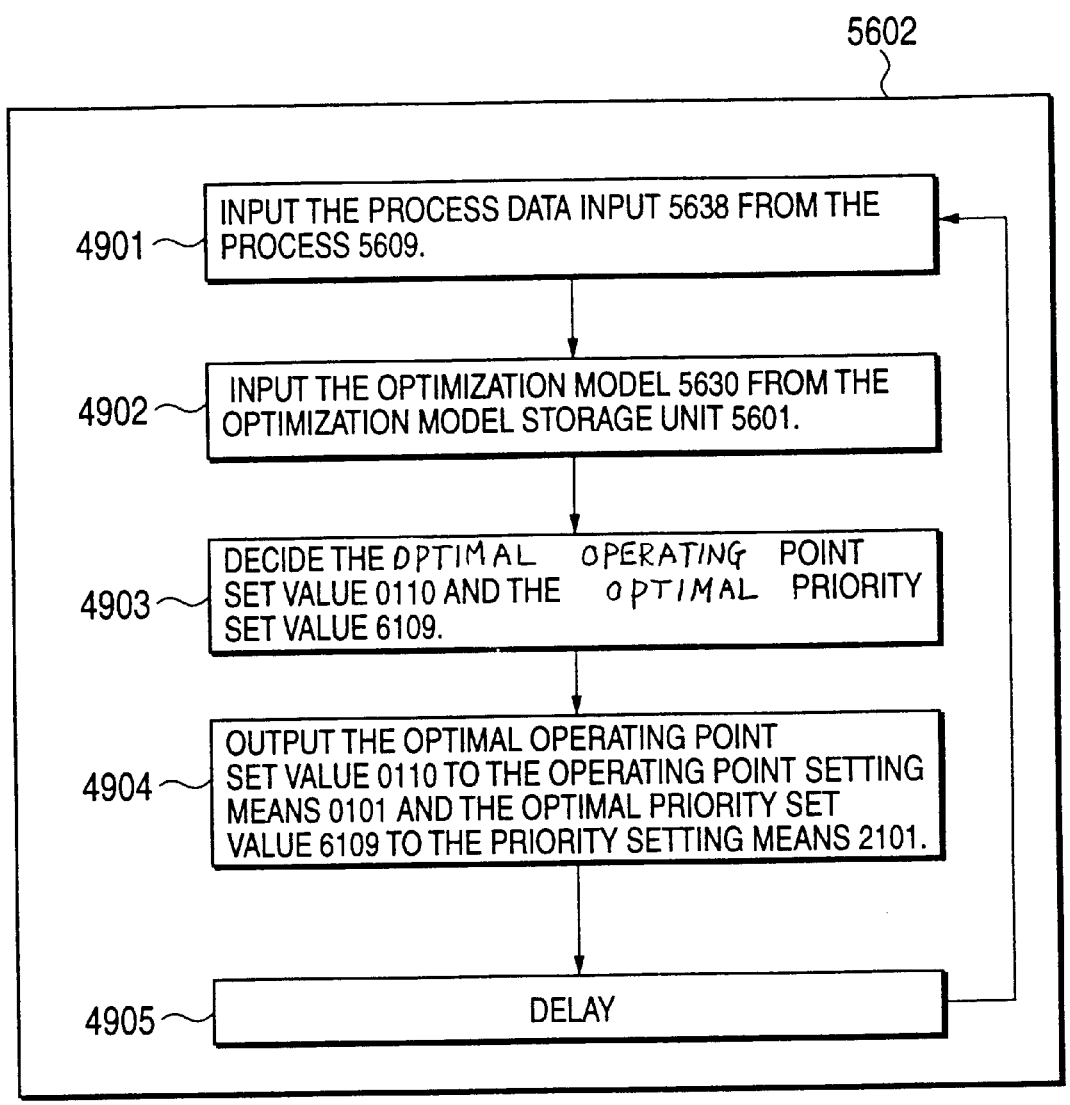
FIG. 49 is a flow chart of the process of the optimal operation decision means of the eighth embodiment.

As shown in FIG. 49, Process 1 (4901) of the optimal operation decision means 5602 inputs the process data input 5638 from the process 5609. Process 2 (4902) inputs the optimization model 5630 from the optimization model storage unit 5601. It is assumed that the input optimization model 5630 is expressed by, for example Formula 1 or 2. Process 3 (4903) decides the optimal operating point set value 0110 corresponding to the value (Xi, Yj), or the optimal priority set value 6109 by an optimization tool, for example indicated in the document as described above, based on the inputted optimization model 5630. In this case, Ximin, Ximax, aj(0), aj (1), and aj (2) are constants, and in Formula 1, i=1 and 2 and j=1 , 2, and 3, and in Formula 2, i=1, - - - , and n and j=1, - - - , and n. L indicates the steam flow 5627 of the steam load facility 5617 as mentioned above. Process 4 (4904) sets the optimal operating point set value 0110 decided by Process 3 (4903) in the operating point setting means 0101 (FIGS. 48, 46) and the optimal priority set value 6109 in the priority setting means 2101 (FIG. 48, 47), respectively. The delay process is performed by Process 5 (4905), and then the process is returned to Process 1 (4901). Then the new optimal operating point set value 0110 or the optimal priority set value 6109 is decided based on the new process data input 5638 and the optimization model 5630.

When combined with the first embodiment (FIG. 1) or the modified example (FIG. 5) of the first embodiment as shown in FIG. 46, the optimal operation decision means 5602, as mentioned above, decides the optimal operating point set value 0110 based on the optimization model 5630 stored in the optimization model storage unit 5601 and the process data input 5638 inputted from the process 5609. The optimal operation decision means 5602 outputs the decided optimal operating point set value 0110 to the operating point setting means 0101. The subsequent operations of the operating point setting means 0101 and so on are as explained in the first embodiment. That is, the n-th output control means 0102 of the fast response controls the turbine exhaust pressure, that is the main input 0114, while keeping it at the optimal n-th operating point set value 0110 decided by the optimal operation decision means 5602.

When combined with the fourth embodiment (FIG. 2) having the priority setting means 2102 as shown in FIG. 47, the optimal operation decision means 5602, as mentioned above, decides the optimal priority set value 6109 concerning the priority process of the priority level section 6201 and the control means section 6202 based on the optimization model 5630 stored in the optimization model storage unit 5601 and the process data input 5638 inputted from the process 5609. The optimal operation decision means 5602 outputs the decided optimal priority set value 6109 to the priority setting means 2101. The subsequent operations of the priority setting means 2101 and so on are as explained in the fourth embodiment (FIG. 21) having the priority setting means 2101. That is, in accordance with the optimal priority set by the optimal operation decision means 5602, the priority setting means 2101 and so on control the higher-priority output toward the upper limit value on a priority basis and the lower-priority output toward the lower limit value on a priority basis.

When combined with the process control system (FIG. 22) of the fourth embodiment having the operating point setting means 0101 and priority setting means 2102 as shown in FIG. 48, the optimal operation decision means 5602, as mentioned above, decides the optimal operating point set value 0110 and the optimal priority set value 6109 concerning the priority process of the priority level section 6201 (FIG. 13) and the control means section 6202 (FIG. 13) based on the optimization model 5630 stored in the optimization model storage unit 5601 and the process data input 5638 inputted from the process 5609. The optimal operation decision means 5602 outputs the decided optimal operating point set value 0110 and the decided optimal priority set value 6109 to the operating point setting means 0101 and the priority setting means 2101, respectively. The subsequent operations of the operating point setting means 0101 and so on and the priority setting means 2101 and so on are as explained in the process control system (FIG. 22) of the fourth embodiment having the operating point setting means 0101 and the priority setting means 2102. That is, in accordance with the optimal operating point set value 0110 and the optimal priority set value 6109 set by the optimal operation decision means 5602, the operating point setting means 0101 and so on and the priority setting means 2101 and so on control the higher-priority output toward the upper limit value on a priority basis and the lower-priority output toward the lower limit value on a priority basis, while the control output of the fast response operates at the desired operating point.

As explained above, this embodiment produces an effect that in accordance with the optimal operating point and the optimal priority set by the optimal operation decision means 5602, the higher-priority output can be controlled toward the upper limit value on a priority basis and the lower-priority output can be controlled toward the lower limit value on a priority basis, while the control output of the fast response operates at the desired operating point.

Ninth Embodiment

Figure 50:
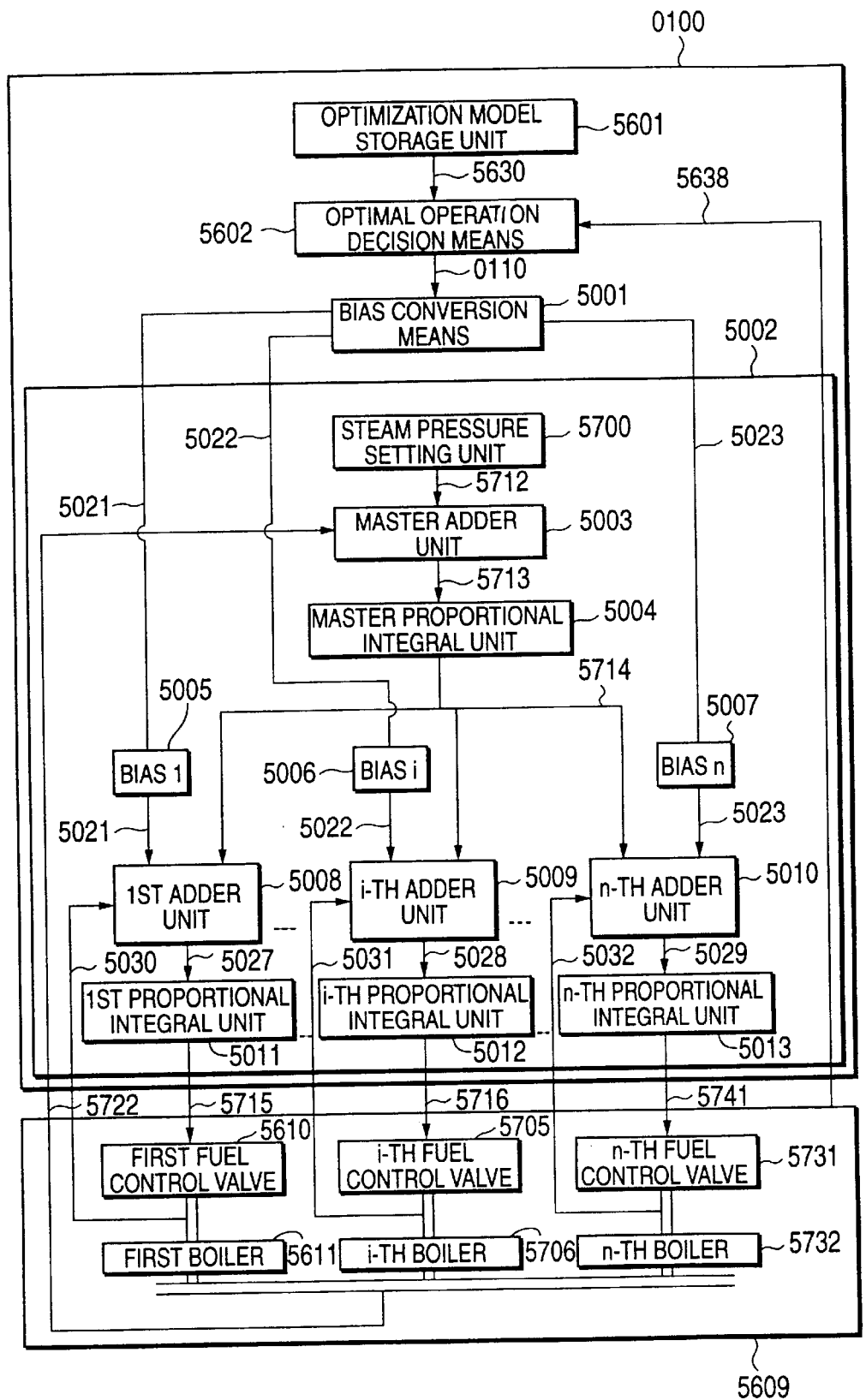
FIG. 50 is a block diagram showing a process control system according to a ninth embodiment of the present invention.
Figure 57:
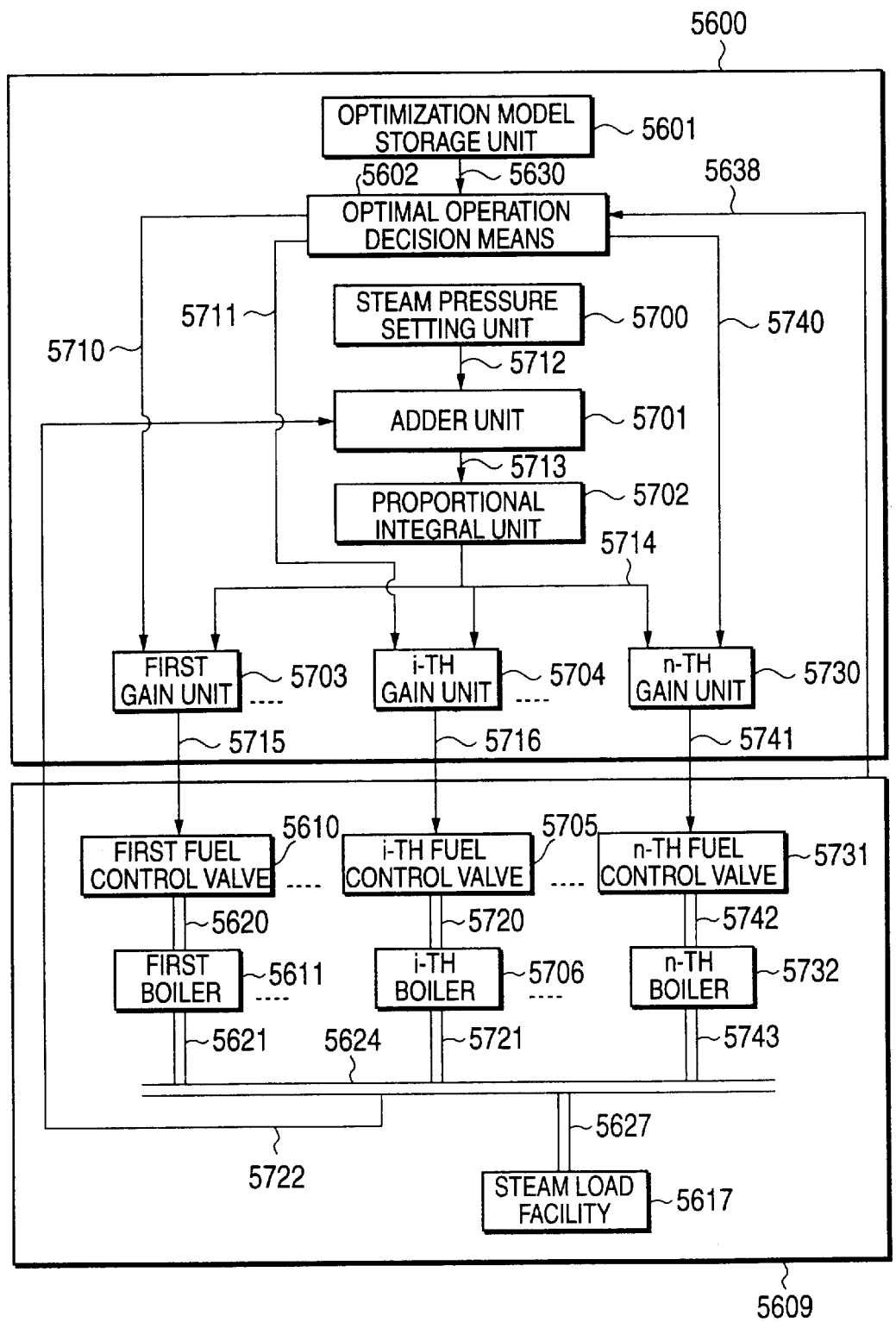
FIG. 57 is a drawing showing the construction of a coordinate control system having the conventional optimal operation decision means when there are a plurality of optimal operating points available.
Figure 58:
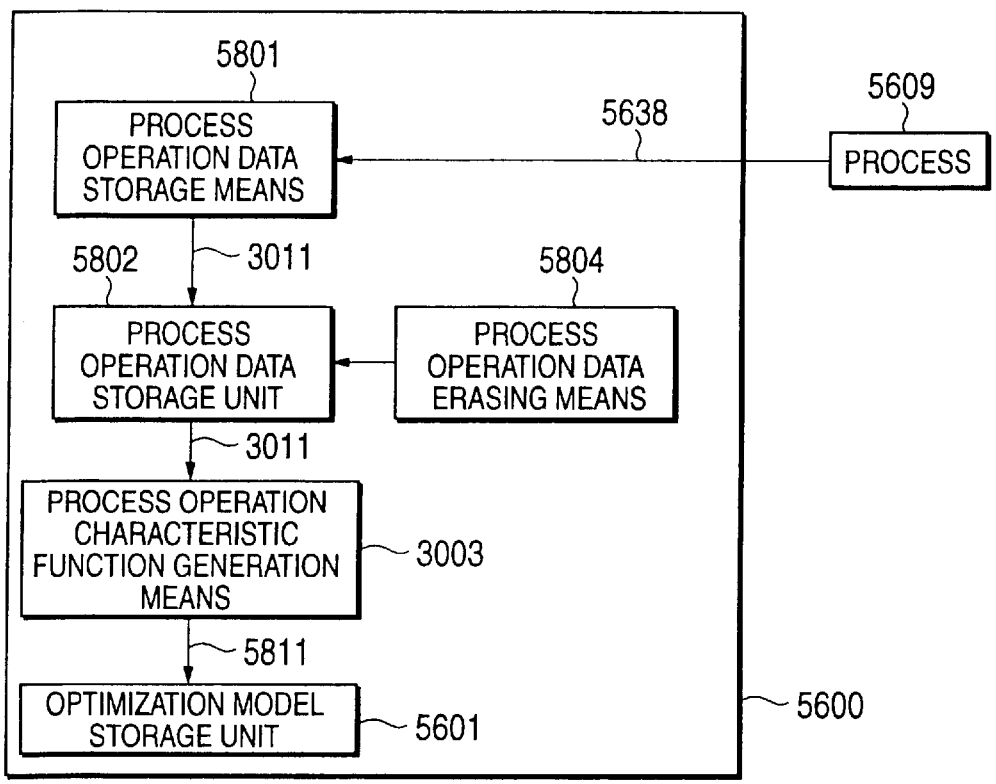
FIG. 58 is a drawing showing the construction of a conventional automatic generation device of the process operation characteristic function.
Figure 59:
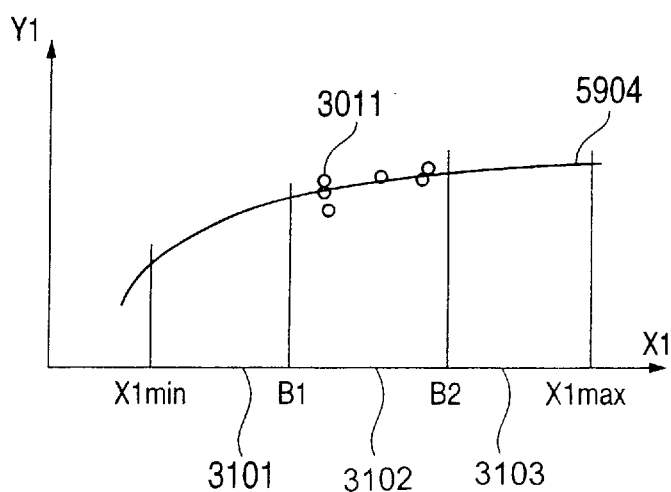
FIG. 59 is a drawing showing the process operation characteristic function and process data.
Figure 60:
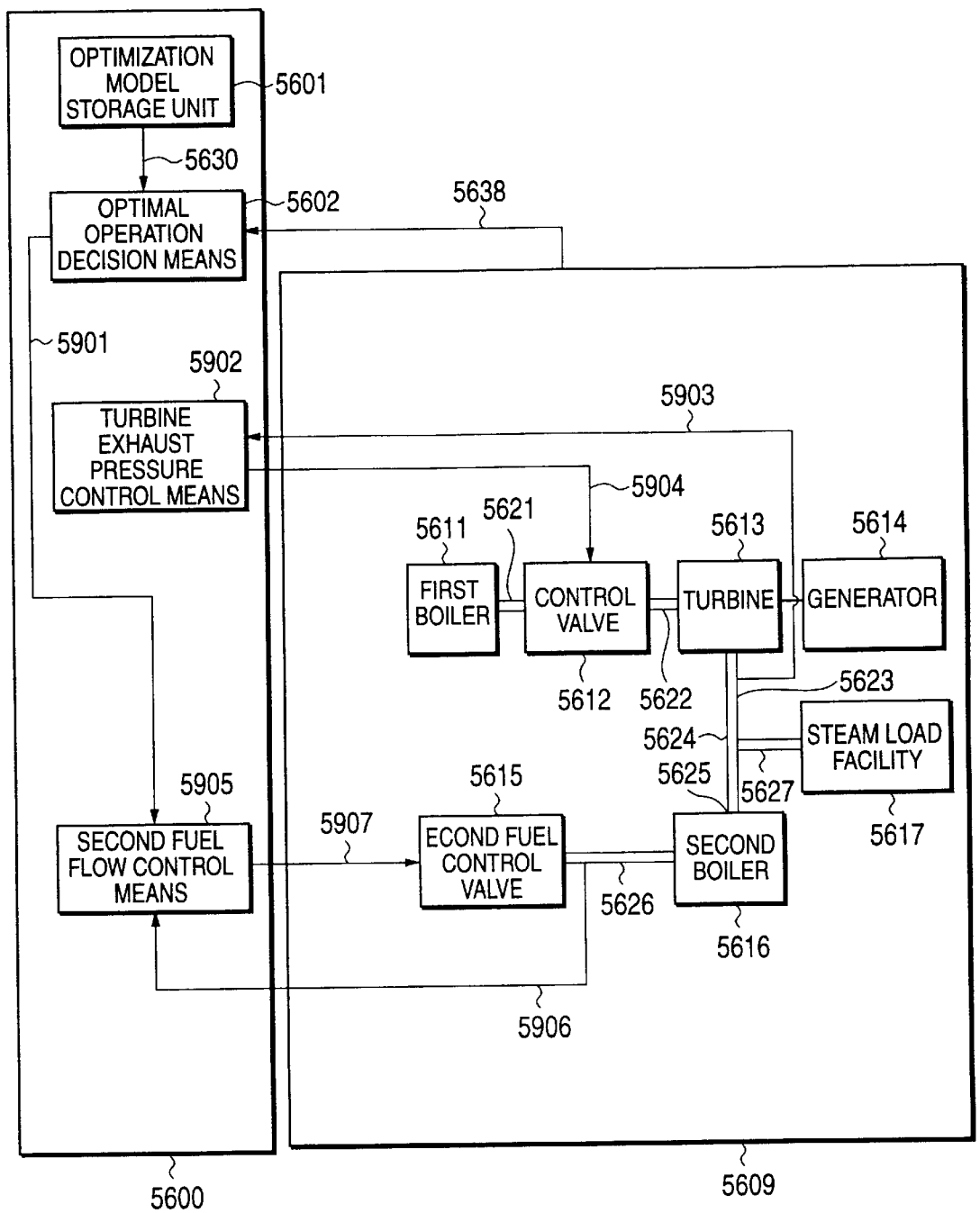
FIG. 60 is a drawing showing the construction of a coordinate control system having the conventional optimal operation decision means.
Figure 61:
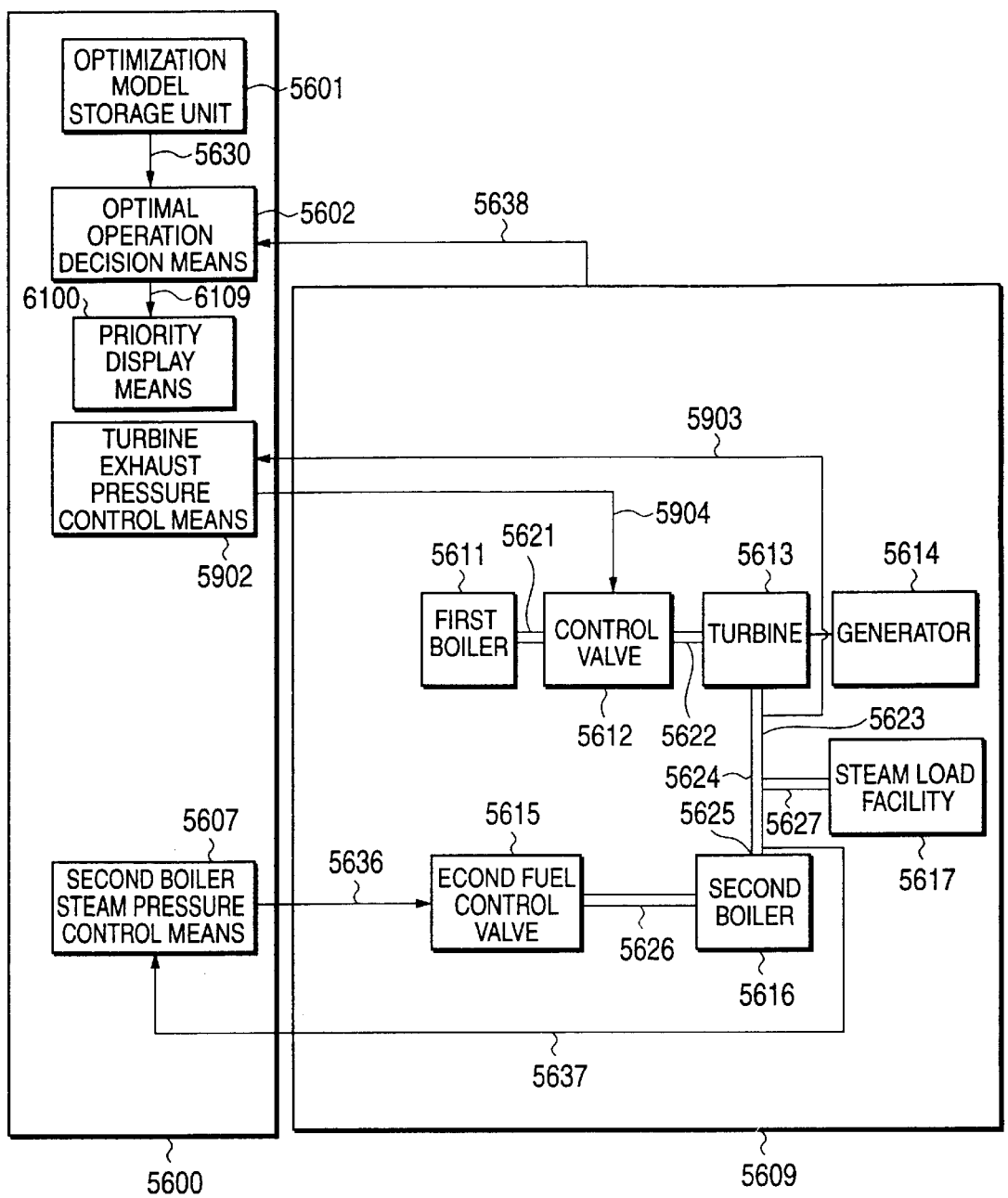
FIG. 61 is a drawing showing the construction of a coordinate control system having the conventional optimal operation decision means.
Figure 62:
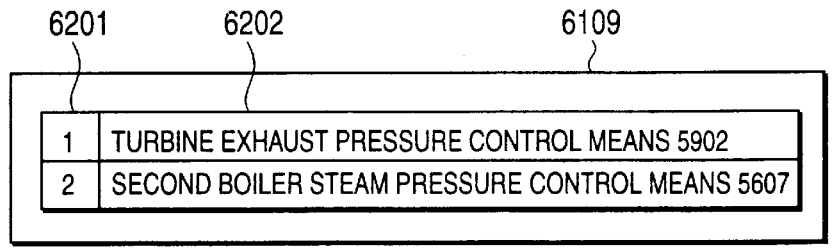
FIG. 62 is a drawing showing the construction of the priority set value of the same conventional example.

FIG. 50 is a block diagram showing a process control system according to a ninth embodiment of the present invention. In FIG. 50, a process control system 0100 according to this embodiment of the present invention is structured so that the optimization model storage unit 5601, the optimal operation decision means 5602, and a bias conversion means 5001 are further provided on a conventional general control system 5002. The process 5609 indicated in this embodiment corresponds to the process 5609 shown in FIG. 57, which is composed of n boiler facilities.

The operation of this embodiment will be explained hereunder. The optimal operation decision means 5602, as mentioned above, decides the optimal operating point set value 0110 based on the optimization model 5630 stored in the optimization model storage unit 5601 and the process data input 5638 inputted from the process 5609. An example of the optimization model 5630 is given by Formula 2. It is assumed that the optimal operating point set value 0110 decided on the basis of Formula 2 are optimal boiler fuel flows X1*, - - - , Xi*, - - - , and Xn*. The bias conversion means 5001 converts the optimal boiler fuel flows Xi*, - - - , Xi*, - - - - , and Xn* to an optimal first bias value X1b (5021), - - - , an optimal i-th bias value Xib (5022), - - - , and an optimal n-th bias value Xnb (5023), and outputs the respective converted optimal bias values to the corresponding bias setting means (5005, - - - , 5006, - - - , 5007) in the general control system 5002. Here, the bias conversion means 5001 converts the optimal boiler fuel flows X1*, - - - , Xi*, - - - , and Xn* to the optimal boiler fuel bias values X1b (5021), - - - - , Xib (5022), - - - , and Xnb (5023) by a following Formula 10 composed of Formulas 10a, - - - - , 10b, - - - , and 10c.

Formula 10

$$x1b = x1^* - \frac{\sum_{j=1}^{n} xj^*}{n} \quad (10a)$$

$$xib = xi^* - \frac{\sum_{j=1}^{n} xj^*}{n} \quad (10b)$$

$$xnb = xn^* - \frac{\sum_{j=1}^{n} xj^*}{n} \quad (10c)$$

The bias setting means (5005, 5006, 5007) input the first bias value Xib (5021), the i-th bias value Xib (5022), and the n-th bias value Xnb (5023) from the bias conversion means 5001, respectively, and outputs them to a first adder unit 5008, an i-th adder unit 5009, and an n-th adder unit 5010, respectively.

The steam pressure setting unit 5700 presets a steam pressure set value 5712 for the steam header steam pressure 5722. A master adder unit 5003 calculates a steam pressure deviation 5713 between the steam header steam pressure 5722 inputted from the process 5609 and the steam pressure set value 5712 set by the steam pressure setting unit 5700. A master proportional integral unit 5004 calculates a fuel master 5714 so as to bring the steam pressure deviation 5713 close to zero, and outputs the calculated fuel master 5714 to the respective adder units (5008, 5009, 5010). The respective adder units (5008, 5009, 5010) make calculations concerning a corresponding first fuel deviation 5027, a second fuel deviation 5028, and an n-th fuel deviation 5029 by the following Formula 11 composed of Formulas 11a, - - - , 11b, - - - , and 11c.

Formula 11

$$E1 = F + X1b - X1 \quad (11a)$$

$$Ei = F + Xib - Xi \quad (11b)$$

$$En = F + Xnb - Xn \quad (11c)$$

Here, E1, Ei, and En indicate the first, i-th, and n-th fuel deviations (5027, 5028, 5029), respectively, and F indicates the fuel master 5714. X1b, Xib, and Xnb indicate the first, i-th, and n-th bias values (5021, 5022, 5023), respectively. X1, Xi, and Xn indicate fuel flows (5030, 5031, 5032) of the first, i-th, and n-th fuel control valve (5610, 5705, 5731) inputted from the process 5609, respectively. When the control is in the stationary state, the first, i-th, and n-th fuel deviations E1, Ei, and En (5027, 5028, 5029) are zero, so that a following Formula 12 are given from Formulas 10 and 11. Here, Formula 12 is composed of Formulas 12a, - - - , 12b, - - - , 12c, and 12d.

Formula 12

$$x1 = x1^* + \frac{\sum_{j=1}^{n} xj}{n} - \frac{\sum_{j=1}^{n} xj^*}{n} = x1^* + D \quad (12a)$$

$$xi = xi^* + \frac{\sum_{j=1}^{n} xj}{n} - \frac{\sum_{j=1}^{n} xj^*}{n} = xi^* + D \quad (12b)$$

$$xn = xn^* + \frac{\sum_{j=1}^{n} xj}{n} - \frac{\sum_{j=1}^{n} xj^*}{n} = xn^* + D \quad (12c)$$

$$D = \frac{\sum_{j=1}^{n} xj}{n} - \frac{\sum_{j=1}^{n} xj^*}{n} \quad (12d)$$

By Formula 12, as the optimal fuel flow Xi* increases (decreases), the corresponding fuel flow Xi is controlled to increase (decrease) As shown in Formula 12, the more accurate the optimization model that means the process operation characteristic function (Formulas 1e, 1f, 1g or Formula 2d) close to the actual process, the smaller the D (Formula 12d) will be, and thus the closer the actual fuel flow X1 - - - Xi - - - Xn to the optimal fuel flow X1* - - - Xi* - - - Xn* (Formulas 12a, 12b, 12c). The proportional integral units (5011, 5012, 5013) calculate fuel control valve control outputs (5715, 5716, 5741) based on the control gains set in the proportional integral units (5011, 5012, 5013) so as to bring the fuel deviations (5027, 5028, 5029) close to zero, and output them to the process 5609, respectively.

In this way, according to this embodiment, the optimal bias values (5021, 5022, 5023) corresponding to the optimal fuel flow Xi* (0110) are set in the bias setting means (5005, 5006, 5007), respectively. Accordingly, a more stable process control system can be provided by controlling the process 5609 in proportion to the optimal operating point at the initially set control gain without the control gains of the respective proportional integral units (5011, 5012, 5013) being affected by the optimal fuel flow Xi* (0110).

Tenth Embodiment

Figure 51:
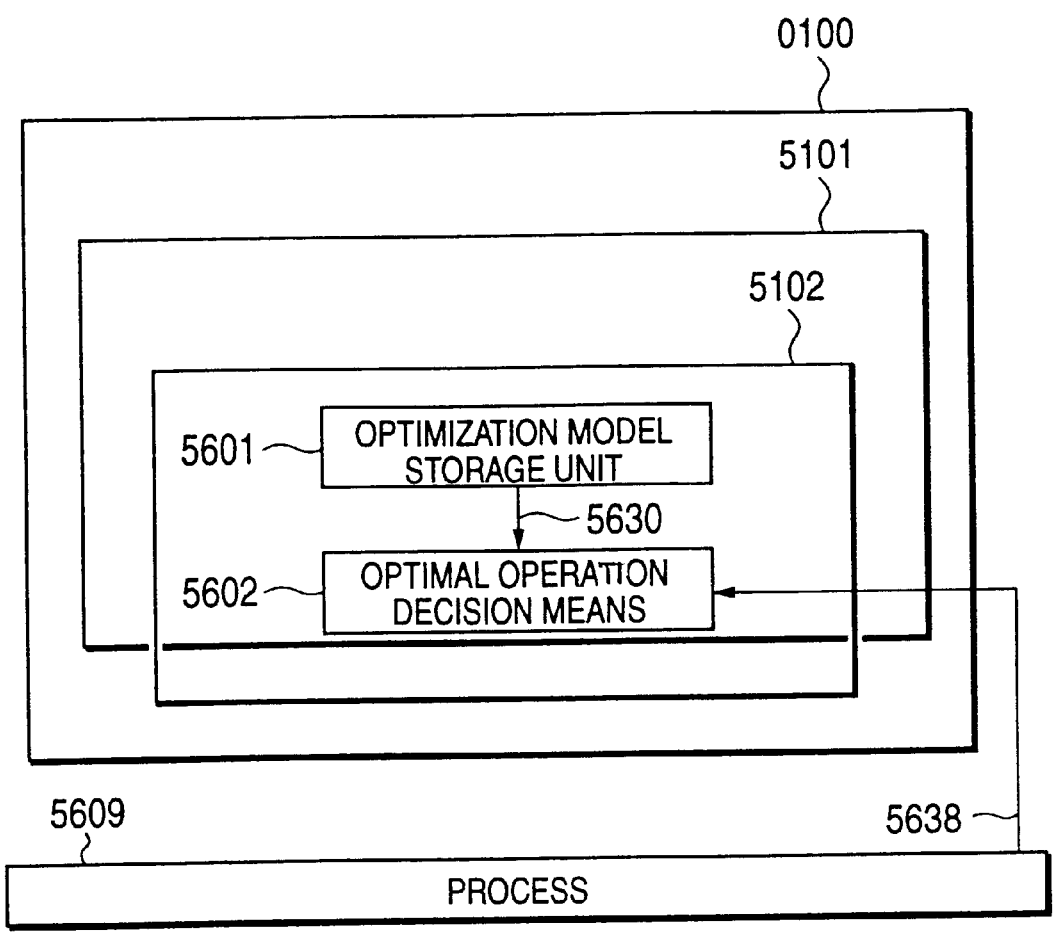
FIG. 51 is a block diagram showing a process control system according to a tenth embodiment of the present invention.
Figure 52:
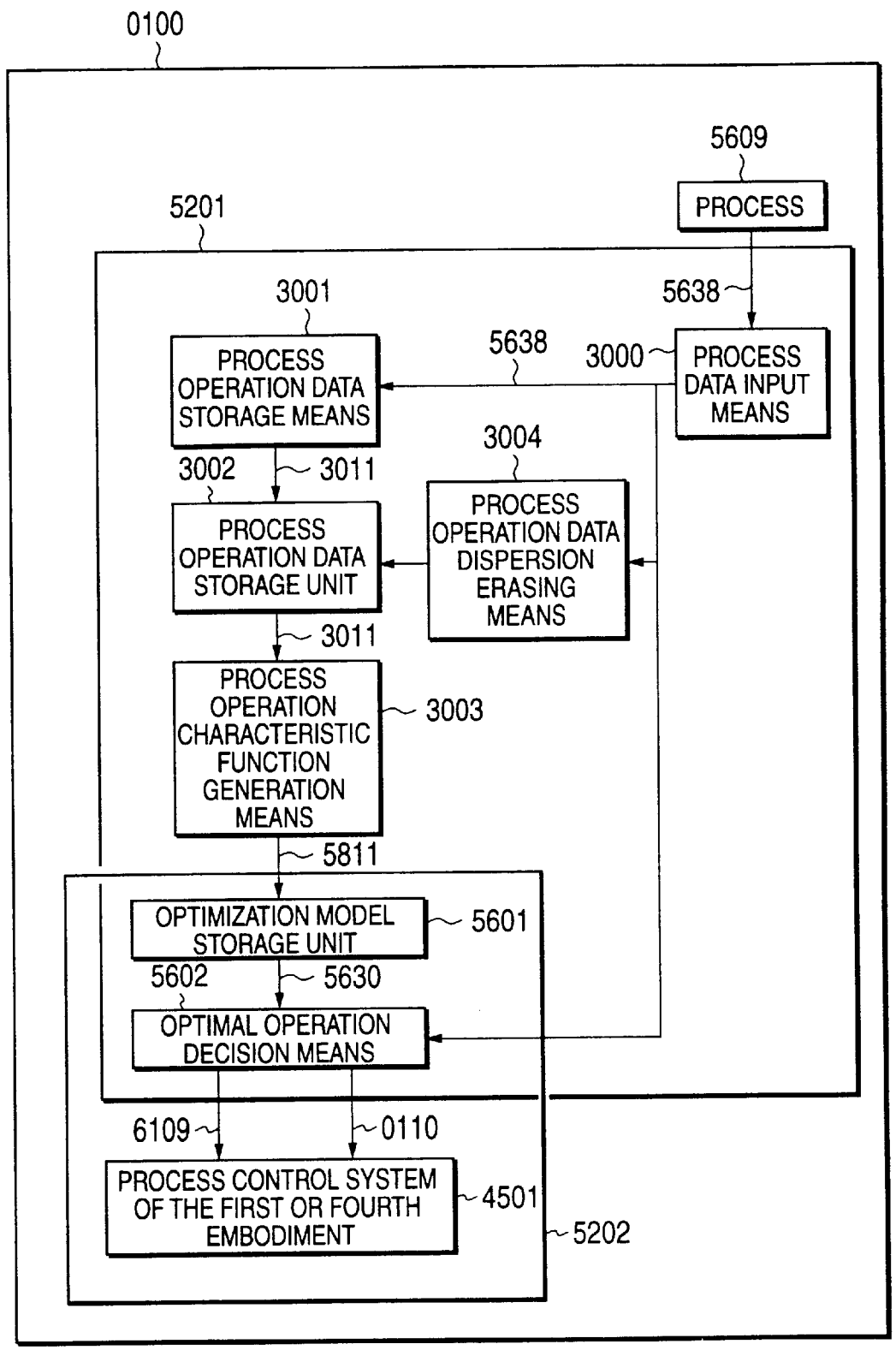
FIG. 52 is a drawing showing the construction of a process control system relating to the present invention when the embodiment shown in FIG. 30 and the embodiment shown in FIG. 45 are combined.
Figure 53:
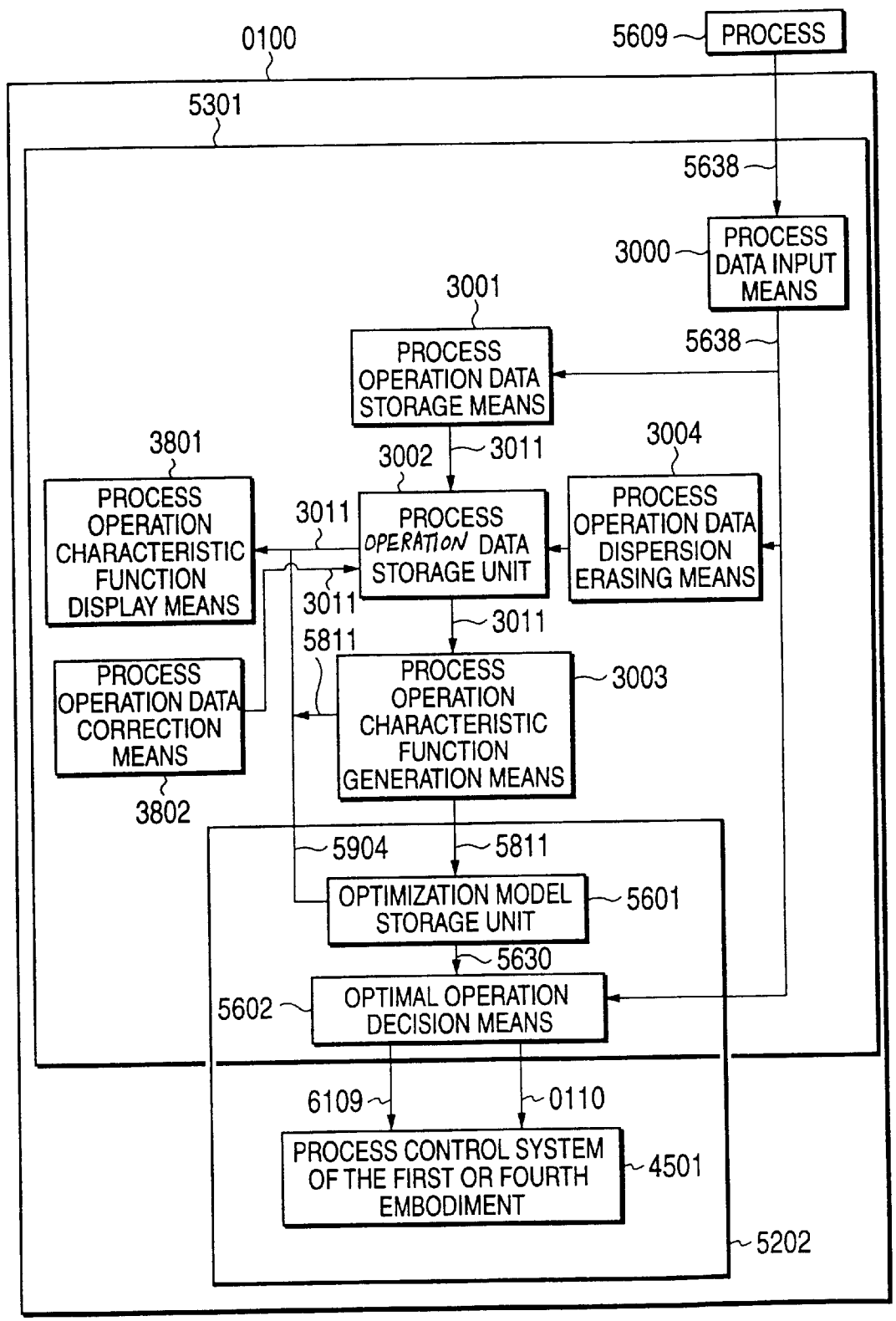
FIG. 53 is a drawing showing the construction of a process control system relating to the present invention when the embodiment shown in FIG. 38 and the embodiment shown in FIG. 45 are combined.
Figure 54:
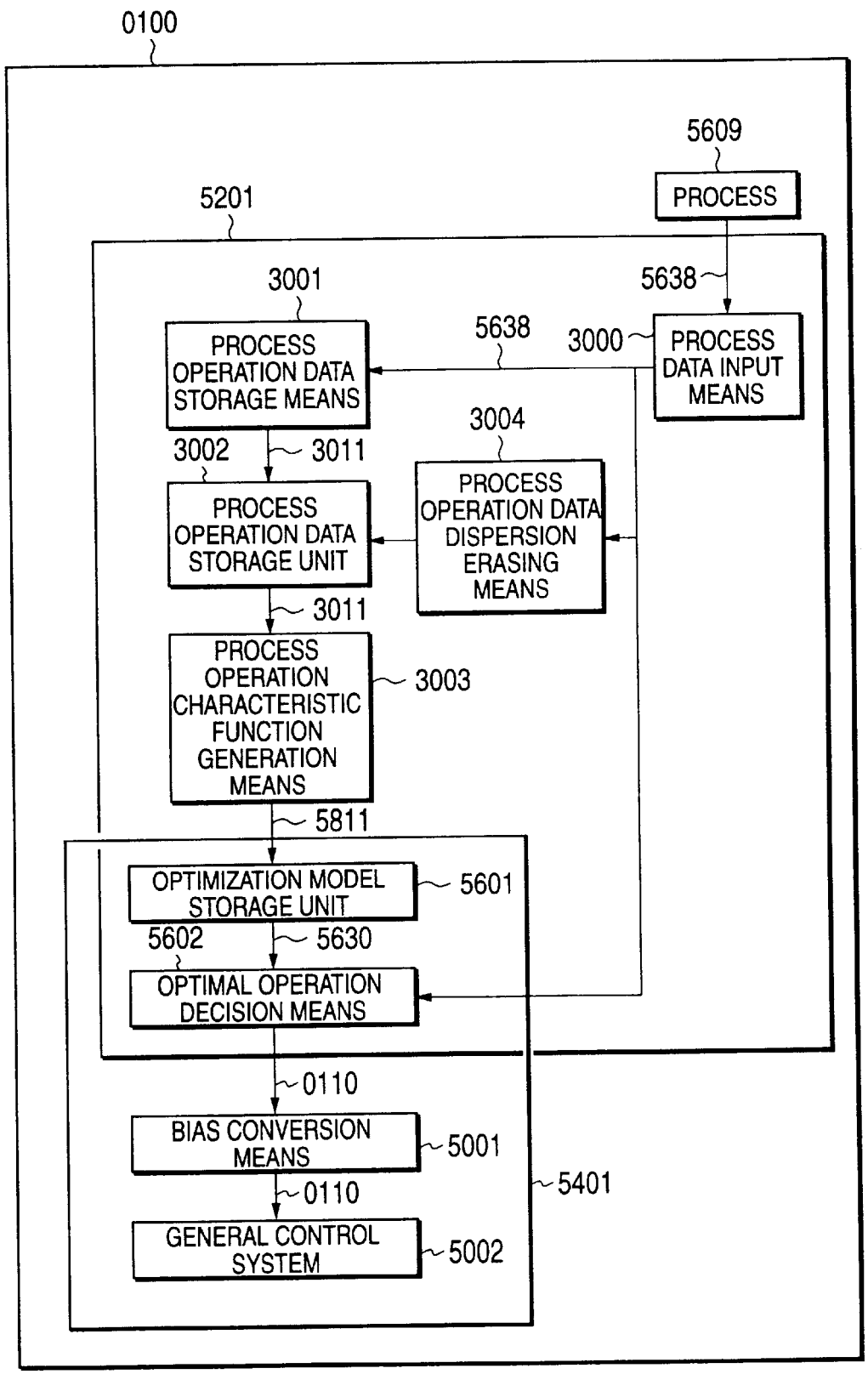
FIG. 54 is a drawing showing the construction of a process control system relating to the present invention when the embodiment shown in FIG. 30 and the embodiment shown in FIG. 50 are combined.
Figure 55:
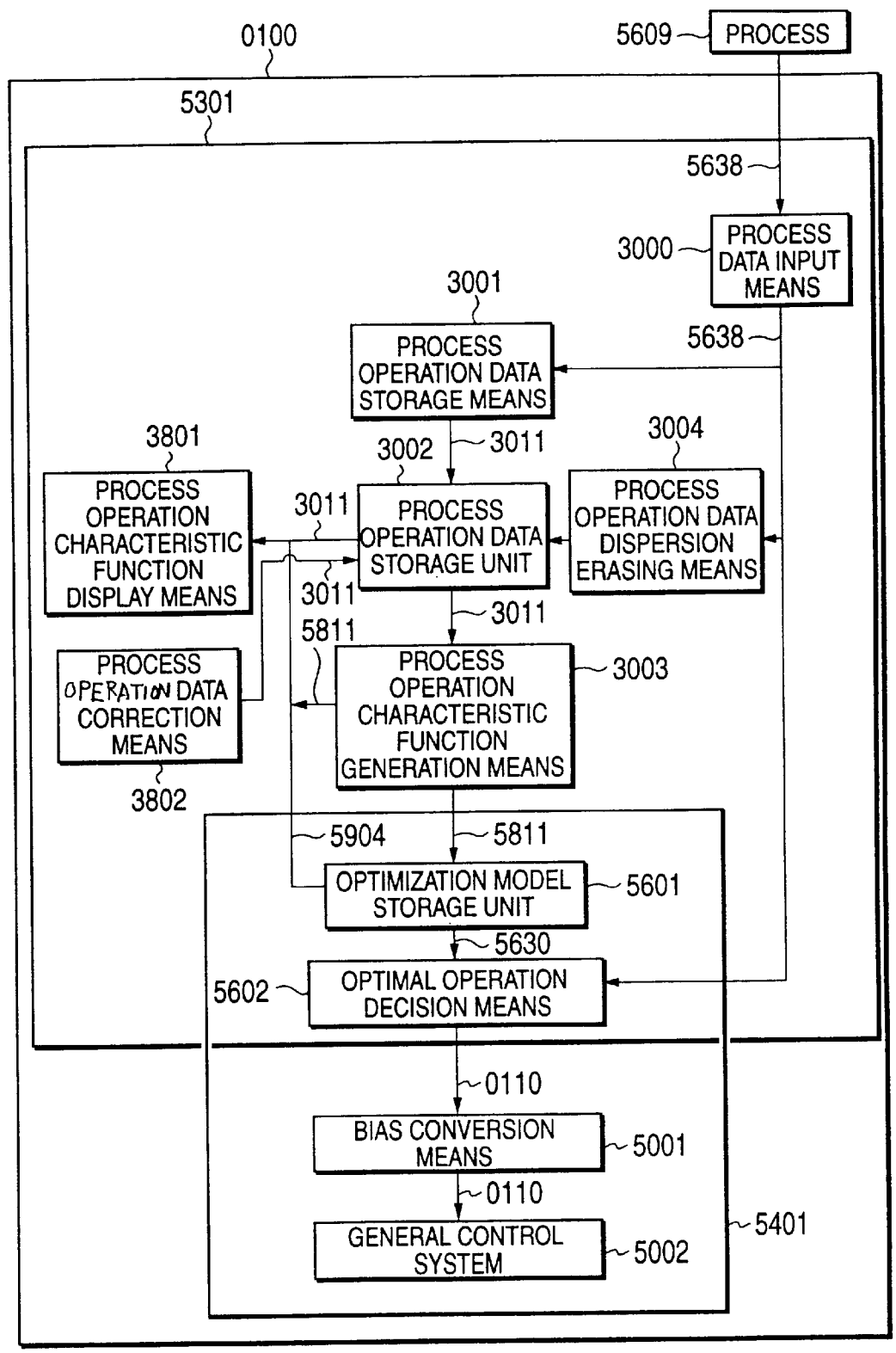
FIG. 55 is a drawing showing the construction of a process control system relating to the present invention when the embodiment shown in FIG. 38 and the embodiment shown in FIG. 50 are combined.
Figure 56:
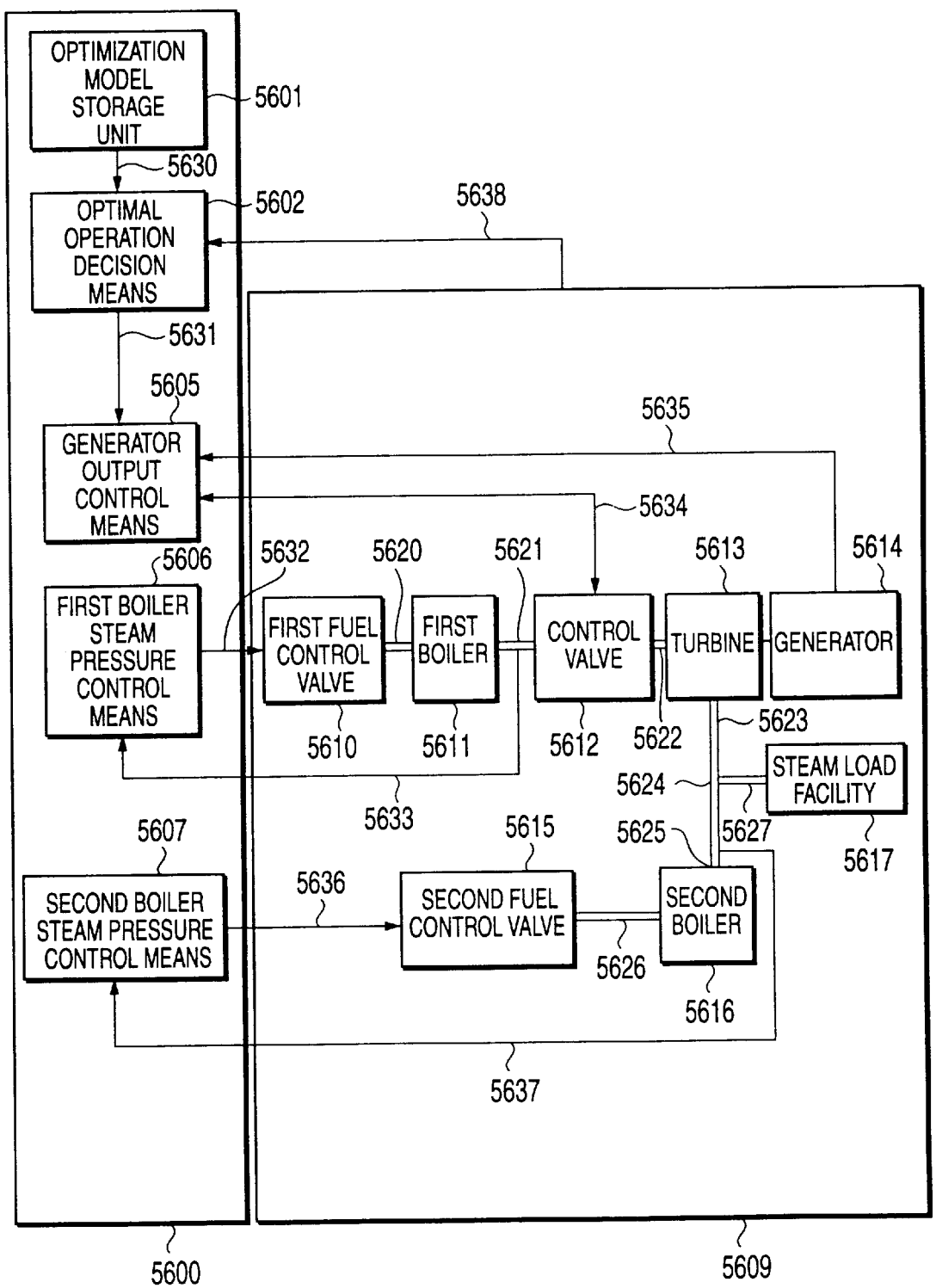
FIG. 56 is a drawing showing the construction of a coordinate control system having a conventional optimal operation decision means when there is only one optimal operating point available.

FIG. 51 is a block diagram showing a process control system according to a tenth embodiment of the present invention. FIG. 51 shows the construction of a process control system 0100 according to this embodiment of the present invention. As shown in the drawing, this embodiment is composed of a combination of a process control system 5101 of the fifth, sixth, or seventh embodiment and a process control system 5102 of the eighth or ninth embodiment. The block diagrams of the fifth, sixth, seventh, eighth, and ninth embodiments are shown in FIG. 30 (the fifth or sixth embodiment), FIG. 38 (the seventh embodiment), FIG. 45 (the eighth embodiment), and FIG. 50 (the ninth embodiment), respectively. FIG. 52 shows an embodiment when the fifth or sixth embodiment and the eighth embodiment are combined. FIG. 53 shows an embodiment when the seventh embodiment and the eighth embodiment are combined. FIG. 54 shows an embodiment when the fifth or sixth embodiment and the ninth embodiment are combined. FIG. 55 shows an embodiment when the seventh embodiment and the ninth embodiment are combined.

The operation of this embodiment will be explained hereunder. In FIG. 52, a process control system 5201 of the fifth or sixth embodiment corresponds to the process control system 0100 shown in FIG. 30. As mentioned above, in the process control system 5201, the process operation characteristic function parameters 5811 necessary to decide the optimal operating point set value 0110 or the optimal priority set value 6109 can be automatically generated more highly precisely from the process operation data 3011 dispersedly stored in the process operation data storage unit 3002. In FIG. 52, a process control system 5202 of the eighth embodiment corresponds to the process control system 0100 shown in FIG. 45. As mentioned above, the process control system 5202 decides the optimal operating point set value 0110 or the optimal priority set value 6109 based on the optimization model 5630 including the process operation characteristic function 5904, and executes the control based on the decided optimal operating point set value 0110 or the optimal priority set value 6109.

In FIG. 53, a process control system 5301 of the seventh embodiment corresponds to the process control system 0100 shown in FIG. 38. As mentioned above, in the process control system 5301, an operator observes the process operation characteristic function 5904 necessary to decide the optimal operating point set value 0110 or the optimal priority set value 6109, and thereby can correct the process operation data 3011 for the automatic generation of the process operation characteristic function parameters 5811. In FIG. 53, the process control system 5202 of the eighth embodiment corresponds to the process control system 0100 shown in FIG. 45. As mentioned above, the process control system 5202 decides the optimal operating point set value 0110 or the optimal priority set value 6109 based on the optimization model 5630 including the process operation characteristic function 5904, and executes the control based on the decided optimal operating point set value 0110 or optimal priority set value 6109.

In FIG. 54, the process control system 5201 of the fifth or sixth embodiment corresponds to the process control system 0100 shown in FIG. 30. As mentioned above, in the process control system 5201, the process operation characteristic function parameters 5811 necessary to decide the optimal operating point set value 0110 can be automatically generated more highly precisely from the process operation data 3011 dispersedly stored in the process operation data storage unit 3002. In FIG. 54, a process control system 5401 of the ninth embodiment corresponds to the process control system 0100 shown in FIG. 50. As mentioned above, the process control system 5401 decides the optimal operating point set value 0110 based on the optimization model 5630 including the process operation characteristic function 5904, and executes the control based on the decided optimal operating point set value 0110.

In FIG. 55, the process control system 5301 of the seventh embodiment corresponds to the process control system 0100 shown in FIG. 38. As mentioned above, in the process control system 5301, an operator observes the process operation characteristic function 5904 necessary to decide the optimal operating point set value 0110, and thereby can correct the process operation data 3011 for automatic generation of the process operation characteristic function parameters 5811. In FIG. 55, the process control system 5401 of the ninth embodiment corresponds to the process control system 0100 shown in FIG. 50. As mentioned above, the process control system 5401 decides the optimal operating point set value 0110 based on the optimization model 5630 including the process operation characteristic function 5904, and executes the control based on the decided optimal operating point set value 0110.

From the aforementioned, this embodiment produces an effect such that the process operation characteristic function parameters 5811 used to decide the optimal operating point or the optimal control priority for the process operation can be automatically generated by the process data input 5638 or the input of an operator, and the optimal operating point or the optimal priority is decided based on the process operation characteristic function parameters 5811 generated in this way, and thereby the process can be controlled.

As mentioned above, according to the present invention, it is possible to provide a process control system which can control a process to be controlled stably with a good response, while the control output of the fast response can be controlled at the optimal operating point.

Furthermore, it is possible to provide a process control system which can control a process to be controlled stably with a good response in accordance with an optimal priority, while the higher-priority control output is controlled toward the upper limit on a priority basis and the lower-priority control output is controlled toward the lower limit on a priority basis in accordance with the optimal priority.

Furthermore, in a process control system according to the present invention, the process operation data for preparing the process operation characteristic function for deciding the optimal priority and/or the optimal operating point is dispersedly stored and the process operation data older in time is erased on a priority basis. Accordingly, it is possible to provide a process control system in which the process operation characteristic function can be automatically generated precisely with a given storage capacity for storing the process operation data. Further, an effect is produced such that the burden for preparing the process operation characteristic function imposed on an operator can be lightened.

Furthermore, in a process control system according to the present invention, an optimal operating point and/or an optimal priority can be decided based on the generated process operation characteristic function, and a process to be controlled can be controlled in accordance with the decided optimal operating point or the decided optimal priority. Accordingly, it is possible to provide a process control system which can control stably the process to be controlled in accordance with the optimal operating point or the optimal priority with a good response.

Furthermore, in a process control system according to the present invention in a general control system, the optimal operating point is converted to a minor loop bias value, and thereby the control gain of the minor loop is not reduced. Accordingly, it is possible to provide a process control system which can control stably a process to be controlled in proportion to the optimal operating point with a good response.

Obviously, numerous modifications and variations of the present invention are possible in light of the above teachings. It is therefore to be understood that within the scope of the appended claims, the invention may be practiced otherwise than as specifically described herein.

What is claimed is:

1. A process control system in a multi-input/output coordinate control system including a main input for executing coordinate control of said main input, said process control system, comprising:

operating point setting means for setting an operating point set value for an operating point of an n-th control output of fast response to said main input;

n-th output control means for generating said n-th control output of fast response to control said main input based on said n-th control output; and m-th output control means for generating an m-th control output to control said operating point of said n-th control output so that said operating point of said n-th control output becomes equal to said operating point set value set in said operating point setting means based on said m-th control output;

thereby to allow said n-th control output of fast response to operate at said operating point set value by controlling said main input.

2. The process control system according to claim 1, further comprising:

an optimization model storage unit for storing an optimization model including a process operation characteristic function indicating a mutual relationship between process operation data; and optimal operation decision means for inputting process data input from a process to be controlled, for deciding an optimal operating point of said n-th control output of fast response so that said process is operated at said optimal operating point based on said inputted process data input and said process operation characteristic function stored in said optimization model storage unit, and for outputting said decided optimal n-th control output operating point to said operating point setting means as said operating point set value;

wherein said n-th control output is operated at said optimal operating point.

3. The process control system according to claim 1, wherein said m-th output control means includes:

higher-priority output control means for generating a higher-priority output to control said main input based on said higher-priority output;

lower-priority output control means for generating a lower-priority output to control said main input based on said lower-priority output;

lower-priority output block means for blocking said lower-priority output so as to prevent said higher-priority output from reducing before said higher-priority output reaches an upper limit value; and higher-priority output block means for blocking said higher-priority output so as to prevent said lower-priority output from increasing before said lower-priority output reaches a lower limit value;

thereby to control said higher-priority output toward said upper limit value on a priority basis and said lower-priority output toward said lower limit value on a priority basis, while controlling said n-th control output of fast response to operate at said operating point set value.

4. A process control system in a multi-input/output coordinate control system including a main input for executing coordinate control of said main input, said process control system, comprising:

higher-priority output control means for generating a higher-priority output to control said main input based on said higher-priority output;

lower-priority output control means for generating a lower-priority output to control said main input based on said lower-priority output;

lower-priority output block means for blocking said lower-priority output so as to prevent said higher-priority output from reducing before said higher-priority output reaches an upper limit value; and higher-priority output block means for blocking said higher-priority output so as to prevent said lower-priority output from increasing before said lower-priority output reaches a lower limit value;

thereby to control said higher-priority output toward said upper limit value on a priority basis and said lower-priority output toward said lower limit value on a priority basis, while executing coordinate control of said main input.

5. The process control system according to claim 3 or 4, further comprising:

an output control means storage unit for storing a correspondence between a plurality of said output control means and a plurality of upper limit inputs and lower limit inputs, respectively; and priority setting means for setting, based on said correspondence stored in said output control means storage unit and a priority of said output control means set from a terminal, for setting said upper limit inputs as said upper limit values in each of said higher-priority output block means in a plurality of said output control means, and for setting said lower limit inputs as said lower limit values in each of said lower-priority output block means in said plurality of said output control means;

wherein said lower-priority output block means blocks said lower-priority output so as to prevent said higher-priority output from reducing before said higher-priority output reaches said upper limit value among said plurality of said output control means; and said higher-priority output block means blocks said higher-priority output so as to prevent said lower-priority output from increasing before said lower-priority output reaches said lower limit value among said plurality of said output control means;

thereby to execute coordinate control based on said set priority by said terminal.

6. The process control system according to claim 5, further comprising:

an optimization model storage unit for storing an optimization model including a process operation characteristic function indicating a mutual relationship between process operation data; and optimal operation decision means for inputting process data input from a process to be controlled, for deciding an optimal priority of said m-th control output based on said inputted process data input and said process operation characteristic function stored in said optimization model storage unit, and for outputting said decided optimal priority of said m-th control output to said priority setting means;

wherein said m-th control output is operated on said optimal priority.

7. The process control system according to claim 5, further comprising:

an optimization model storage unit for storing an optimization model including a process operation characteristic function indicating a mutual relationship between process operation data; and optimal operation decision means for inputting process data input from a process to be controlled, for deciding an optimal operating point of said n-th control output of fast response and an optimal priority of said m-th control output so that said process is operated at said optimal operating point based on said inputted process data input and said process operation characteristic function stored in said optimization model storage said process operation characteristic function stored in said optimization model storage unit, and for outputting said decided optimal n-th control output operating point and said decided optimal priority of said m-th control output to said operating point setting means as said operating point set value and said priority setting means;

wherein said n-th control output and said m-th control output are operated at said optimal operating point and on said optimal priority.

* * * * *